United States Patent
Lemay et al.

(10) Patent No.: US 10,732,820 B2
(45) Date of Patent: Aug. 4, 2020

(54) SYSTEMS AND METHODS FOR EFFICIENTLY NAVIGATING BETWEEN APPLICATIONS WITH LINKED CONTENT ON AN ELECTRONIC DEVICE WITH A TOUCH-SENSITIVE DISPLAY

(71) Applicant: Apple Inc., Cupertino, CA (US)

(72) Inventors: Stephen O. Lemay, San Francisco, CA (US); Christopher P. Foss, San Francisco, CA (US); Woo-Ram Lee, Belevue, WA (US); Lawrence Y. Yang, Bellevue, WA (US); Caelan G. Stack, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/729,407

(22) Filed: Oct. 10, 2017

(65) Prior Publication Data
US 2018/0032228 A1     Feb. 1, 2018

Related U.S. Application Data

(63) Continuation of application No. 14/738,672, filed on Jun. 12, 2015, now Pat. No. 9,785,340, which is a
(Continued)

(51) Int. Cl.
*G06F 3/0488*     (2013.01)
*G06F 3/041*      (2006.01)
(Continued)

(52) U.S. Cl.
CPC .......... *G06F 3/0488* (2013.01); *G06F 3/0416* (2013.01); *G06F 3/0481* (2013.01);
(Continued)

(58) Field of Classification Search
CPC . G06F 3/01; G06F 3/033; G06F 3/048; G06F 3/0481; G06F 3/04812;
(Continued)

(56) References Cited

U.S. PATENT DOCUMENTS 6,173,337 B1 *  1/2001  Akhond ................. G06F 9/542
                                                      719/318
7,996,045 B1 *  8/2011  Bauer ................... G06F 3/0488
                                                      455/566
(Continued)

FOREIGN PATENT DOCUMENTS

CN     102129345 A    7/2011
CN     103562839 A    2/2014
(Continued)

OTHER PUBLICATIONS

Grant, dated Jun. 14, 2018, received in Australian Patent Application No. 2015274341, which corresponds with U.S. Appl. No. 14/732,618, 1 page.
(Continued)

*Primary Examiner* — William Lu
(74) *Attorney, Agent, or Firm* — Morgan, Lewis & Bockius LLP

(57) ABSTRACT

Systems and methods for efficiently navigating between applications are disclosed herein. An example method includes: concurrently displaying: a first user interface (UI) associated with a first application, a status bar with status indications associated with system-wide functions; and a first affordance associated with a second application. While concurrently displaying, the method includes: detecting a first input that corresponds to selection of the affordance and, in response: replacing display of at least a portion of the first UI with a second UI that is associated with the second application; maintaining display of the status bar; and displaying a second affordance that is associated with the first
(Continued)

application. While concurrently displaying, the method includes: detecting a second input that corresponds to selection of the second affordance and, in response: replacing display of at least a portion of the second UI with the first UI; and maintaining display of the status bar.

51 Claims, 58 Drawing Sheets

Related U.S. Application Data continuation-in-part of application No. 14/732,618, filed on Jun. 5, 2015, now Pat. No. 9,648,062.

(60) Provisional application No. 62/171,987, filed on Jun. 5, 2015, provisional application No. 62/165,171, filed on May 21, 2015, provisional application No. 62/108,990, filed on Jan. 28, 2015, provisional application No. 62/011,531, filed on Jun. 12, 2014.

(51) Int. Cl.
*G06F 3/0484* (2013.01)
*G06F 3/0481* (2013.01)
*G06F 3/0485* (2013.01)

(52) U.S. Cl.
CPC ........ *G06F 3/0485* (2013.01); *G06F 3/04817* (2013.01); *G06F 3/04842* (2013.01); *G06F 3/04883* (2013.01); *G06F 3/04886* (2013.01); *G06F 2203/04105* (2013.01); *G06F 2203/04803* (2013.01)

(58) Field of Classification Search
CPC ............. G06F 3/04817; G06F 3/04842; G06F 3/0482; G06F 3/0488
See application file for complete search history.

(56) References Cited

U.S. PATENT DOCUMENTS

| | | | | |
|---|---|---|---|---|
| 8,042,110 B1* | 10/2011 | Kawahara | ............... | G06F 9/451 718/100 |
| 8,159,469 B2 | 4/2012 | Shiplacoff et al. | | |
| 8,508,759 B2* | 8/2013 | Urakawa | ................. | H04L 67/36 345/156 |
| 8,959,446 B2* | 2/2015 | Igeta | ..................... | G06F 3/0486 715/769 |
| 9,164,653 B2* | 10/2015 | Keondjian | ......... | G06F 3/04815 |
| D763,899 S * | 8/2016 | Lee | .............. | D14/488 |
| 9,423,938 B1* | 8/2016 | Morris | ................ | G06F 3/04842 |
| 9,658,766 B2* | 5/2017 | Nan | ................... | G06F 3/04886 |
| 2003/0078077 A1 | 4/2003 | Kokubo | | |
| 2005/0193389 A1* | 9/2005 | Murphy | .................... | G06F 8/61 717/175 |
| 2005/0257168 A1* | 11/2005 | Cummins | ............. | G06F 3/0481 715/809 |
| 2006/0061597 A1* | 3/2006 | Hui | ....................... | G06F 3/0481 345/629 |
| 2006/0123353 A1* | 6/2006 | Matthews | ............. | G06F 3/0481 715/779 |
| 2006/0161861 A1* | 7/2006 | Holecek | ................ | G06F 16/904 715/782 |
| 2006/0212329 A1* | 9/2006 | Lucas | .................... | G06Q 10/06 715/779 |
| 2009/0049385 A1 | 2/2009 | Blinnikka et al. | | |
| 2009/0113355 A1 | 4/2009 | Koo | | |
| 2009/0259937 A1* | 10/2009 | Rohall | ................ | G06F 3/04815 715/706 |
| 2010/0066698 A1 | 3/2010 | Seo | | |
| 2010/0081475 A1 | 4/2010 | Chiang et al. | | |
| 2010/0088634 A1* | 4/2010 | Tsuruta | ................ | G06F 3/0481 715/800 |
| 2010/0097335 A1 | 4/2010 | Jung et al. | | |
| 2011/0138295 A1* | 6/2011 | Momchilov | .......... | G06F 3/0484 715/740 |
| 2011/0164058 A1 | 7/2011 | Lemay | | |
| 2011/0175930 A1* | 7/2011 | Hwang | ................. | G06F 3/0481 345/629 |
| 2011/0250930 A1 | 10/2011 | Jung et al. | | |
| 2011/0252357 A1 | 10/2011 | Chaudhri | | |
| 2012/0084690 A1 | 4/2012 | Sirpal et al. | | |
| 2012/0084713 A1* | 4/2012 | Desai | ...................... | G06F 9/452 715/788 |
| 2012/0240054 A1 | 9/2012 | Webber | | |
| 2012/0254801 A1* | 10/2012 | Gaffney | ................ | G06F 3/0482 715/825 |
| 2012/0287039 A1 | 11/2012 | Brown et al. | | |
| 2012/0304108 A1 | 11/2012 | Jarrett et al. | | |
| 2012/0320081 A1 | 12/2012 | Kim et al. | | |
| 2012/0324365 A1* | 12/2012 | Momchilov | .............. | G06F 3/14 715/738 |
| 2012/0327172 A1 | 12/2012 | Ei-Saban et al. | | |
| 2013/0120295 A1* | 5/2013 | Kim | ........................ | G06F 3/01 345/173 |
| 2013/0120447 A1 | 5/2013 | Kim et al. | | |
| 2013/0145267 A1 | 6/2013 | Ramachandran | | |
| 2013/0145313 A1 | 6/2013 | Roh et al. | | |
| 2013/0174049 A1 | 7/2013 | Townsend et al. | | |
| 2013/0174179 A1* | 7/2013 | Park | ...................... | G06F 9/4843 718/107 |
| 2013/0187861 A1 | 7/2013 | Lavallee | | |
| 2013/0191779 A1* | 7/2013 | Radakovitz | ............. | G06F 9/451 715/800 |
| 2013/0198634 A1 | 8/2013 | Matas et al. | | |
| 2013/0219343 A1 | 8/2013 | Nan et al. | | |
| 2013/0268885 A1 | 10/2013 | Lim et al. | | |
| 2013/0305184 A1 | 11/2013 | Kim et al. | | |
| 2014/0026062 A1 | 1/2014 | Proudfoot et al. | | |
| 2014/0033288 A1* | 1/2014 | Wynn | .................... | H04W 12/08 726/7 |
| 2014/0053097 A1 | 2/2014 | Shin et al. | | |
| 2014/0075394 A1 | 3/2014 | Nawle et al. | | |
| 2014/0089833 A1 | 3/2014 | Hwang et al. | | |
| 2014/0132531 A1 | 5/2014 | Lee | | |
| 2014/0157163 A1 | 6/2014 | Strutin-Belinoff | ......................... | G06F 3/04883 715/769 |
| 2014/0164957 A1 | 6/2014 | Shin et al. | | |
| 2014/0164966 A1 | 6/2014 | Kim et al. | | |
| 2014/0164990 A1 | 6/2014 | Kim et al. | | |
| 2014/0164991 A1* | 6/2014 | Kim | ...................... | G06F 3/0481 715/794 |
| 2014/0168076 A1 | 6/2014 | Hicks et al. | | |
| 2014/0181843 A1* | 6/2014 | Yang | ...................... | G06F 9/542 719/318 |
| 2014/0210753 A1 | 7/2014 | Lee et al. | | |
| 2014/0282606 A1 | 9/2014 | Clark et al. | | |
| 2014/0304651 A1 | 10/2014 | Johansson et al. | | |
| 2014/0317559 A1 | 10/2014 | Wakefield | | |
| 2014/0325410 A1 | 10/2014 | Jung et al. | | |
| 2014/0325432 A1 | 10/2014 | Frederickson et al. | | |
| 2014/0351816 A1 | 11/2014 | Park | | |
| 2014/0359443 A1 | 12/2014 | Hwang | | |
| 2015/0033125 A1 | 1/2015 | Kang et al. | | |
| 2015/0062433 A1 | 3/2015 | Wang et al. | | |
| 2015/0074589 A1* | 3/2015 | Pan | ...................... | G06F 3/04886 715/781 |
| 2015/0128042 A1 | 5/2015 | Churchill et al. | | |
| 2015/0227271 A1 | 8/2015 | Kang et al. | | |
| 2015/0227274 A1 | 8/2015 | Lee et al. | | |
| 2015/0234545 A1 | 8/2015 | Churchill et al. | | |
| 2015/0264292 A1 | 9/2015 | Greene et al. | | |
| 2015/0293664 A1 | 10/2015 | Burchell et al. | | |
| 2015/0350005 A1* | 12/2015 | Singh | ..................... | G06F 3/0481 709/206 |
| 2015/0355817 A1* | 12/2015 | Dai | ....................... | G06F 16/954 715/763 |
| 2015/0363066 A1 | 12/2015 | Lemay et al. | | |
| 2015/0365306 A1 | 12/2015 | Chaudhri et al. | | |

(56) References Cited

U.S. PATENT DOCUMENTS

| | | | |
|---|---|---|---|
| 2016/0189328 A1* | 6/2016 | Vranjes | G06F 3/0488 345/173 |
| 2016/0209973 A1* | 7/2016 | Kaufthal | G06F 3/0481 |
| 2017/0242538 A1 | 8/2017 | Chaudhri et al. | |
| 2017/0245017 A1 | 8/2017 | Chaudhri et al. | |

FOREIGN PATENT DOCUMENTS

| | | |
|---|---|---|
| EP | 2 241 963 A1 | 10/2010 |
| EP | 2 662 761 A1 | 11/2013 |
| EP | 2 741 201 A2 | 6/2014 |
| JP | 2003-209609 | 7/2003 |
| TW | 201342235 A | 10/2013 |
| WO | WO 2012/174706 A1 | 12/2012 |

OTHER PUBLICATIONS

Office Action, dated Feb. 15, 2018, received in Australian Patent Application No. 2015274341, which corresponds with U.S. Appl. No. 14/732,618, 3 pages.

Office Action, dated Jun. 6, 2018, received in European Patent Application No. 15732140.7, which corresponds with U.S. Appl. No. 14/732,618, 12 pages.

Office Action, dated Feb. 17, 2016, received in U.S. Appl. No. 14/732,618, 13 pages.

Notice of Allowance, dated Aug. 23, 2016, received in U.S. Appl. No. 14/732,618, 9 pages.

Notice of Allowance, dated Mar. 6, 2017, received in U.S. Appl. No. 14/732,618, 6 pages.

Office Action, dated Mar. 28, 2017, received in Australian Patent Application No. 2015274341, which corresponds with U.S. Appl. No. 14/732,618, 2 pages.

Office Action, dated Oct. 27, 2016, received in Taiwanese Patent Application No. 104119192, which corresponds with U.S. Appl. No. 14/732,618, 2 pages.

Notice of Allowance, dated May 22, 2017, received in Taiwanese Patent Application No. 104119192, which corresponds with U.S. Appl. No. 14/732,618, 5 pages.

Patent, dated Sep. 1, 2017, received in Taiwanese Patent Application No. 104119192, which corresponds with U.S. Appl. No. 14/732,618, 5 pages.

Office Action, dated Sep. 9, 2016, received in U.S. Appl. No. 14/738,672, 19 pages.

Notice of Allowance, dated Jun. 7, 2017, received in U.S. Appl. No. 14/738,672, 9 pages.

International Search Report and Written Opinion, dated Jan. 15, 2016, received in International Patent Application No. PCT/US2015/035672, which corresponds with U.S. Appl. No. 14/732,618, 17 pages.

Search Report and Written Opinion, dated Oct. 27, 2015, received in International Patent Application No. PCT/US2015/035675, which corresponds with U.S. Appl. No. 14/738,672, 9 pages.

Office Action, dated Oct. 26, 2018, received in U.S. Appl. No. 15/589,894, 14 pages.

Office Action, dated Nov. 23, 2018, received in U.S. Appl. No. 15/589,900, 11 pages.

Office Action, dated May 23, 2019, received in Australian Patent Application No. 2018203847, 3 pages.

Office Action, dated Mar. 11, 2019, received in Chinese Patent Application No. 201580029010.0, which corresponds with U.S. Appl. No. 14/732,618, 4 pages.

Office Action, dated May 24, 2019, received in Chinese Patent Application No. 201580029010.0, which corresponds with U.S. Appl. No. 14/732,618, 3 pages.

Notice of Allowance, dated Jun. 6, 2019, received in U.S. Appl. No. 15/589,894, 7 pages.

Final Office Action, dated Jul. 8, 2019, received in U.S. Appl. No. 15/589,900, 11 pages.

Office Action, dated Dec. 12, 2019, received in U.S. Appl. No. 15/589,900, 12 pages.

Office Action, dated Jan. 17, 2020, received in Chinese Patent Application No. 201580029010.0, which corresponds with U.S. Appl. No. 14/732,618, 3 pages.

Office Action, dated Aug. 22, 2019, received in Chinese Patent Application No. 201580029010.0, which corresponds with U.S. Appl. No. 14/732,618, 3 pages.

Notice of Acceptance, dated Nov. 15, 2019, received in Australian Patent No. 2018203847, which corresponds with U.S. Appl. No. 14/732,618, 3 pages.

Certificate of Grant, dated Mar. 19, 2020, received in Australian Patent Application No. 2018203847 (7249AU01), which corresponds with U.S. Appl. No. 14/732,618, 4 pages.

\* cited by examiner

300

| 302 | Display, in a full-screen mode on a touch-sensitive display of an electronic device, a first application including a selectable user interface element (e.g., a link or notification banner) associated with a second application |

↓

| 304 | Detect a selection of the selectable user interface element |

↓

| 306 | In response to detecting the selection of the selectable user interface element: (i) display the second application, including content corresponding to the selectable user interface element, in a predefined portion of the touch-sensitive display and (ii) display the first application in an additional portion, distinct from the predefined portion, between an edge of the touch-sensitive display and the predefined portion |

| 308 | A combination of the predefined portion and the additional portion occupy substantially all of the touch-sensitive display |

| 310 | Displaying the second application in the predefined portion includes sliding the second application on to the touch-sensitive display in a first direction over the displayed first application until the second application occupies the predefined portion and the first application remains visible in the additional portion. |

| 312 | The additional portion includes a pin affordance that, when selected, pins the second application next to the first application on the touch-sensitive display |

| 314 | The additional portion includes a promote affordance that, when selected, displays the second application in full-screen mode |

Figure 3A

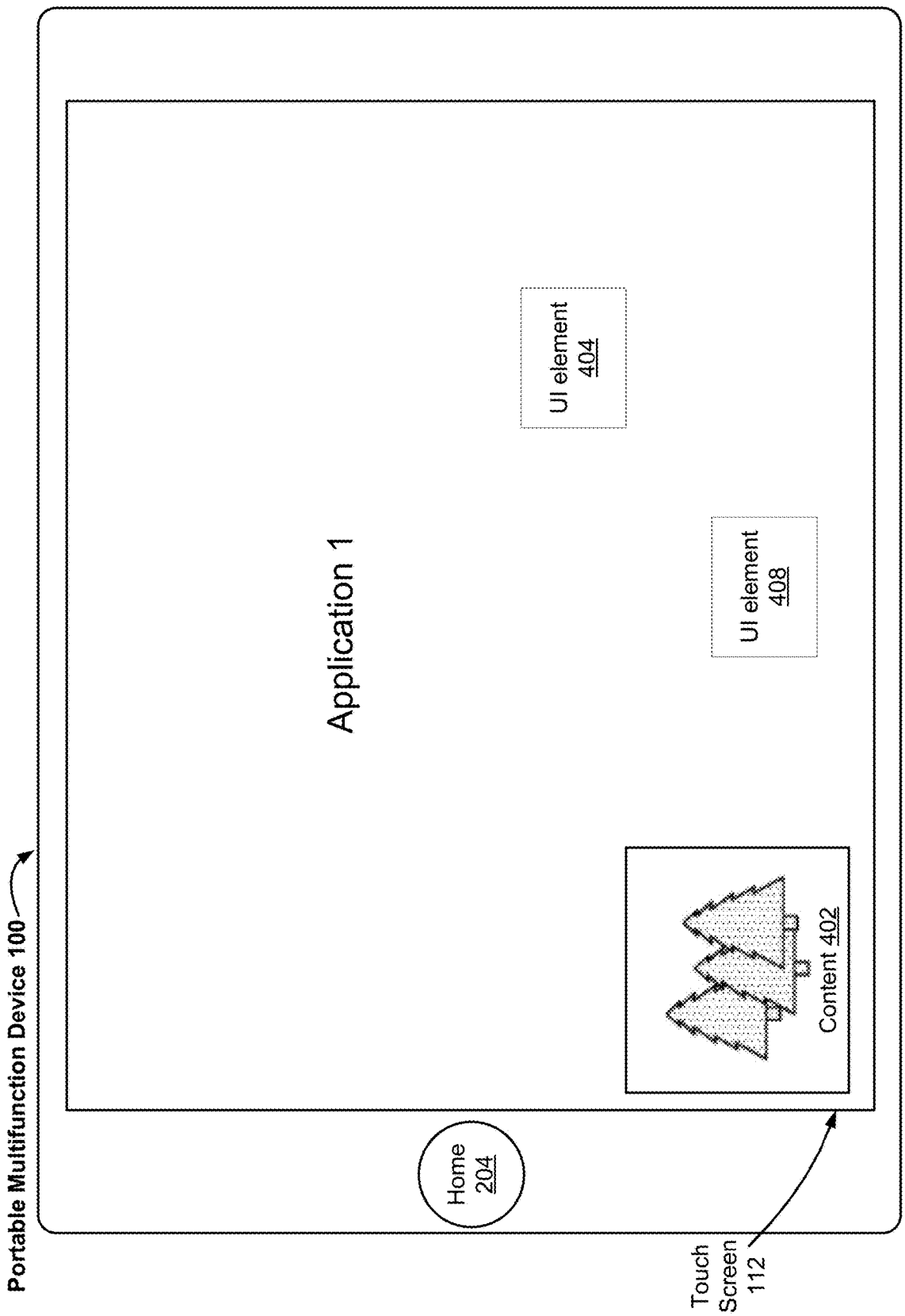

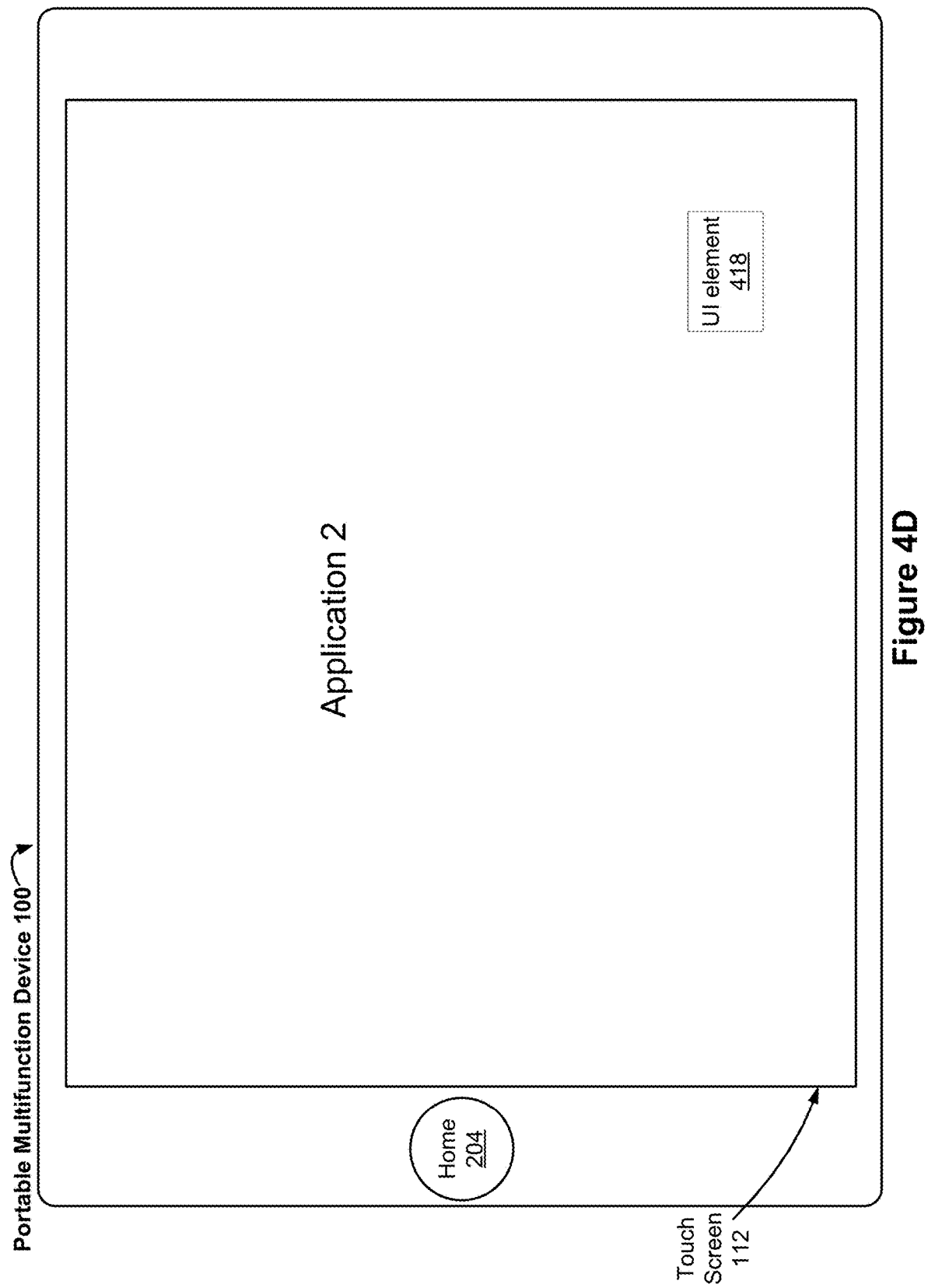

1100

In response to detecting the selection of the first selectable user interface element:

Display a first indication corresponding to the first application in an additional portion of the touch-sensitive display that is distinct from and adjacent to the predefined portion — 1116

A combination of the predefined portion and the additional portion occupy substantially all of the touch-sensitive display — 1118

The additional portion is between an edge of the touch-sensitive display and the predefined portion — 1124

The additional portion has a width that is substantially the same as the width of the predefined portion and further wherein the additional portion has a height that is substantially less than the height of the predefined portion — 1126

The first indication includes an arrow affordance pointing in a direction opposite to the first direction — 1120

Displaying the first indication includes determining a visual appearance for the first indication based on a physical characteristic of the touch-sensitive display and displaying the first indication with the determined visual appearance — 1122

```
In response to detecting the selection of the second selectable user
interface element:
                              (C)
                               ↓
┌─────────────────────────────────────────────────────────┐ ─ 1140
│ Display a second indication corresponding to the second │
│           application in the additional portion         │
│  ┌───────────────────────────────────────────────────┐  │ ─ 1142
│  │ A combination of the predefined portion and the   │  │
│  │  additional portion occupy substantially all of   │  │
│  │              the touch-sensitive display          │  │
│  └───────────────────────────────────────────────────┘  │
│  ┌ ─ ─ ─ ─ ─ ─ ─ ─ ─ ─ ─ ─ ─ ─ ─ ─ ─ ─ ─ ─ ─ ─ ─ ─ ┐   │ ─ 1144
│    The second indication includes an arrow affordance   │
│  │  pointing in a direction opposite to the first       │
│                          direction                  │   │
│  └ ─ ─ ─ ─ ─ ─ ─ ─ ─ ─ ─ ─ ─ ─ ─ ─ ─ ─ ─ ─ ─ ─ ─ ─ ┘   │ ─ 1146
│  ┌ ─ ─ ─ ─ ─ ─ ─ ─ ─ ─ ─ ─ ─ ─ ─ ─ ─ ─ ─ ─ ─ ─ ─ ─ ┐   │
│    Displaying the second indication includes determining a │
│  │ visual appearance for the second indication based on a │
│    physical characteristic of the touch-sensitive display and │
│  │ displaying the second indication with the determined visual │
│                          appearance                  │  │
│  └ ─ ─ ─ ─ ─ ─ ─ ─ ─ ─ ─ ─ ─ ─ ─ ─ ─ ─ ─ ─ ─ ─ ─ ─ ┘  │
└─────────────────────────────────────────────────────────┘
```

┌ ─ ─ ─ ─ ─ ─ ─ ─ ─ ─ ─ ─ ─ ─ ─ ─ ─ ─ ─ ─ ─ ─ ─ ─ ─ ─ ┐ ─ 1148
│         Detect a touch input at the second indication          │
└ ─ ─ ─ ─ ─ ─ ─ ─ ─ ─ ─ ─ ─ ─ ─ ─ ─ ─ ─ ─ ─ ─ ─ ─ ─ ─ ┘

┌ ─ ─ ─ ─ ─ ─ ─ ─ ─ ─ ─ ─ ─ ─ ─ ─ ─ ─ ─ ─ ─ ─ ─ ─ ─ ─ ┐ ─ 1150
│ In response to detecting the touch input at the second indication, slide │
│ the third application off of the touch-sensitive display in a second │
│ direction, opposite to the first direction, until the third application is no │
│           longer visible on the touch-sensitive display          │
└ ─ ─ ─ ─ ─ ─ ─ ─ ─ ─ ─ ─ ─ ─ ─ ─ ─ ─ ─ ─ ─ ─ ─ ─ ─ ─ ┘

┌ ─ ─ ─ ─ ─ ─ ─ ─ ─ ─ ─ ─ ─ ─ ─ ─ ─ ─ ─ ─ ─ ─ ─ ─ ─ ─ ┐ ─ 1152
│ Sliding the third application off of the touch-sensitive display includes │
│ revealing, as the third application slides off of the touch-sensitive display, │
│           the second application having the reduced display size          │
└ ─ ─ ─ ─ ─ ─ ─ ─ ─ ─ ─ ─ ─ ─ ─ ─ ─ ─ ─ ─ ─ ─ ─ ─ ─ ─ ┘

┌ ─ ─ ─ ─ ─ ─ 1154 ─ ─ ─ ─ ─ ─ ─ ┐     ┌ ─ ─ ─ ─ ─ ─ 1156 ─ ─ ─ ─ ─ ─ ─ ┐
│ Revealing the second application │     │ Revealing the second application │
│ includes increasing the display size of │ │ includes (i) increasing the display │
│ the second application until the │     │ size of the second application until │
│ second application is again displayed │ │ the second application occupies the │
│ in the full-screen mode, such that │   │ predefined portion and (ii) re- │
│ increasing the display size of the │   │ displaying the first indication │
│ second application creates an │         │ corresponding to the first │
│ appearance that the second │            │ application in the additional portion │
│ application is moving, within the touch- │ │                              │
│ sensitive display, towards the user of │ │                              │
│ the electronic device │                 │                              │
└ ─ ─ ─ ─ ─ ─ ─ ─ ─ ─ ─ ─ ─ ─ ─ ─ ┘     └ ─ ─ ─ ─ ─ ─ ─ ─ ─ ─ ─ ─ ─ ─ ─ ─ ┘

Figure 11D

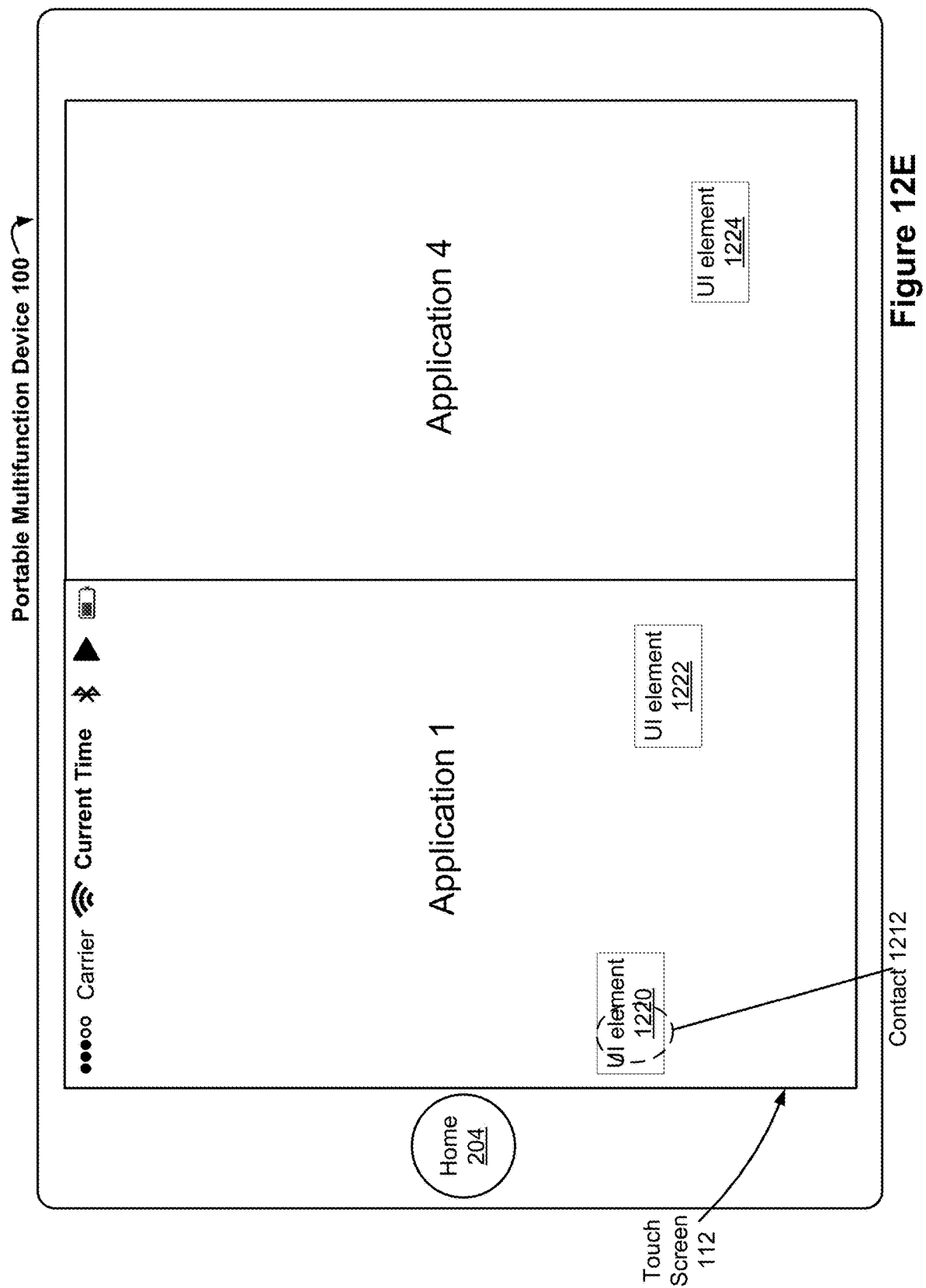

SYSTEMS AND METHODS FOR EFFICIENTLY NAVIGATING BETWEEN APPLICATIONS WITH LINKED CONTENT ON AN ELECTRONIC DEVICE WITH A TOUCH-SENSITIVE DISPLAY

RELATED APPLICATIONS

This application is a continuation of U.S. patent application Ser. No. 14/738,672, filed Jun. 12, 2015, which claims priority to U.S. Provisional Patent Application No. 62/171,987, filed Jun. 5, 2015, and U.S. patent application Ser. No. 14/738,672 is also a continuation-in-part of U.S. patent application Ser. No. 14/732,618, filed Jun. 5, 2015, now U.S. Pat. No. 9,648,062, issued May 9, 2017, which claims priority to U.S. Provisional Application No. 62/165,171, filed May 21, 2015, to U.S. Provisional Application No. 62/108,990, filed Jan. 28, 2015, and to U.S. Provisional Application No. 62/011,531, filed Jun. 12, 2014, each of which is hereby incorporated by reference in its entirety.

TECHNICAL FIELD

The embodiments disclosed herein generally relate to electronic devices with touch-sensitive displays and, more specifically, to systems and methods for efficiently navigating between applications.

BACKGROUND

Handheld electronic devices with touch-sensitive displays are ubiquitous. While these devices were originally designed for information consumption (e.g., web-browsing) and communication (e.g., email), they are rapidly replacing desktop and laptop computers as users' primary computing devices. Desktop and laptop computers, however, provide users with interfaces for multitasking across applications (e.g., sending an email using an email application while also browsing the web using a web browser application). While there has been tremendous growth of new features and applications available for handheld electronic devices, the ability to multitask and easily navigate between applications on handheld electronic devices requires entirely different input mechanisms than those of desktop or laptop computers.

Moreover, the need for navigating between applications is particularly challenging on handheld electronic devices, as they typically have smaller screens than traditional desktop and laptop computers. Some conventional handheld electronic devices attempt to address this need by recreating the desktop computer interface on the handheld electronic device. These attempted solutions, however, fail to take into account: (i) the significant differences in screen size between desktop computers and handled electronic devices and (ii) the significant differences between keyboard and mouse interaction of desktop computers and those of touch and gesture inputs of handled electronic devices with touch-sensitive displays. Other attempted solutions require complex input sequences and menu hierarchies that are even less user-friendly than those provided on desktop or laptop computers. As such, it is desirable to provide an intuitive system and method for navigating between applications with linked content on an electronic device with a touch-sensitive display.

SUMMARY

Accordingly, the present disclosure provides electronic devices with faster, more efficient methods and interfaces for navigating between applications with linked content on an electronic device with a touch-sensitive display. Such methods and interfaces optionally complement or replace conventional methods for navigating between applications with linked content on an electronic device with a touch-sensitive display. Such methods and interfaces reduce the cognitive burden on a user and produce a more efficient human-machine interface. Further, such methods conserve power, reduce unnecessary/extraneous/repetitive inputs, and potentially reduce memory usage. For battery-operated devices, such methods and interfaces conserve battery power and increase the time between battery charges. Moreover, such methods and interfaces help to extend the life of the touch-sensitive display by requiring a fewer number of touch inputs.

The above deficiencies and other problems associated with user interfaces for electronic devices with touch-sensitive surfaces are addressed by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, fitness support, digital photography, digital video, web browsing, digital music, and/or digital video playing. Executable instructions for performing these functions are, optionally, included in a non-transitory computer-readable storage medium or other computer program product configured for execution by one or more processors.

(A1) In accordance with some embodiments, a method is performed at an electronic device (e.g., portable multifunction device 100, FIG. 1A) with a touch-sensitive display (touch screen 112, FIG. 1C). The method includes: displaying, in a full-screen mode on the touch-sensitive display, a first application including a first selectable user interface element associated with a second application. The method further includes: detecting a selection of the first selectable user interface element. In response to detecting the selection of the first selectable user interface element, the method includes: (i) displaying the second application, including a second selectable user interface element, in a predefined portion of the touch-sensitive display, and (ii) displaying a first indication corresponding to the first application in an additional portion of the touch-sensitive display that is distinct from and adjacent to the predefined portion, wherein a combination of the predefined portion and the additional portion occupy substantially all of the touch-sensitive display. The method also includes: detecting a selection of the second selectable user interface element. In response to detecting the selection of the second selectable user interface element, the method includes: (i) displaying the third application in the predefined portion of the touch-sensitive display and (ii) displaying a second indication corresponding to the second application in the additional portion of the touch-sensitive display, wherein the combination of the predefined portion and the additional portion occupy substantially all of the touch-sensitive display.

(A2) In some embodiments of the method of A1, displaying the second application in the predefined portion includes sliding the second application in a first direction on to the touch-sensitive display until the second application occupies the predefined portion of the touch-sensitive display.

(A3) In some embodiments of the method of A2, sliding the second application on to the touch-sensitive display includes sliding the second application over the displayed first application.

(A4) In some embodiments of the method of any one of A2 or A3, the method further includes: before sliding the second application on to the touch-sensitive display, reducing a display size of the first application such that the first application appears to move backwards, relative to a user of the electronic device, within the touch-sensitive display.

(A5) In some embodiments of the method of any one of A1-A4, displaying the third application in the predefined portion includes sliding the third application in a first direction on to the touch-sensitive display until the third application occupies the predefined portion of the touch-sensitive display.

(A6) In some embodiments of the method of A5, sliding the third application on to the touch-sensitive display includes sliding the third application over the displayed second application.

(A7) In some embodiments of the method of any one of A5 or A6, the method further includes: before sliding the third application on to the touch-sensitive display, reducing a display size of the second application such that the second application appears to move backwards, relative to a user of the electronic device, within the touch-sensitive display.

(A8) In some embodiments of the method of any one of A2-A7, the method further includes: detecting a touch input at the second indication. In response to detecting the touch input at the second indication, the method includes: sliding the third application off of the touch-sensitive display in a second direction, opposite to the first direction, until the third application is no longer visible on the touch-sensitive display.

(A9) In some embodiments of the method of A8, sliding the third application off of the touch-sensitive display includes revealing, as the third application slides off of the touch-sensitive display, the second application having the reduced display size.

(A10) In some embodiments of the method of A9, revealing the second application includes increasing the display size of the second application until the second application is again displayed in the full-screen mode, such that increasing the display size of the second application creates an appearance that the second application is moving, within the touch-sensitive display, towards the user of the electronic device.

(A11) In some embodiments of the method of A9, revealing the second application includes (i) increasing the display size of the second application until the second application occupies the predefined portion and (ii) re-displaying the first indication corresponding to the first application in the additional portion.

(A12) In some embodiments of the method of any one of A1-A11, the first and second indications include an arrow affordance pointing in a direction opposite to the first direction.

(A13) In some embodiments of the method of any one of A1-A12, displaying the first indication and displaying the second indication include determining a visual appearance for the first indication and the second indication, respectively, based on a physical characteristic of the touch-sensitive display and displaying the first indication and the second indication, respectively, with the determined visual appearance.

(A14) In some embodiments of the method of any one of A1-A13, the method further includes: ceasing to display the first indication and/or the second indication after a predefined period of time in which no user input is detected at the additional portion.

(A15) In some embodiments of the method of any one of A1-A14, the additional portion is between an edge of the touch-sensitive display and the predefined portion.

(A16) In some embodiments of the method of any one of A1-A15, the additional portion has a width that is substantially the same as the width of the predefined portion and further wherein the additional portion has a height that is substantially less than the height of the predefined portion.

(A17) In another aspect, an electronic device is provided. In some embodiments, the electronic device includes: a touch-sensitive display, one or more processors, and memory storing one or more programs, which when executed by the one or more processors cause the electronic device to perform the method described in any one of A1-A16.

(A18) In yet another aspect, an electronic device is provided and the electronic device includes: a touch-sensitive display and means for performing the method described in any one of A1-A16.

(A19) In still another aspect, a computer-readable storage medium (e.g., a non-transitory computer readable storage medium, or alternatively, a transitory computer readable storage medium) is provided. The computer-readable storage medium stores executable instructions that, when executed by an electronic device with a touch-sensitive display, cause the electronic device to perform the method described in any one of A1-A16.

(A20) In still one more aspect, a graphical user interface on an electronic device with a touch-sensitive display is provided. In some embodiments, the graphical user interface includes user interfaces displayed in accordance with the method described in any one of A1-A16.

(A21) In one additional aspect, an electronic device (with references to the electronic device 1300, FIG. 13) is provided that includes a display unit (e.g., display unit 1301), a touch-sensitive surface unit (e.g., touch-sensitive surface unit 1303), and a processing unit (e.g., processing unit 1305) coupled with the touch-sensitive surface unit and the display unit. In some embodiments, the display unit 1301 and the touch-sensitive surface unit 1303 are integrated in a single touch-sensitive display unit (referred to herein interchangeably as a touch-sensitive display and touch-sensitive display unit). In some embodiments, the processing unit includes a displaying unit (e.g., displaying unit 1307), a detecting unit (e.g., detecting unit 1309), a sliding unit (e.g., sliding unit 1311), a reducing unit (e.g., reducing unit 1313), a revealing unit (e.g., revealing unit 1315), an increasing unit (e.g., increasing unit 1317), a re-displaying unit (e.g., re-displaying unit 1319), a determining unit (e.g., determining unit 1321), and a ceasing unit (e.g., ceasing unit 1323). The processing unit is configured to: display (e.g., with the displaying unit 1307 and/or the touch-sensitive display unit), in a full-screen mode on the touch-sensitive display unit, a first application including a first selectable user interface element associated with a second application; detect (e.g., with the detecting unit 1309) a selection of the first selectable user interface element. In response to detecting the selection of the first selectable user interface element, the processing unit is configured to: (i) display (e.g., with the displaying unit 1307 and/or the touch-sensitive display unit) the second application, including a second selectable user interface element, in a predefined portion of the touch-sensitive display unit and (ii) display (e.g., with the displaying unit 1307 and/or the touch-sensitive display unit) a first indication corresponding to the first application in an additional portion of the touch-sensitive display unit that is distinct from and adjacent to the predefined portion, wherein a combination of the predefined portion and the additional portion occupy substantially all of the touch-sensitive display unit. The processing unit is further configured to: detect (e.g., with the detecting unit 1309) a selection of the second selectable user interface element. In response to detecting the selection of the second selectable user interface element, the processing unit is configured to: (i) display (e.g., with the displaying unit 1307 and/or the touch-sensitive display unit) the third application in the predefined portion of the touch-sensitive display unit and (ii) display (e.g., with the displaying unit 1307 and/or the touch-sensitive display unit) a second indication corresponding to the second application in the additional portion of the touch-sensitive display unit, the combination of the predefined portion and the additional portion occupying substantially all of the touch-sensitive display unit.

(A22) In some embodiments of the electronic device of A21, displaying the second application in the predefined portion includes sliding (e.g., with the sliding unit 1311) the second application in a first direction on to the touch-sensitive display unit until the second application occupies the predefined portion of the touch-sensitive display unit.

(A23) In some embodiments of the electronic device of A22, sliding the second application on to the touch-sensitive display unit includes sliding (e.g., with the sliding unit 1311) the second application over the displayed first application.

(A24) In some embodiments of the electronic device of any one of A22 or A23, the processing unit is further configured to: before sliding the second application on to the touch-sensitive display unit, reduce (e.g., with the reducing unit 1313) a display size of the first application such that the first application appears to move backwards, relative to a user of the electronic device, within the touch-sensitive display unit.

(A25) In some embodiments of the electronic device of any one of A21-A24, displaying the third application in the predefined portion includes sliding (e.g., with the sliding unit 1311) the third application in a first direction on to the touch-sensitive display unit until the third application occupies the predefined portion of the touch-sensitive display unit.

(A26) In some embodiments of the electronic device of A25, sliding the third application on to the touch-sensitive display unit includes sliding (e.g., with the sliding unit 1311) the third application over the displayed second application.

(A27) In some embodiments of the electronic device of any one of A25 or A26, the processing unit is further configured to: before sliding the third application on to the touch-sensitive display unit, reduce (e.g., with the reducing unit 1313) a display size of the second application such that the second application appears to move backwards, relative to a user of the electronic device, within the touch-sensitive display unit.

(A28) In some embodiments of the electronic device of any one of A22-A27, the processing unit is further configured to: detect (e.g., with the detecting unit 1309) a touch input at the second indication. In response to detecting the touch input at the second indication, the processing unit is configured to: slide (e.g., with the sliding unit 1311) the third application off of the touch-sensitive display unit in a second direction, opposite to the first direction, until the third application is no longer visible on the touch-sensitive display unit.

(A29) In some embodiments of the electronic device of A28, sliding the third application off of the touch-sensitive display unit includes revealing (e.g., with the revealing unit 1315), as the third application slides off of the touch-sensitive display unit, the second application having the reduced display size.

(A30) In some embodiments of the electronic device of A29, revealing the second application includes increasing (e.g., with the increasing unit 1317) the display size of the second application until the second application is again displayed in the full-screen mode, such that increasing the display size of the second application creates an appearance that the second application is moving, within the touch-sensitive display unit, towards the user of the electronic device.

(A31) In some embodiments of the electronic device of A29, revealing the second application includes (i) increasing (e.g., with the increasing unit 1317) the display size of the second application until the second application occupies the predefined portion and (ii) re-displaying (e.g., with the re-displaying unit 1319) the first indication corresponding to the first application in the additional portion.

(A32) In some embodiments of the electronic device of any one of A21-A31, the first and second indications include an arrow affordance pointing in a direction opposite to the first direction.

(A33) In some embodiments of the electronic device of any one of A21-A32, displaying the first indication and displaying the second indication include determining (e.g., with the determining unit 1321) a visual appearance for the first indication and the second indication, respectively, based on a physical characteristic of the touch-sensitive display unit and displaying (e.g., with the displaying unit 1307 and the touch-sensitive surface unit) the first indication and the second indication, respectively, with the determined visual appearance.

(A34) In some embodiments of the electronic device of any one of A1-A33, the processing unit is further configured to: cease (e.g., with the ceasing unit 1323) to display the first indication and/or the second indication after a predefined period of time in which no user input is detected at the additional portion.

(A35) In some embodiments of the electronic device of any one of A21-A34, the additional portion is between an edge of the touch-sensitive display unit and the predefined portion.

(A36) In some embodiments of the electronic device of any one of A21-A35, the additional portion has a width that is substantially the same as the width of the predefined portion and further wherein the additional portion has a height that is substantially less than the height of the predefined portion.

(B1) In accordance with some embodiments, a method is performed at an electronic device (e.g., portable multifunction device 100, FIG. 1A) with a touch-sensitive display (touch screen 112, FIG. 1C). The method includes: displaying, in a full-screen mode on the touch-sensitive display, a first application including a selectable user interface element associated with a second application. The method further includes: detecting a selection of the selectable user interface element. In response to detecting the selection of the selectable user interface element, the method includes: (i) displaying the second application, including content corresponding to the selectable user interface element, in a predefined portion of the touch-sensitive display and (ii) displaying the first application in an additional portion, distinct from the predefined portion, between an edge of the touch-sensitive display and the predefined portion, such that a combination of the predefined portion and the additional portion occupy substantially all of the touch-sensitive display.

(B2) In some embodiments of the method of B1, displaying the second application in the predefined portion includes sliding the second application on to the touch-sensitive display in a first direction over the displayed first application until the second application occupies the predefined portion and the first application remains visible in the additional portion.

(B3) In some embodiments of the method of any one of B1-B2, the additional portion includes a pin affordance that, when selected, causes the electronic device to pin the second application next to the first application on the touch-sensitive display.

(B4) In some embodiments of the method of any one of B1-B3, the additional portion includes a promote affordance that, when selected, causes the electronic device to display the second application in the full-screen mode.

(B5) In some embodiments of the method of any one of B3-B4, the method further includes: detecting a selection of the pin affordance. In response to detecting the selection of the pin affordance, the method includes: resizing the first and second applications to each occupy approximately 50% of the touch-sensitive display.

(B6) In some embodiments of the method of B5, the first application includes an additional selectable user interface element associated with a third application and the method further includes: detecting a selection of the additional selectable user interface element. In response to detecting the selection of the additional selectable user interface element, the method includes: displaying the third application in the space previously occupied by the first application.

(B7) In some embodiments of the method of B5, the second application includes an additional selectable user interface element associated with a third application and the method further includes: detecting a selection of the additional selectable user interface element. In response to detecting the selection of the additional selectable user interface element, the method includes: (i) continuing to display the second application, (ii) ceasing to display the first application, and (iii) displaying the third application in the space previously occupied by the first application.

(B8) In some embodiments of the method of any one of B1-B4, the second application includes an additional selectable user interface element associated with a third application and the method further includes: detecting a selection of the additional selectable user interface element. In response to detecting the selection of the additional selectable user interface element, the method includes: (i) ceasing to display the second application, (ii) displaying the third application, including content corresponding to the additional selectable user interface element, in the predefined portion of the touch-sensitive display, and (iii) continuing to display the first application in the additional portion between the edge of the touch-sensitive display and the predefined portion, such that the combination of the predefined portion and the additional portion occupy substantially all of the touch-sensitive display.

(B9) In some embodiments of the method of any one of B1-B4, the second application includes an additional selectable user interface element associated with a third application and the method further includes: detecting a selection of the additional selectable user interface element. In response to detecting the selection of the additional selectable user interface element, the method includes: (i) ceasing to display the first application, (ii) displaying the third application, including content corresponding to the additional selectable user interface element, in the predefined portion of the touch-sensitive display, and (iii) displaying the second application in the additional portion between the edge of the touch-sensitive display and the predefined portion, such that the combination of the predefined portion and the additional portion occupy substantially all of the touch-sensitive display.

(B10) In some embodiments of the method of any one of B1-B4, the second application includes an additional selectable user interface element associated with a third application and the method further includes: detecting a selection of the additional selectable user interface element. In response to detecting the selection of the additional selectable user interface element, the method includes: (i) displaying the third application, including content corresponding to the additional selectable user interface element, in the predefined portion of the touch-sensitive display, (ii) displaying the first application in a first sub-portion of the additional portion between the edge of the touch-sensitive display and a second sub-portion of the additional portion, and (iii) displaying the second application in the second sub-portion of the additional portion, such that a combination of the predefined portion, the first sub-portion of the additional portion, and the second sub-portion of the additional portion occupy substantially all of the touch-sensitive display.

(B11) In some embodiments of the method of B10, the method further includes: detecting a contact over the second sub-portion of the additional portion. While detecting the contact over the second sub-portion of the additional portion, the method includes: increasing a size of the additional portion, such that more of the first and second applications is visible on the touch-sensitive display.

(B12) In some embodiments of the method of B11, the method further includes: after increasing the size of the additional portion, detecting a gesture dragging the second sub-portion of the additional portion towards the predefined portion and detecting lift off of the gesture at the predefined portion. In response to detecting lift off of the gesture at the predefined portion, the method includes: (i) displaying the second application in the predefined portion, (ii) continuing to display the first application in the first sub-portion of the additional portion, and (iii) displaying the third application in the second sub-portion of the additional portion.

(B13) In some embodiments of the method of B11, the method further includes: after increasing the size of the additional portion and the second additional portion, detecting a gesture dragging the second additional portion towards the predefined portion and detecting lift off of the gesture at the predefined portion. In response to detecting lift off of the gesture at the predefined portion, the method includes: displaying the second application in the full-screen mode.

(B14) In some embodiments of the method of any one of B1-B13, the selectable user interface element associated with the second application is a notification displayed on top of the first application.

(B15) In some embodiments of the method of any one of B1-B4 and B8, the method further includes: detecting a contact at the additional portion. In response to detecting the contact at the additional portion, the method includes: ceasing to display the second application and display the first application in the full-screen mode.

(B16) In some embodiments of the method of B15, ceasing to display the second application includes sliding the second application off of the touch-sensitive display in a second direction, opposite the first direction.

(B17) In some embodiments of the method of B1, the predefined portion of the touch-sensitive display is a central portion of the touch-sensitive display and the additional portion surrounds the central portion.

(B18) In some embodiments of the method of B17, displaying the second application in the predefined portion includes displaying an additional selectable user interface element associated with a third application and the method further includes: detecting a selection of the additional selectable user interface element. In response to detecting the selection of the additional selectable user interface element, the method includes: (i) sliding the second application in a first direction towards the edge of the touch-sensitive display, (ii) sliding the third application in the first direction on to the touch-sensitive display, such that the third application is displayed in the predefined portion and the second application remains visible next to the displayed third application, and (iii) continuing to display the first application in the additional portion.

(B19) In some embodiments of the method of B18, the method further includes: detecting a contact at the second application. In response to detecting the contact at the second application: (i) sliding the second application in a second direction, opposite the first direction, until the second application again occupies that predefined portion, (ii) displaying the third application in the space previously occupied by the second application, and (iii) continuing to display the first application in the additional portion.

(B20) In some embodiments of the method of B18, the method further includes: detecting a contact at the second application. In response to detecting the contact at the second application, the method includes: displaying the second application in the full-screen mode.

(B21) In some embodiments of the method of B1, the method further includes: detecting a dragging gesture at a border between the predefined portion and the additional portion that moves the border to a predetermined location on the touch-sensitive display. Upon determining that the dragging gesture has moved the border to the predetermined location, the method includes: resizing the first and second applications to each occupy approximately 50% of the touch-sensitive display.

(B22) In some embodiments of the method of B1, the method further includes: detecting a dragging gesture on top of the second application. In accordance with a determination that the dragging gesture has reached within a predetermined distance of a second edge, opposite the edge, of the touch-sensitive display, the method includes: displaying an application selector with a plurality of selectable affordances corresponding to applications available on the electronic device. The method further includes: detecting lift off of the dragging gesture over the application selector. In response to detecting the lift off of the dragging gesture, the method includes: (i) displaying the second application in the space previously occupied by the application selector and (ii) displaying the first application in a remaining portion of the touch-sensitive display.

(B23) In some embodiments of the method of B22, the second application is displayed with an additional selectable user interface element associated with a third application and the method further includes: detecting a selection of the additional selectable user interface element. In response to detecting the selection of the additional selectable user interface element, the method includes: (i) ceasing to display the second application, (ii) displaying the third application in the predefined portion, and (iii) displaying the first application in the additional portion.

(B24) In some embodiments of the method of B23, the method further includes: detecting a swipe gesture moving from the second edge of the touch-sensitive display towards the edge of the touch-sensitive display. In response to detecting the swipe gesture, the method includes: (i) ceasing to display the first application, (ii) displaying the second application overlaying the third application, and (iii) dimming the third application.

(B25) In some embodiments of the method of B24, the method further includes: detecting a contact within the dimmed third application. In response to detecting the contact, the method includes: (i) ceasing to display the second application, (ii) displaying the third application in the predefined portion, and (iii) displaying the first application in the additional portion.

(B26) In another aspect, an electronic device is provided. In some embodiments, the electronic device includes: a touch-sensitive display, one or more processors, and memory storing one or more programs, which when executed by the one or more processors cause the electronic device to perform the method described in any one of B1-B25.

(B27) In yet another aspect, an electronic device is provided and the electronic device includes: a touch-sensitive display and means for performing the method described in any one of B1-B25.

(B28) In still another aspect, a computer-readable storage medium (e.g., a non-transitory computer readable storage medium, or alternatively, a transitory computer readable storage medium) is provided. The computer-readable storage medium stores executable instructions that, when executed by an electronic device with a touch-sensitive display, cause the electronic device to perform the method described in any one of B1-B25.

(B29) In still one more aspect, a graphical user interface on an electronic device with a touch-sensitive display is provided. In some embodiments, the graphical user interface includes user interfaces displayed in accordance with the method described in any one of B1-B25.

(B30) In one additional aspect, an electronic device (with references to the electronic device 1400, FIG. 14) is provided that includes a display unit (e.g., display unit 1401), a touch-sensitive surface unit (e.g., touch-sensitive surface unit 1403), and a processing unit (e.g., processing unit 1405). The processing unit is coupled with the touch-sensitive surface unit and the display unit. In some embodiments, the display unit 1401 and the touch-sensitive surface unit 1403 are integrated in a single touch-sensitive display unit (referred to herein interchangeably as a touch-sensitive display and touch-sensitive display unit). In some embodiments, the processing unit includes a displaying unit (e.g., displaying unit 1407), a detecting unit (e.g., detecting unit 1409), a sliding unit (e.g., sliding unit 1411), a resizing unit (e.g., resizing unit 1413), a continuing unit (e.g., continuing unit 1415), a ceasing unit (e.g., ceasing unit 1417), an increasing unit (e.g., increasing unit 1419), and a dimming unit (e.g., dimming unit 1421). The processing unit is configured to: display (e.g., with the displaying unit 1307 and/or the touch-sensitive surface unit), in a full-screen mode on the touch-sensitive display unit, a first application including a first selectable user interface element associated with a second application; detect (e.g., with the detecting unit 1309) a selection of the first selectable user interface element. In response to detecting the selection of the first selectable user interface element, the processing is configured to: (i) display (e.g., with the displaying unit 1307 and/or the touch-sensitive surface unit) the second application, including content corresponding to the selectable user interface element, in a predefined portion of the touch-sensitive display unit and (ii) display (e.g., with the displaying unit 1307 and/or the touch-sensitive surface unit) the first application in an additional portion, distinct from the predefined portion, such that a combination of the predefined portion and the additional portion occupy substantially all of the touch-sensitive display unit.

(B31) In some embodiments of the electronic device of B30, displaying the second application in the predefined portion includes sliding (e.g., with the sliding unit 1411) the second application on to the touch-sensitive display unit in a first direction over the displayed first application until the second application occupies the predefined portion and the first application remains visible in the additional portion.

(B32) In some embodiments of the electronic device of any one of B30-B31, the additional portion includes a pin affordance that, when selected, causes the electronic device to pin the second application next to the first application on the touch-sensitive display unit.

(B33) In some embodiments of the electronic device of any one of B30-B32, the additional portion includes a promote affordance that, when selected, causes the electronic device to display the second application in the full-screen mode.

(B34) In some embodiments of the electronic device of any one of B32-B33, the processing unit is further configured to: detect (e.g., with the detecting unit 1409) a selection of the pin affordance. In response to detecting the selection of the pin affordance, the processing unit is configured to: resize (e.g., with the resizing unit 1413) the first and second applications to each occupy approximately 50% of the touch-sensitive display unit.

(B35) In some embodiments of the electronic device of B34, the first application includes an additional selectable user interface element associated with a third application and the processing unit is further configured to: detect (e.g., with the detecting unit 1409) a selection of the additional selectable user interface element. In response to detecting the selection of the additional selectable user interface element, the processing unit is configured to: display (e.g., with the displaying unit 1407 and/or the touch-sensitive surface unit) the third application in the space previously occupied by the first application.

(B36) In some embodiments of the electronic device of B34, the second application includes an additional selectable user interface element associated with a third application and the processing unit is further configured to: detect (e.g., with the detecting unit 1409) a selection of the additional selectable user interface element. In response to detecting the selection of the additional selectable user interface element, the processing unit is configured to: (i) continue (e.g., with the continuing unit 1415) to display the second application, (ii) cease (e.g., with the ceasing unit 1417) to display the first application, and (iii) display (e.g., with the displaying unit 1407 and/or the touch-sensitive surface unit) the third application in the space previously occupied by the first application.

(B37) In some embodiments of the electronic device of any one of B30-B33, the second application includes an additional selectable user interface element associated with a third application and the processing unit is further configured to: detect (e.g., with the detecting unit 1409) a selection of the additional selectable user interface element. In response to detecting the selection of the additional selectable user interface element, the processing unit is configured to: (i) cease (e.g., with the ceasing unit 1417) to display the second application, (ii) display (e.g., with the displaying unit 1407 and/or the touch-sensitive surface unit) the third application, including content corresponding to the additional selectable user interface element, in the predefined portion of the touch-sensitive display unit, and (iii) continue (e.g., with the continuing unit 1415) to display the first application in the additional portion between the edge of the touch-sensitive display unit and the predefined portion, such that the combination of the predefined portion and the additional portion occupy substantially all of the touch-sensitive display unit.

(B38) In some embodiments of the electronic device of any one of B30-B33, the second application includes an additional selectable user interface element associated with a third application and the processing unit is further configured to: detect (e.g., with the detecting unit 1409) a selection of the additional selectable user interface element. In response to detecting the selection of the additional selectable user interface element, the processing unit is configured to: (i) cease (e.g., with the ceasing unit 1417) to display the first application, (ii) display (e.g., with the displaying unit 1407 and/or the touch-sensitive surface unit) the third application, including content corresponding to the additional selectable user interface element, in the predefined portion of the touch-sensitive display unit, and (iii) display (e.g., with the displaying unit 1407 and/or the touch-sensitive surface unit) the second application in the additional portion between the edge of the touch-sensitive display unit and the predefined portion, such that the combination of the predefined portion and the additional portion occupy substantially all of the touch-sensitive display unit.

(B39) In some embodiments of the electronic device of any one of B30-B33, the second application includes an additional selectable user interface element associated with a third application and the processing unit is further configured to: detect (e.g., with the detecting unit 1409) a selection of the additional selectable user interface element. In response to detecting the selection of the additional selectable user interface element, the processing unit is configured to: (i) display (e.g., with the displaying unit 1407 and/or the touch-sensitive surface unit) the third application, including content corresponding to the additional selectable user interface element, in the predefined portion of the touch-sensitive display unit, (ii) display (e.g., with the displaying unit 1407 and/or the touch-sensitive surface unit) the first application in a first sub-portion of the additional portion between the edge of the touch-sensitive display unit and a second sub-portion of the additional portion, and (iii) display (e.g., with the displaying unit 1407 and/or the touch-sensitive surface unit) the second application in the second sub-portion of the additional portion, such that a combination of the predefined portion, the first sub-portion of the additional portion, and the second sub-portion of the additional portion occupy substantially all of the touch-sensitive display unit.

(B40) In some embodiments of the electronic device of B39, the processing unit is further configured to: detect (e.g., with the detecting unit 1409) a contact over the second sub-portion of the additional portion. While detecting the contact over the second sub-portion of the additional portion, the processing unit is configured to: increase (e.g., with the increasing unit 1419) a size of the additional portion, such that more of the first and second applications is visible on the touch-sensitive display unit.

(B41) In some embodiments of the electronic device of B40, the processing unit is further configured to: after increasing the size of the additional portion, detect (e.g., with the detecting unit 1409) a gesture dragging the second sub-portion of the additional portion towards the predefined portion and detect (e.g., with the detecting unit 1409) lift off of the gesture at the predefined portion. In response to detecting lift off of the gesture at the predefined portion, the processing unit is configured to: (i) display (e.g., with the displaying unit 1407 and/or the touch-sensitive display unit) the second application in the predefined portion, (ii) continue (e.g., with the continuing unit 1415) to display the first application in the first sub-portion of the additional portion, and (iii) display (e.g., with the displaying unit 1407 and/or the touch-sensitive display unit) the third application in the second sub-portion of the additional portion.

(B42) In some embodiments of the electronic device of B40, the processing unit is further configured to: after increasing the size of the additional portion and the second additional portion, detect (e.g., with the detecting unit 1409) a gesture dragging the second additional portion towards the predefined portion and detecting lift off of the gesture at the predefined portion. In response to detecting lift off of the gesture at the predefined portion, the processing unit is configured to: display (e.g., with the displaying unit 1407 and/or the touch-sensitive display unit) the second application in the full-screen mode.

(B43) In some embodiments of the electronic device of any one of B30-B42, the selectable user interface element associated with the second application is a notification displayed on top of the first application.

(B44) In some embodiments of the electronic device of any one of B30-B33 and B37, the processing unit is further configured to: detect (e.g., with the detecting unit 1409) a contact at the additional portion. In response to detecting the contact at the additional portion, the processing unit is configured to: cease (e.g., with the ceasing unit 1417) to display the second application and display the first application in the full-screen mode.

(B45) In some embodiments of the electronic device of B44, ceasing to display the second application includes sliding (e.g., with the sliding unit 1411) the second application off of the touch-sensitive display unit in a second direction, opposite the first direction.

(B46) In some embodiments of the electronic device of B30, the predefined portion of the touch-sensitive display unit is a central portion of the touch-sensitive display unit and the additional portion surrounds the central portion.

(B47) In some embodiments of the electronic device of B46, displaying the second application in the predefined portion includes displaying an additional selectable user interface element associated with a third application and the processing unit is further configured to: detect (e.g., with the detecting unit 1409) a selection of the additional selectable user interface element. In response to detecting the selection of the additional selectable user interface element, the processing unit is configured to: (i) slide (e.g., with the sliding unit 1411) the second application in a first direction towards the edge of the touch-sensitive display unit, (ii) slide (e.g., with the sliding unit 1411) the third application in the first direction on to the touch-sensitive display unit, such that the third application is displayed in the predefined portion and the second application remains visible next to the displayed third application, and (iii) continue (e.g., with the continuing unit 1415) to display the first application in the additional portion.

(B48) In some embodiments of the electronic device of B47, the processing unit is further configured to: detect (e.g., with the detecting unit 1409) a contact at the second application. In response to detecting the contact at the second application: (i) slide (e.g., with the sliding unit 1411) the second application in a second direction, opposite the first direction, until the second application again occupies that predefined portion, (ii) display (e.g., with the displaying unit 1407 and/or the touch-sensitive display unit) the third application in the space previously occupied by the second application, and (iii) continue (e.g., with the continuing unit 1415) to display the first application in the additional portion.

(B49) In some embodiments of the electronic device of B47, the processing unit is further configured to: detect (e.g., with the detecting unit 1409) a contact at the second application. In response to detecting the contact at the second application, the processing unit is configured to: display (e.g., with the displaying unit 1407 and/or the touch-sensitive display unit) the second application in the full-screen mode.

(B50) In some embodiments of the electronic device of B30, the processing unit is further configured to: detect (e.g., with the detecting unit 1409) a dragging gesture at a border between the predefined portion and the additional portion that moves the border to a predetermined location on the touch-sensitive display unit. Upon determining that the dragging gesture has moved the border to the predetermined location, the processing unit is configured to: resize (e.g., with the resizing unit 1413) the first and second applications to each occupy approximately 50% of the touch-sensitive display unit.

(B51) In some embodiments of the electronic device of B30, the processing unit is further configured to: detect (e.g., with the detecting unit 1409) a dragging gesture on top of the second application. In accordance with a determination that the dragging gesture has reached within a predetermined distance of a second edge, opposite the edge, of the touch-sensitive display unit, the processing unit is configured to: display (e.g., with the displaying unit 1407 and/or the touch-sensitive display unit) an application selector with a plurality of selectable affordances corresponding to applications available on the electronic device. The processing unit is further configured to: detect (e.g., with the detecting unit 1409) lift off of the dragging gesture over the application selector. In response to detecting the lift off of the dragging gesture, the processing unit is configured to: (i) display (e.g., with the displaying unit 1407 and/or the touch-sensitive display unit) the second application in the space previously occupied by the application selector and (ii) display (e.g., with the displaying unit 1407 and/or the touch-sensitive display unit) the first application in a remaining portion of the touch-sensitive display unit.

(B52) In some embodiments of the electronic device of B51, the second application is displayed with an additional selectable user interface element associated with a third application and the processing unit is further configured to: detect (e.g., with the detecting unit 1409) a selection of the additional selectable user interface element. In response to detecting the selection of the additional selectable user interface element, the processing unit is configured to: (i) cease (e.g., with the ceasing unit 1417) to display the second application, (ii) display (e.g., with the displaying unit 1407 and/or the touch-sensitive surface unit) the third application in the predefined portion, and (iii) display (e.g., with the displaying unit 1407 and/or the touch-sensitive surface unit) the first application in the additional portion.

(B53) In some embodiments of the electronic device of B52, the processing unit is further configured to: detect (e.g., with the detecting unit 1409) a swipe gesture moving from the second edge of the touch-sensitive display unit towards the edge of the touch-sensitive display unit. In response to detecting the swipe gesture, the processing unit is configured to: (i) cease (e.g., with the ceasing unit 1417) to display the first application, (ii) display (e.g., with the displaying unit 1407 and/or the touch-sensitive surface unit) the second application overlaying the third application, and (iii) dim (e.g., with the dimming unit 1421) the third application.

(B54) In some embodiments of the electronic device of B53, the processing unit is further configured to: detect a contact within the dimmed third application. In response to detecting the contact, the processing unit is configured to: (i) cease (e.g., with the ceasing unit 1417) to display the second application, (ii) display (e.g., with the displaying unit 1407 and/or the touch-sensitive surface unit) the third application in the predefined portion, and (iii) display (e.g., with the displaying unit 1407 and/or the touch-sensitive surface unit) the first application in the additional portion.

(C1) In accordance with some embodiments, a method is performed at an electronic device (e.g., portable multifunction device 100, FIG. 1A) with a touch-sensitive display (touch screen 112, FIG. 1C). The method includes: displaying a first application on the touch-sensitive display, the first application including a link to content that when activated displays the corresponding content; while the first application is displayed, detecting an input (e.g., touch gesture on a data detector) selecting the link; responsive to detecting the input, continuing to display the first application in a first portion of the touch-sensitive display (e.g., breadcrumb, sliver, ⅕ or ¼ of screen) and displaying a second application including the content corresponding to the link included in the first application, the second application displayed in a second portion of the touch-sensitive display that is wider than the first portion (e.g., ⅘ or ¾ of screen and, in some embodiments, the second application overlays the first application).

(C2) In some embodiments of the method of C1, the method further includes: detecting a contact on the first application displayed in the first portion of the touch-sensitive display; in accordance with detecting the contact: (i) ceasing to display the second application in the second portion of the touch-sensitive display and (ii) displaying the first application in an entirety of the touch-sensitive display.

(C3) In some embodiments of the method of C1, the method further includes: while the first application is displayed in the first portion and the second application is displayed in the second portion, detecting an input (e.g., swipe gesture from edge of touch-sensitive display) to display an application selector (e.g., mechanism that allows for selection of application for display in a multi-tasking view of the device); responsive to detecting the input, displaying the first application in the first portion of the touch-sensitive display, displaying the second application in a third portion that is narrower than the second portion, and displaying the application selector in a fourth portion of the touch-sensitive display, the application selector including a plurality of icons, each icon associated with a corresponding application; detecting a selection (e.g., a tap) of an icon from the plurality of icons included in the application selector; responsive to detecting the selection of the icon: (i) ceasing to display the application selector in the fourth portion of the touch screen display; and (ii) displaying a third application associated with the selected icon in an entirety of the fourth portion of the touch-sensitive display, the third application displayed in the entirety of the fourth portion concurrently with the display of the first application in the first portion and the second application in the third portion of the touch-sensitive display.

(C4) In some embodiments of the method of any one of C1 or C3, the method further includes: while the first application is displayed in the first portion and the second application is displayed in the second portion: (i) detecting a contact on the first application displayed in the first portion and on the second application displayed in the second portion (e.g., on a dividing line between the first application and second application) and (ii) detecting a continuous movement of the contact to a location toward a vertical edge of the touch-sensitive display bordering the second application, the continuous movement having a lateral component without the contact breaking contact with the touch-sensitive display; responsive to detecting the continuous movement is greater than a threshold distance (e.g., half the width of the touch-sensitive display): (i) ceasing to display the second application in the second portion; (ii) displaying the first application in a third portion of the touch-sensitive display that is wider than the first portion and displaying an application selector in a fourth portion of the touch-sensitive display (e.g., a default width such as ¼ of the touch screen display), the application selector including a plurality of icons, each icon associated with a corresponding application (e.g., third portion and fourth portion are non-overlapping and, in some embodiments, the third portion and fourth portions are horizontally adjacent to one another); detecting a selection (e.g., a tap) of an icon from the plurality of icons included in the application selector; responsive to detecting a selection of the icon: (i) ceasing to display the application selector in the fourth portion of the touch-sensitive display; and (ii) displaying a third application (e.g., side application) associated with the selected icon in an entirety of the fourth portion of the touch-sensitive display (e.g., side application is displayed in portion of the screen); responsive to detecting the continuous movement is less than the threshold distance: displaying a modified width of the first application and a modified width of the second application in accordance with the movement of the contact.

(C5) In some embodiments of the method of C1, the method further includes: while the first application is displayed in the first portion and the second application is displayed in the second portion: displaying a notification over a portion of the first application and over a portion of the second application; detecting a contact on the notification; responsive to detecting the contact: (i) ceasing to display the first application in the first portion and (ii) displaying the second application in the first portion of the touch-sensitive display (e.g., breadcrumb, sliver, ⅕ or ¼ of screen) and displaying the notification in the second portion of the touch-sensitive display that is wider than the first portion.

(C6) In some embodiments of the method of C1, the method further includes: while the first application is displayed in the first portion and the second application is displayed in the second portion: displaying a notification over a portion of the first application and over a portion of the second application; detecting a gesture (e.g., dragging and dropping the notification on the second portion) to display the notification in the second portion of the touch-sensitive display; and responsive to detecting the gesture: (i) ceasing to display the second application in the second portion; and (ii) displaying the notification in the second portion and displaying the application in the first portion.

(C7) In another aspect, an electronic device is provided. In some embodiments, the electronic device includes: a touch-sensitive display, one or more processors, and memory storing one or more programs, which when executed by the one or more processors cause the electronic device to perform the method described in any one of C1-C6.

(C8) In yet another aspect, an electronic device is provided and the electronic device includes: a touch-sensitive display and means for performing the method described in any one of C1-C6.

(C9) In still another aspect, a computer-readable storage medium (e.g., a non-transitory computer readable storage medium, or alternatively, a transitory computer readable storage medium) is provided. The computer-readable storage medium stores executable instructions that, when executed by an electronic device with a touch-sensitive display, cause the electronic device to perform the method described in any one of C1-C6.

(C10) In still one more aspect, a graphical user interface on an electronic device with a touch-sensitive display is provided. In some embodiments, the graphical user interface includes user interfaces displayed in accordance with the method described in any one of C1-C6.

(C11) In one additional aspect, an electronic device (with references to the electronic device 1400, FIG. 14) is provided that includes a display unit (e.g., display unit 1401), a touch-sensitive surface unit (e.g., touch-sensitive surface unit 1403), and a processing unit (e.g., processing unit 1405). The processing unit is coupled with the display unit and the touch-sensitive surface unit. In some embodiments, the display unit 1401 and the touch-sensitive surface unit 1403 are integrated in a single touch-sensitive display unit (referred to herein interchangeably as a touch-sensitive display and touch-sensitive display unit). The processing unit includes a displaying unit (e.g., displaying unit 1407), a detecting unit (e.g., detecting unit 1409), a sliding unit (e.g., sliding unit 1411), a resizing unit (e.g., resizing unit 1413), a continuing unit (e.g., continuing unit 1415), a ceasing unit (e.g., ceasing unit 1417), an increasing unit (e.g., increasing unit 1419), and a dimming unit (e.g., dimming unit 1421). The processing unit is configured to: display (e.g., with the displaying unit 1407) a first application on the touch-sensitive display unit, the first application including a link to content that when activated displays the corresponding content; while the first application is displayed, detect (e.g., with the detecting unit 1409) an input selecting the link; responsive to detecting the input, continue (e.g., with the continuing unit 1415) to display the first application in a first portion of the display unit and display (e.g., with the displaying unit 1407 and/or the touch-sensitive display unit) a second application including the content corresponding to the link included in the first application, the second application displayed in a second portion of the touch-sensitive display unit that is wider than the first portion. In some embodiments of the electronic device of C11, the processing unit (or one or more components thereof, such as displaying unit 1407, detecting unit 1409, sliding unit 1411, resizing unit 1413, continuing unit 1415, ceasing unit 1417, increasing unit 1419, and dimming unit 1421, FIG. 14) is (are) further configured to perform the method described in any one of C2-C6.

Thus, electronic devices with displays, touch-sensitive surfaces and optionally one or more sensors to detect intensities of contacts made with the touch-sensitive surface, are provided with faster, more efficient methods and interfaces for navigating between applications with linked content, thereby increasing the effectiveness, efficiency, and user satisfaction with such devices. Such methods and interfaces may complement or replace conventional methods for efficiently navigating between applications with linked content.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments section below, in conjunction with the following drawings in which like reference numerals refer to corresponding parts throughout the drawings.

FIGS. 3A-3G are flowcharts depicting methods of navigating between applications with linked content, in accordance with some embodiments.

FIGS. 4A-4I are schematics of a touch-sensitive display used to illustrate navigation between applications with linked content in both full-screen and shared screen modes, in accordance with some embodiments.

FIGS. 11A-11D are flowcharts depicting methods of navigating between applications with linked content, in accordance with some embodiments.

FIGS. 12A-12I are schematics of a touch-sensitive display used to illustrate additional user interfaces for navigating between applications within linked content in both full-screen and shared screen modes, in accordance with some embodiments.

DESCRIPTION OF EMBODIMENTS

Many applications on electronic devices include content that is linked to (or associated with) a different application on the electronic device. For example, a web browser application may include a link to a document that is readable by a different application, such as a word processing application. After clicking on the link to the document and interacting with the document in the word processing application, the user may wish to return to the web browser application. Some methods for navigating between applications with linked content require multiple inputs from a user in order to return to the web browser application (e.g., the user returns to a home screen page with a first input, locates an icon associated with the web browser application with one or more second inputs, and then selects the icon associated with the web browser with a third input). In the embodiments described herein, an improved method for navigating between applications with linked content is achieved by continuing to display an indication corresponding to the previously-used application (e.g., an affordance or a partial view of the previously-used application's content). The indication corresponding to the previously-used application is displayed after selection of the link (e.g., the link to the document in the current example), so that the user is able to quickly return to the previously-used application by simply clicking on the indication. This method streamlines processes for navigating between applications with linked content by providing users with a single-input mechanism for returning to a previously-used application, thereby eliminating the need for extra steps to both locate and access a previously-used application.

Figure 1A:
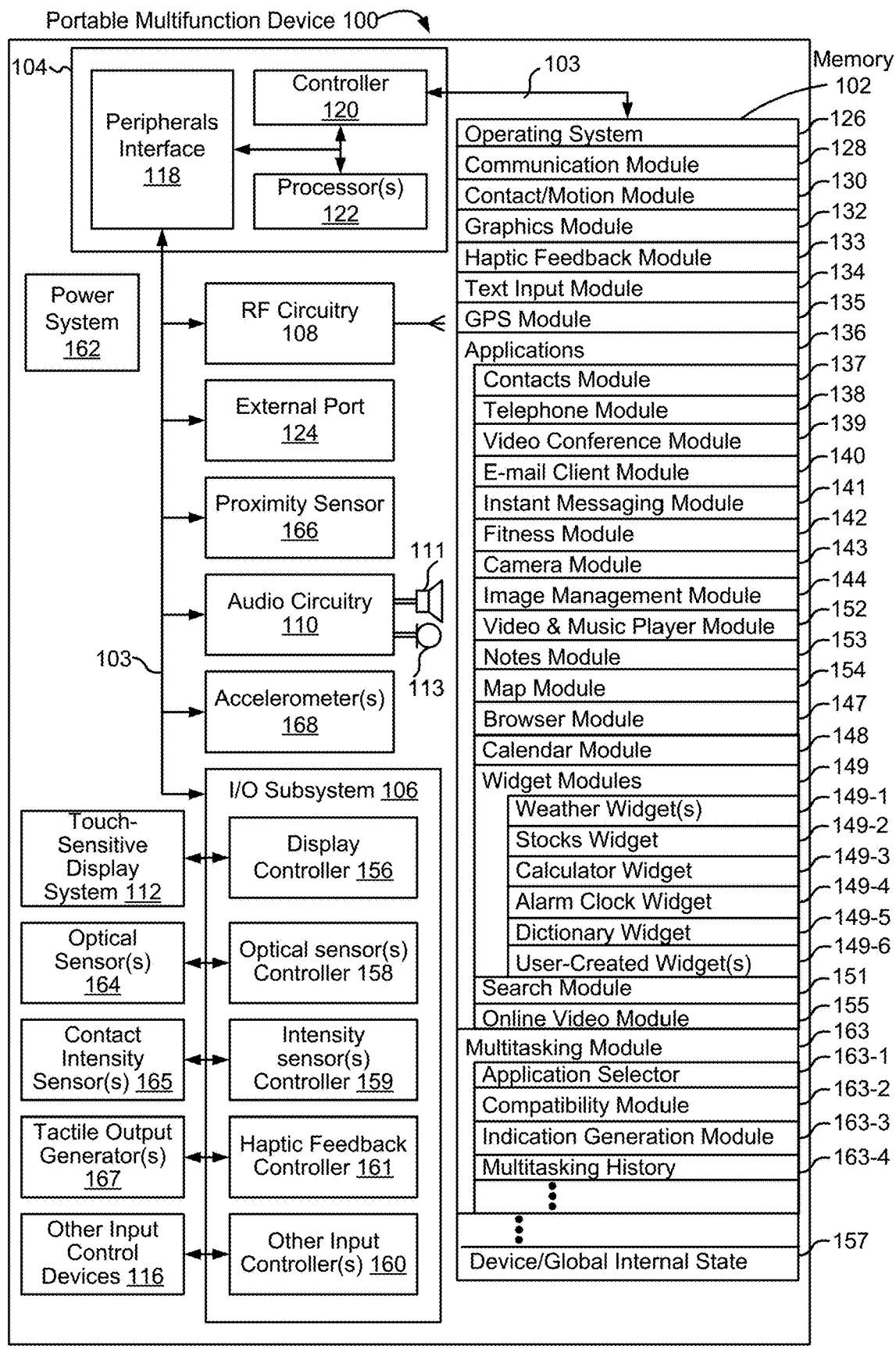
FIG. 1A is a high-level block diagram of a computing device with a touch-sensitive display, in accordance with some embodiments.
Figure 1B:
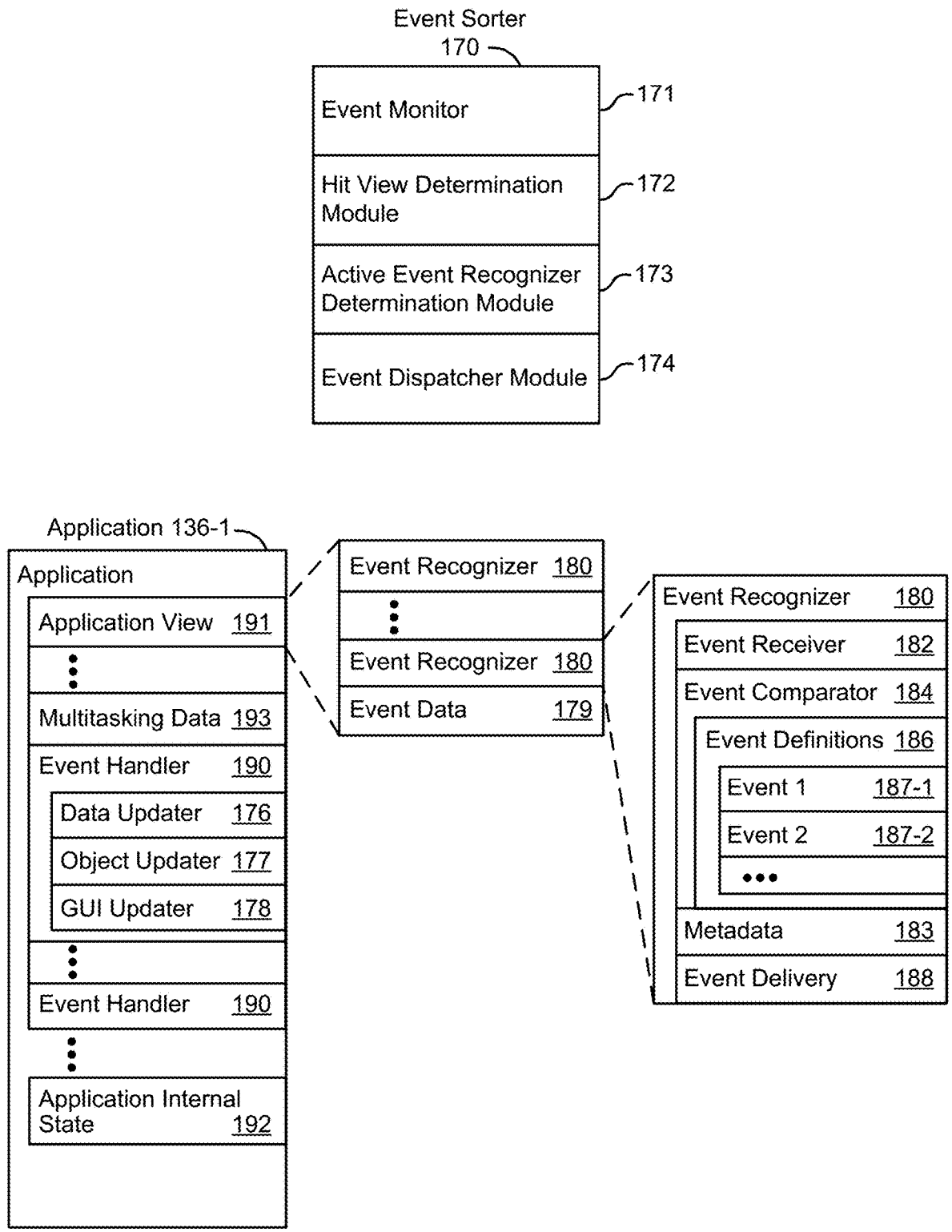
FIG. 1B is a block diagram of exemplary components for event handling, in accordance with some embodiments.
Figure 2:
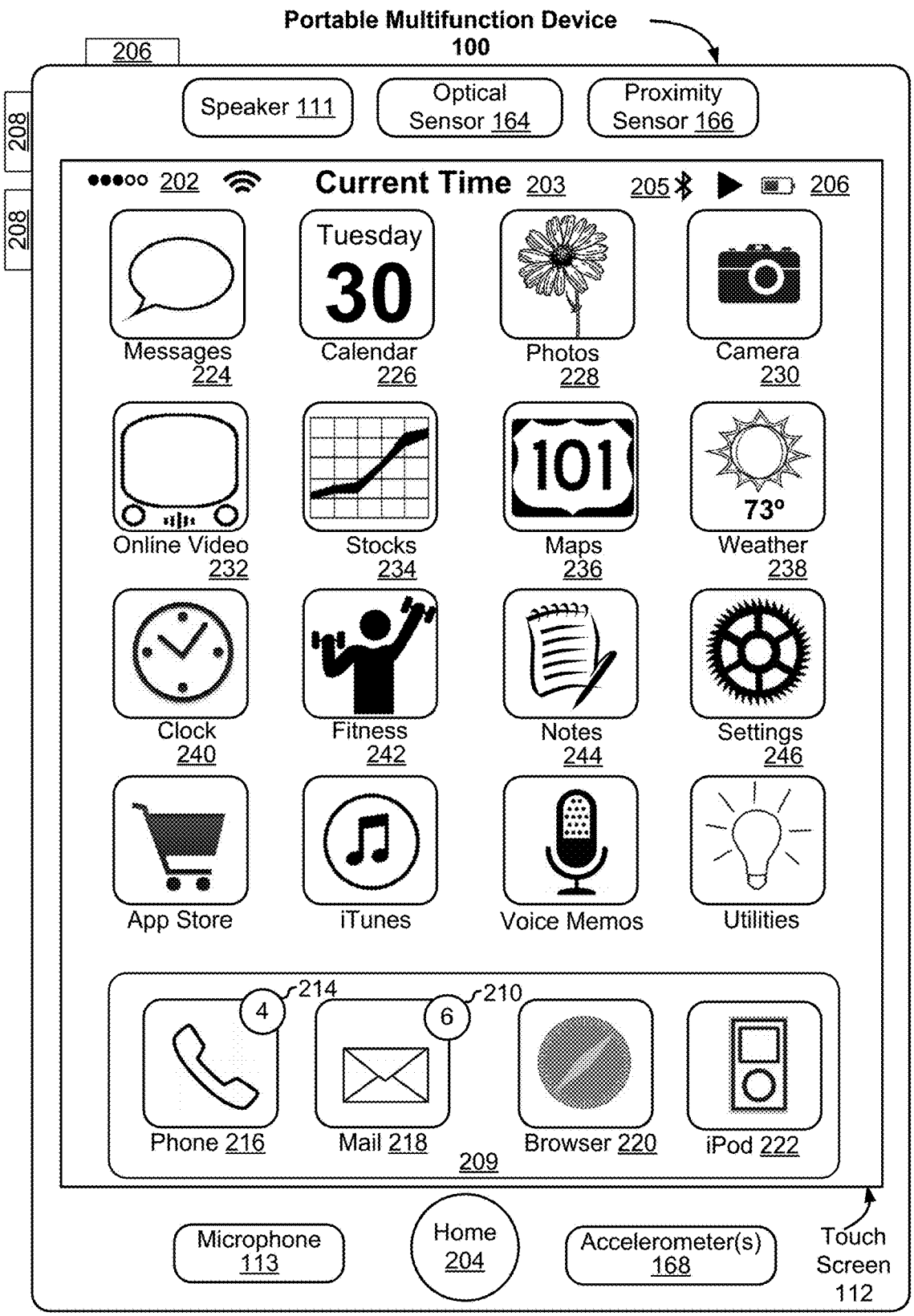
FIG. 2 is a schematic of a touch screen used to illustrate a user interface for a menu of applications, in accordance with some embodiments.
Figure 12A:
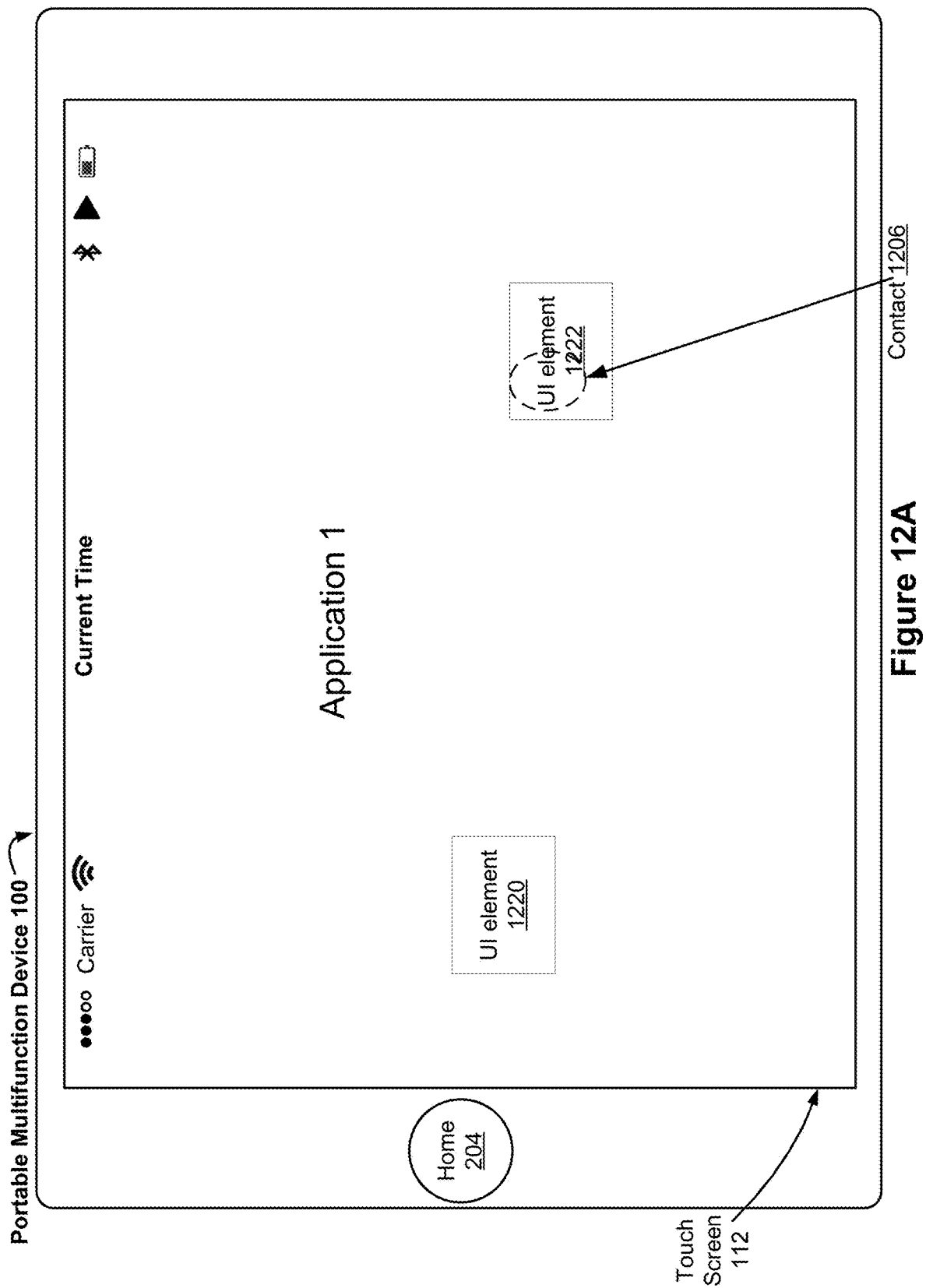
Figure 12B:
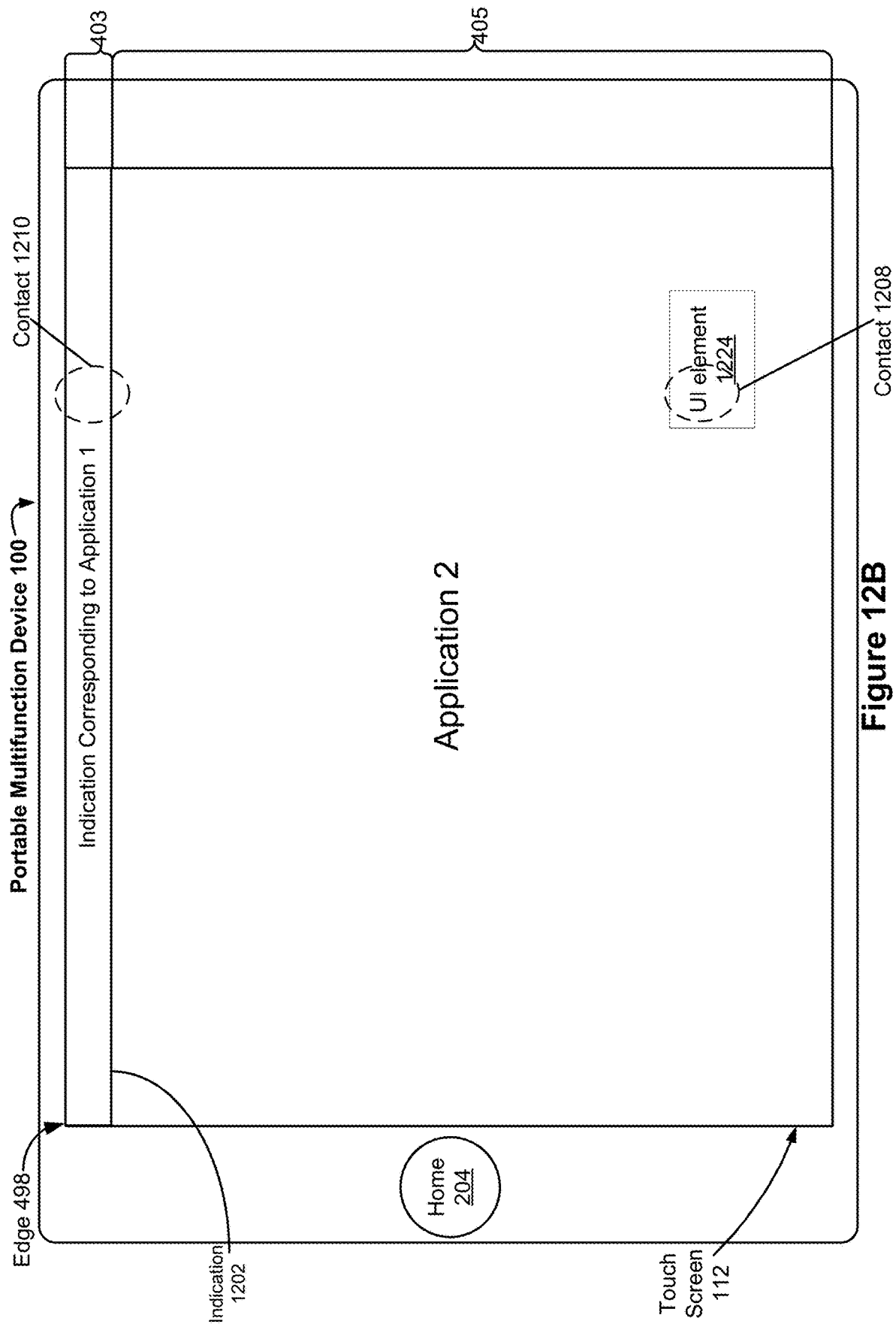
Figure 12C:
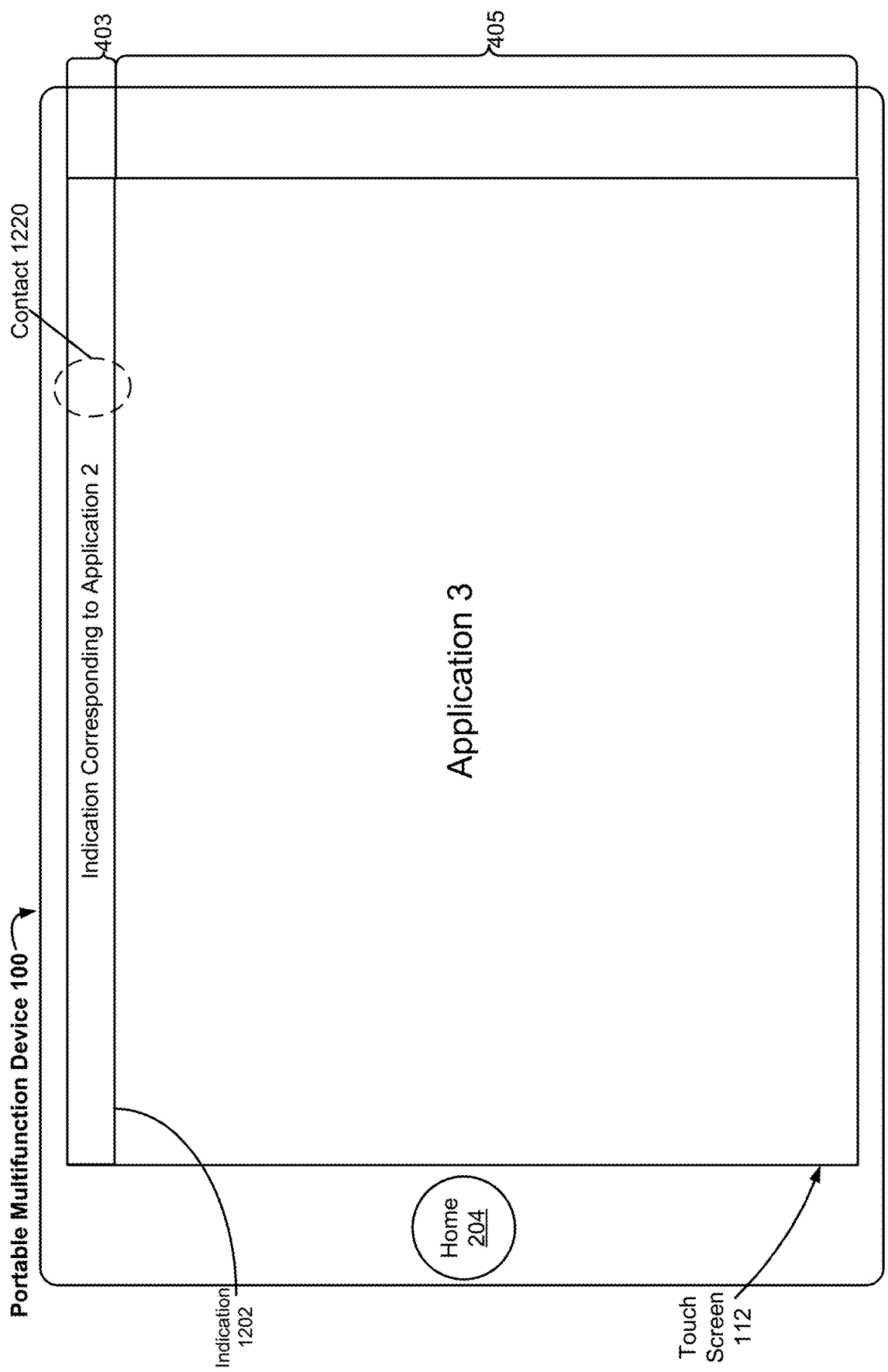
Figure 13:
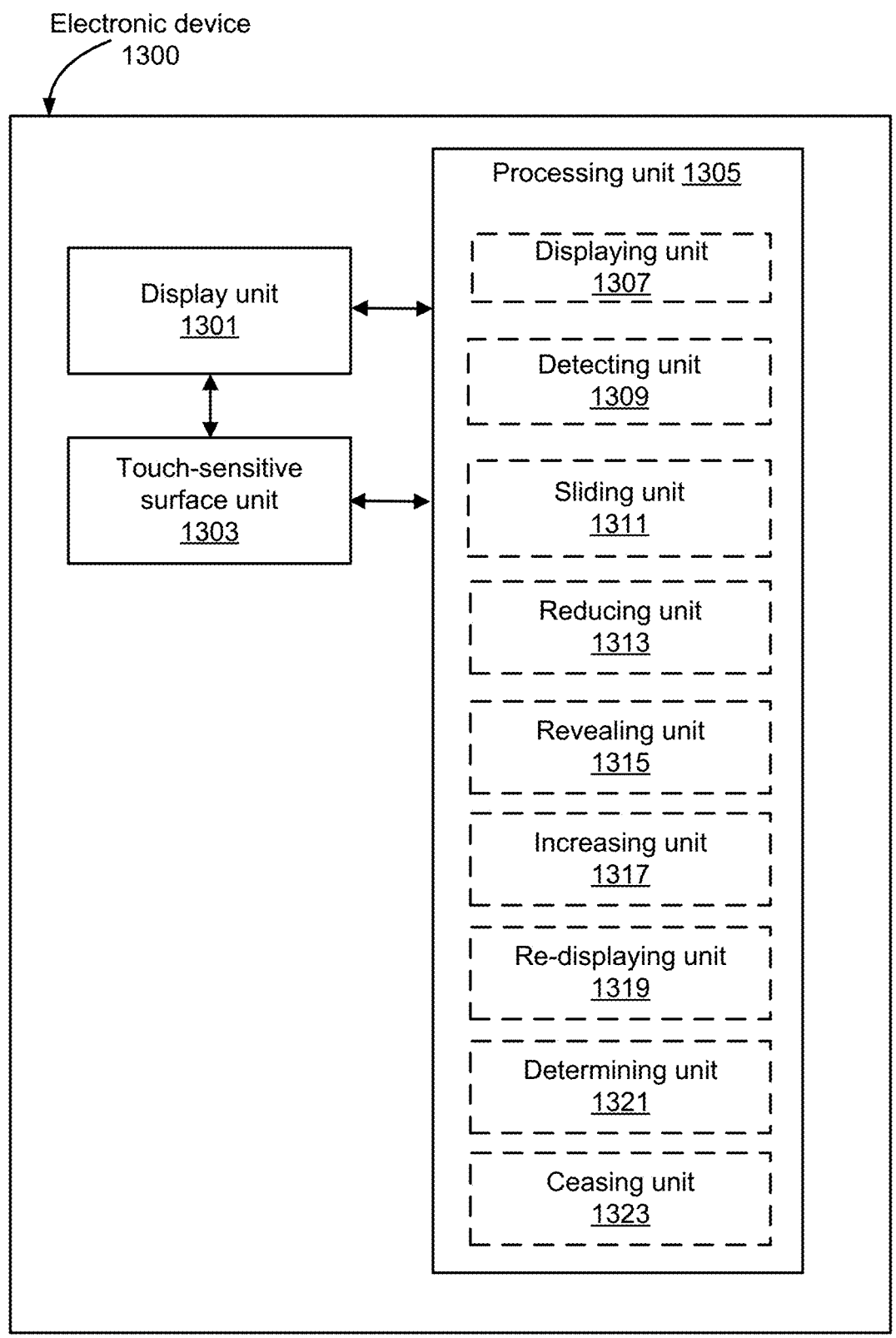
FIGS. 13 and 14 are functional block diagrams of an electronic device, in accordance with some embodiments.
Figure 14:
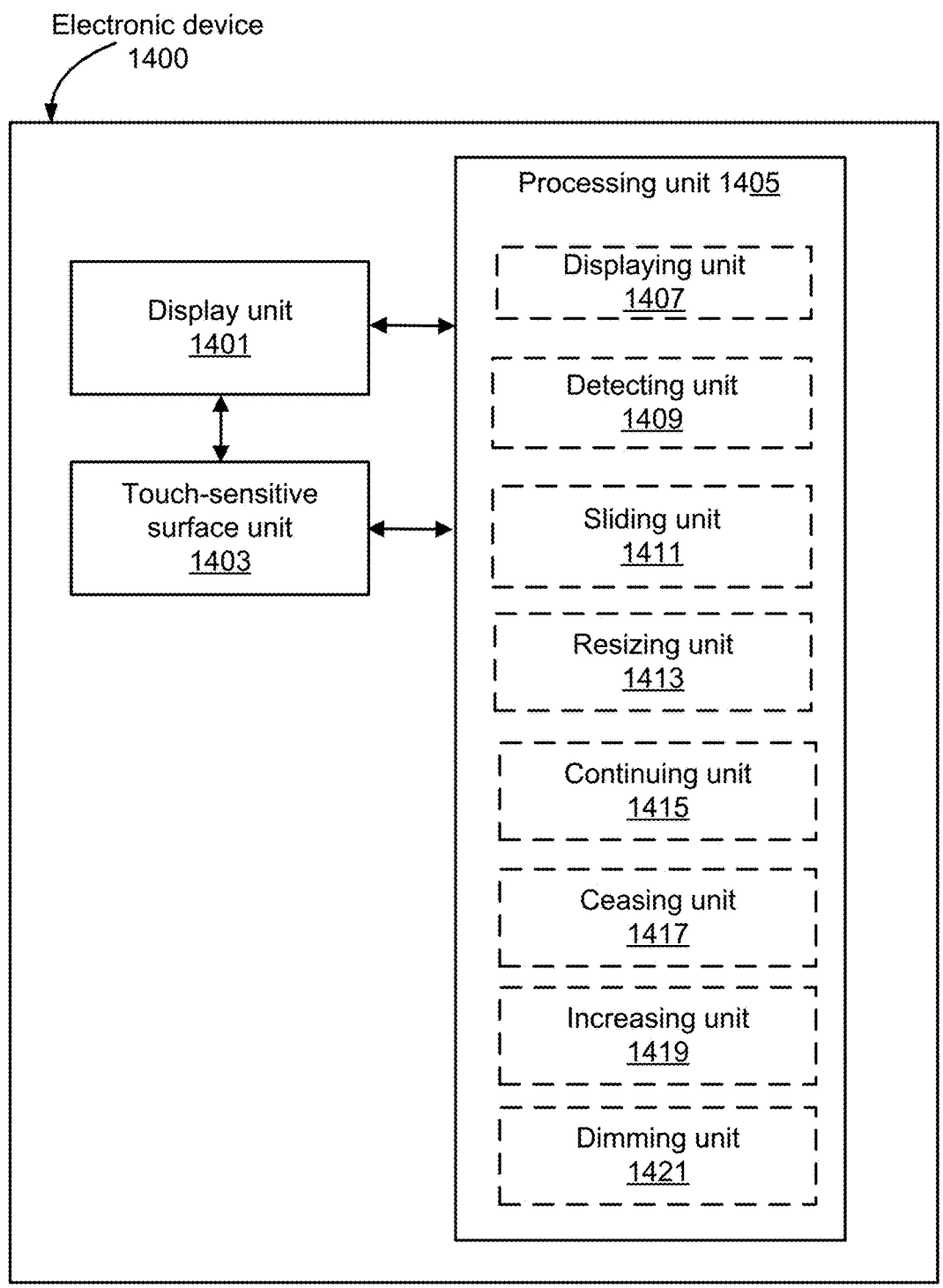

Below, FIGS. 1A-1B and 2 provide a description of exemplary devices. FIGS. 13 and 14 provide functional block diagrams of exemplary electronic devices. FIGS. 3A-3G are flowcharts depicting methods of navigating between applications with linked content. FIGS. 4A-4I, 5A-5L, 6A-6B, 7A-7B, 8A-8B, 9A-9B, and 10A-10B are schematics of a touch-sensitive display used to illustrate exemplary user interfaces and gestures for navigating between applications with linked content. FIGS. 11A-11D are flowcharts depicting methods of navigating between applications with linked content. FIGS. 12A-12I are schematics of touch-sensitive display used to illustrate additional user interfaces for navigating between applications with linked content. FIGS. 4A-4I, 5A-5L, 6A-6B, 7A-7B, 8A-8B, 9A-9B, and 10A-10B are used to illustrate the methods and/or processes of FIGS. 3A-3G. FIGS. 12A-12I are used to illustrate the methods and/or processes of FIGS. 11A-11D.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The disclosure herein interchangeably refers to detecting a touch input on, at, over, on top of, or substantially within a particular user interface element or a particular portion of a touch-sensitive display. As used herein, a touch input that is detected "at" a particular user interface element could also be detected "on," "over," "on top of," or "substantially within" that same user interface element, depending on the context. In some embodiments and as discussed in more detail below, desired sensitivity levels for detecting touch inputs are configured by a user of an electronic device (e.g., the user could decide (and configure the electronic device to operate) that a touch input should only be detected when the touch input is completely within a user interface element).

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the IPHONE®, IPOD TOUCH®, and IPAD® devices from APPLE Inc. of Cupertino, Calif. Other portable electronic devices, such as laptops or tablet computers with touch-sensitive surfaces (e.g., touch-sensitive displays and/or touch pads), are, optionally, used. It should also be understood that, in some embodiments, the device is not a portable communications device, but is a desktop computer with a touch-sensitive surface (e.g., a touch-sensitive display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a fitness application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable electronic devices with touch-sensitive displays. FIG. 1A is a block diagram illustrating portable multifunction device 100 (also referred to interchangeably herein as electronic device 100 or device 100) with touch-sensitive display 112 in accordance with some embodiments. Touch-sensitive display 112 is sometimes called a "touch screen" for convenience, and is sometimes known as or called a touch-sensitive display system. Device 100 includes memory 102 (which optionally includes one or more computer-readable storage mediums), controller 120, one or more processing units (CPU's) 122, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or a touchpad of device 100). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as a "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory (e.g., DRAM, SRAM, DDR RAM or other random access solid state memory devices) and optionally also includes non-volatile memory, such as one or more magnetic disk storage devices, flash memory devices, or other non-volatile solid-state memory devices. Memory 102 optionally includes one or more storage devices remotely located from processor(s) 122. Access to memory 102 by other components of device 100, such as CPU 122 and the peripherals interface 118, is, optionally, controlled by controller 120.

Peripherals interface 118 can be used to couple input and output peripherals of the device to CPU 122 and memory 102. The one or more processors 122 run or execute various software programs and/or sets of instructions stored in memory 102 to perform various functions for device 100 and to process data.

In some embodiments, peripherals interface 118, CPU 122, and controller 120 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, and/or Wireless Fidelity (Wi-Fi) (e.g., IEEE 802.1 1a, IEEE 802.1 1b, IEEE 802.11 g and/or IEEE 802.1 1n).

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack. The headset jack provides an interface between audio circuitry 110 and removable audio input/output peripherals, such as output-only headphones or a headset with both output (e.g., a headphone for one or both ears) and input (e.g., a microphone).

I/O subsystem 106 connects input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons optionally include an up/down button for volume control of speaker 111 and/or microphone 113. The one or more buttons optionally include a push button.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, a sensor or a set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to an area under a finger of the user.

Touch screen 112 optionally uses LCD (liquid crystal display) technology, LPD (light emitting polymer display) technology, or LED (light emitting diode) technology, or OLED (organic light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the IPHONE®, IPOD TOUCH®, and IPAD® from APPLE Inc. of Cupertino, Calif.

Touch screen 112 optionally has a video resolution in excess of 400 dpi. In some embodiments, touch screen 112 has a video resolution of at least 600 dpi. In other embodiments, touch screen 112 has a video resolution of at least 1000 dpi. The user optionally makes contact with touch screen 112 using any suitable object or digit, such as a stylus or a finger. In some embodiments, the user interface is designed to work primarily with finger-based contacts and gestures. In some embodiments, the device translates the finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)), and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen 112 on the front of the device, so that the touch-sensitive display is enabled for use as a viewfinder for still and/or video image acquisition. In some embodiments, another optical sensor is located on the front of the device so that the user's image is, optionally, obtained for videoconferencing while the user views the other video conference participants on the touch-sensitive display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/0 subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch-sensitive display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIG. 1A. Device/global internal state 157 includes one or more of: active application state, indicating which applications, if any, are currently active; display state, indicating what applications, views or other information occupy various regions of touch-sensitive display 112; sensor state, including information obtained from the device's various sensors and input control devices 116; and location information concerning the device's location and/or attitude (i.e., orientation of the device). In some embodiments, device/global internal state 157 communicates with multitasking module 163 to keep track of applications activated in a multitasking mode (also referred to as a shared screen view, shared screen mode, or multitask mode). In this way, if device 100 is rotated from portrait to landscape display mode, multitasking module 163 is able to retrieve multitasking state information (e.g., display areas for each application in the multitasking mode) from device/global internal state 157, in order to reactivate the multitasking mode after switching from portrait to landscape.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on some embodiments of IPOD devices from APPLE Inc. In other embodiments, the external port is a multi-pin (e.g., 8-pin) connector that is the same as, or similar to and/or compatible with the 8-pin connector used in LIGHTNING connectors from APPLE Inc.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has selected or "clicked" on an affordance). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-sensitive display can be set to any of a large range of predefined thresholds values without changing the trackpad or touch-sensitive display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and, in some embodiments, subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including without limitation text, web pages, icons (such as user-interface objects including soft keys), digital images, videos, animations and the like.

Figure 4A:
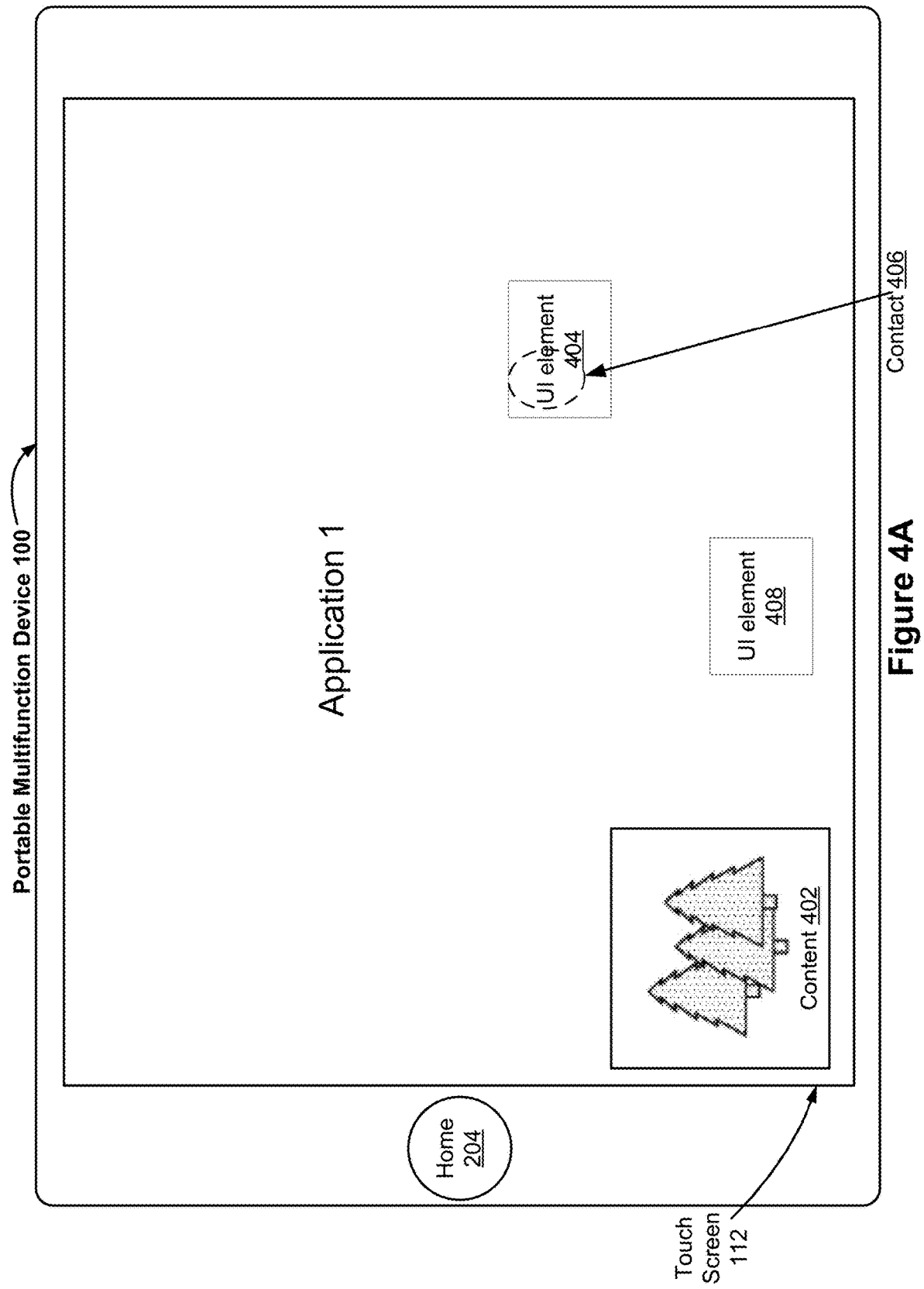
Figure 4B:
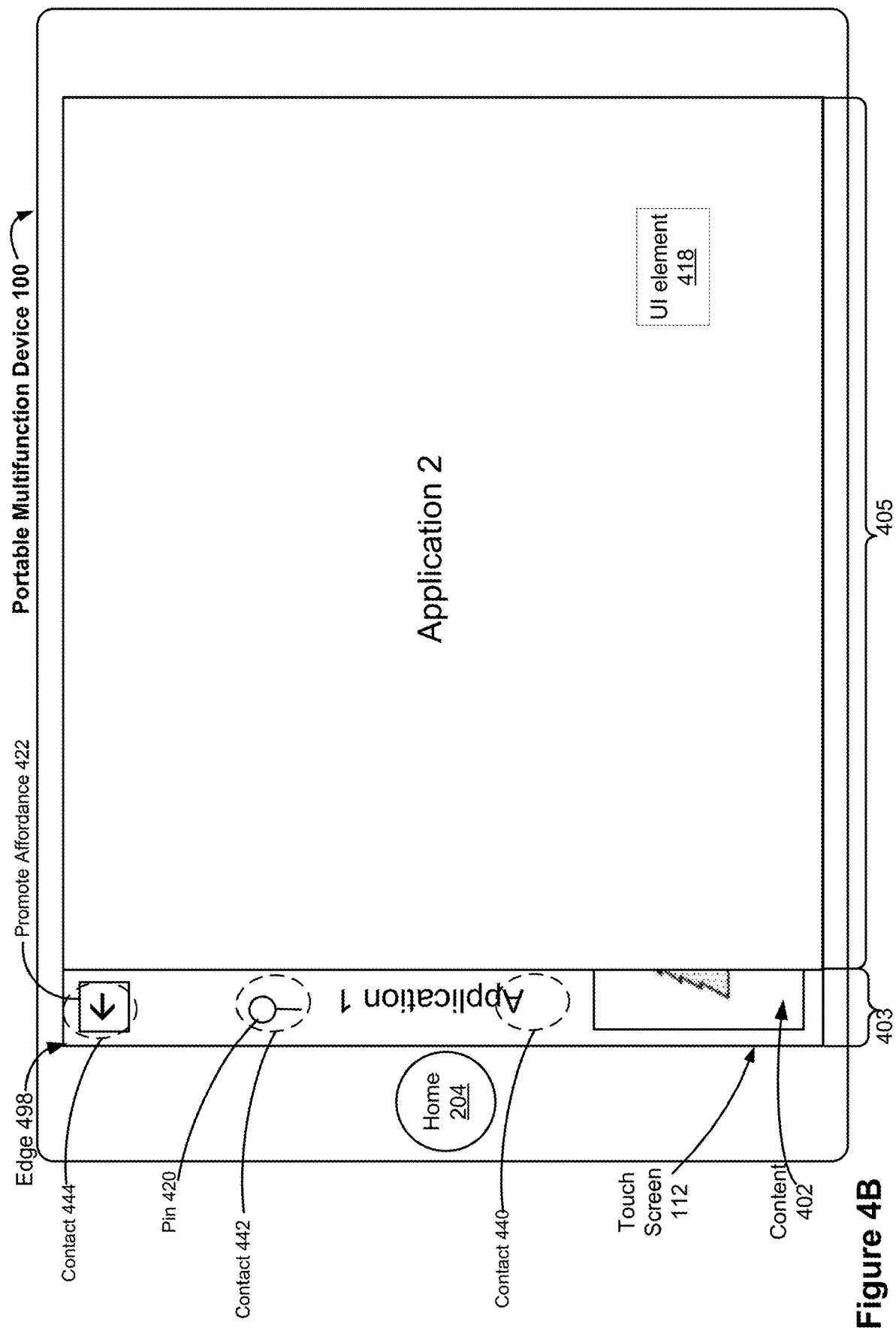
Figure 4E:
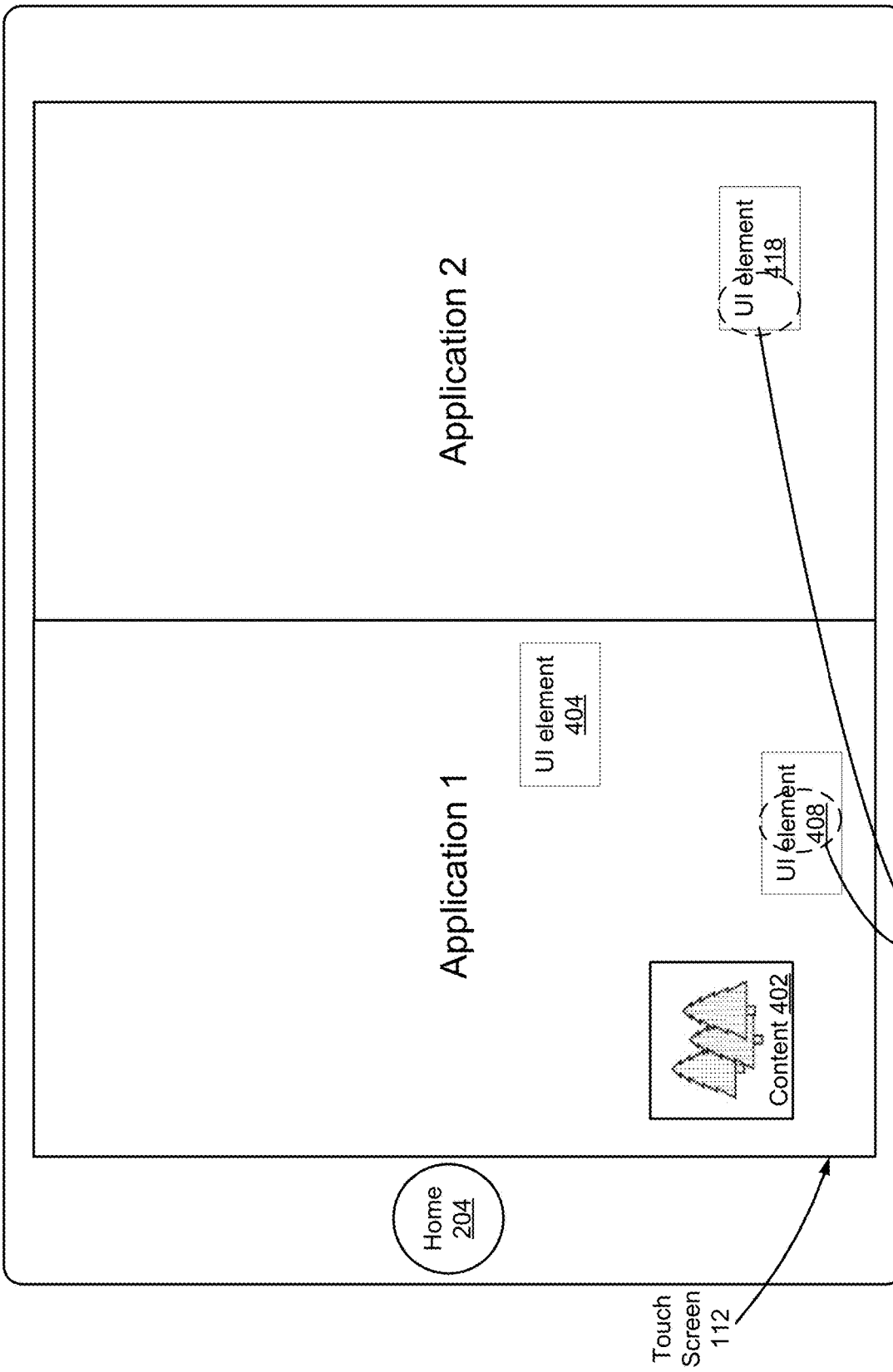

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinating data and other graphic property data, and then generates screen image data to output to display controller 156. In some embodiments, graphics module 132 retrieves graphics stored with multitasking data 193 of each application 136 (FIG. 1B). In some embodiments, multitasking data 193 stores multiple graphics of different sizes, so that an application is capable of quickly resizing while in a multi-tasking mode (e.g., as a side application, a main application, or within a predefined or an additional portion). In some embodiments, a main application is displayed in a shared screen view with a side application (e.g., as shown in FIG. 4E, application 1 is the main application and application 2 is the side application). In some embodiments, the main application is capable of being resized to occupy greater than 50% (e.g., 67% or 75%) of available display area of the touch screen 112, while the side application is only capable of being resized until it occupies 50% of the available display are of the touch screen 112 (e.g., the side application can only be displayed such that it occupies 25%, 33%, or 50% of the touch screen 112). Additionally, in some embodiments, the main application remains displayed while a user selects different side applications (as discussed below with reference to FIGS. 4G and 4H).

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications ("apps") 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- fitness module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, website creation applications, disk authoring applications, spreadsheet applications, JAVA-enabled applications, encryption, digital rights management, voice recognition, widget creator module for making user-created widgets 149-6, and voice replication.

In conjunction with touch screen 112, display controller 156, contact module 130, graphics module 132, and text input module 134, contacts module 137 is, optionally, used to manage an address book or contact list (e.g., stored in contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact module 130, graphics module 132, and text input module 134, telephone module 138 is, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files, and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and video and music player module 146, fitness module 142 includes executable instructions to create workouts (e.g., with time, distance, and/or calorie burning goals), communicate with workout sensors (sports devices such as a watch or a pedometer), receive workout sensor data, calibrate sensors used to monitor a workout, select and play music for a workout, and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, a widget creator module (not pictured) is, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an IPOD from APPLE Inc.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 is, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

As pictured in FIG. 1A, portable multifunction device 100 also includes a multitasking module 163 for managing multitasking operations on device 100 (e.g., communicating with graphics module 132 to retrieve or determine display areas for concurrently displayed applications (e.g., applications displayed in a shared screen view)). In some embodiments, managing multitasking operations includes displaying a first application in a predefined portion of touch screen 112 and displaying a second application in an additional portion that is adjacent to the predefined portion. In some embodiments, the predefined portion is a portion of touch screen 112 that is established by a manufacturer of the device 100. In some embodiments, the predefined portion is a substantial majority of the touch screen 112, other than a thin strip (or gutter or sliver) that runs the length of an edge (e.g., a leftmost edge 498, FIG. 4B) of the touch screen 112 (e.g., application 2 of FIG. 4B is displayed in an exemplary predefined portion 405 and application 1 of FIG. 4B is displayed in an exemplary additional portion 403). In some embodiments, the additional portion 403 includes content corresponding to an application (e.g., the additional portion displays an active view or a representation of an active view of content associated with the application, e.g., the additional portion 403 corresponding to application 1 in FIG. 4B displays a sliver of the content for application 1 that is visible beneath overlaid application 2 in the predefined portion 405).

Figure 12D:
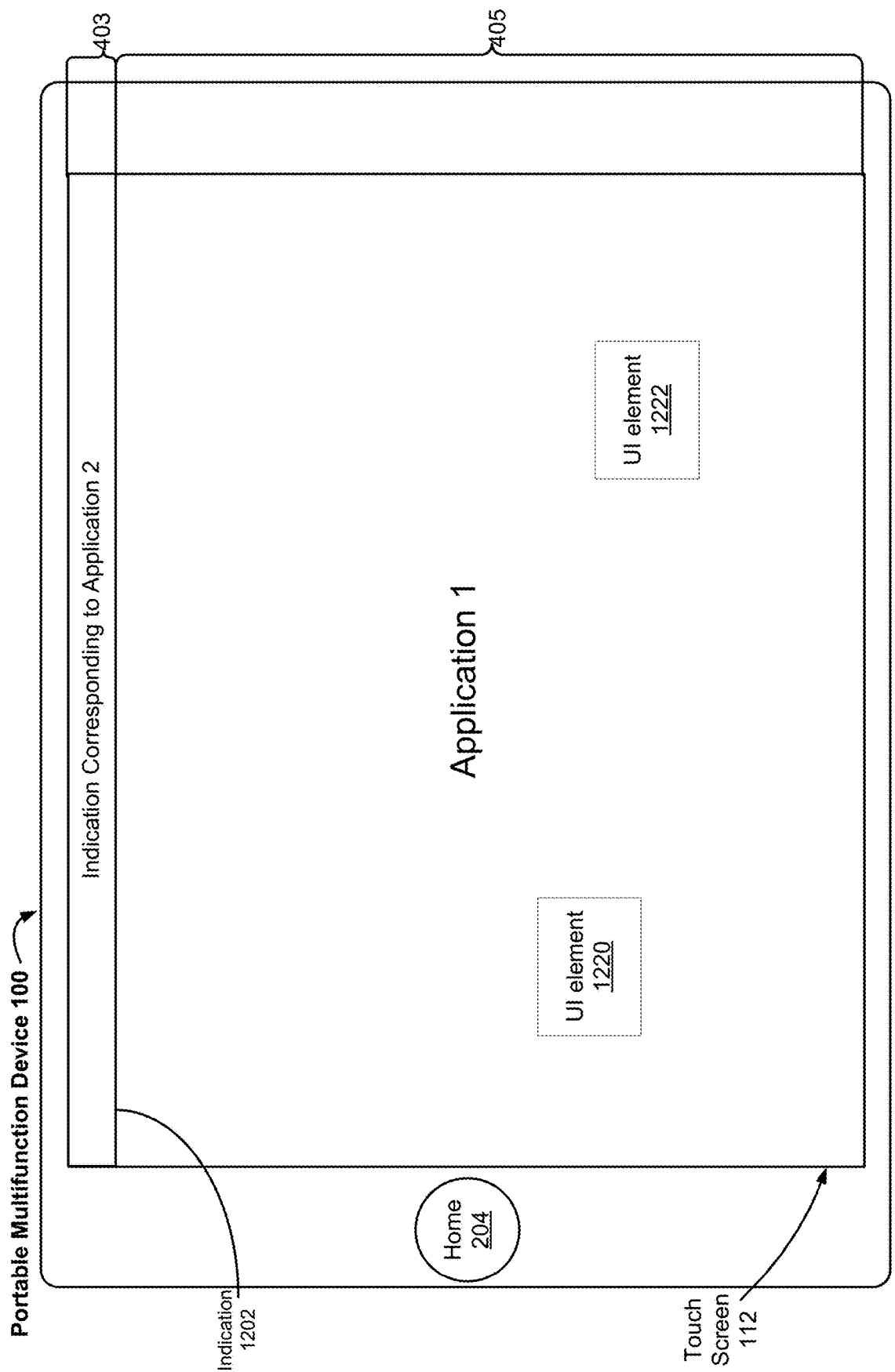
Figure 12F:
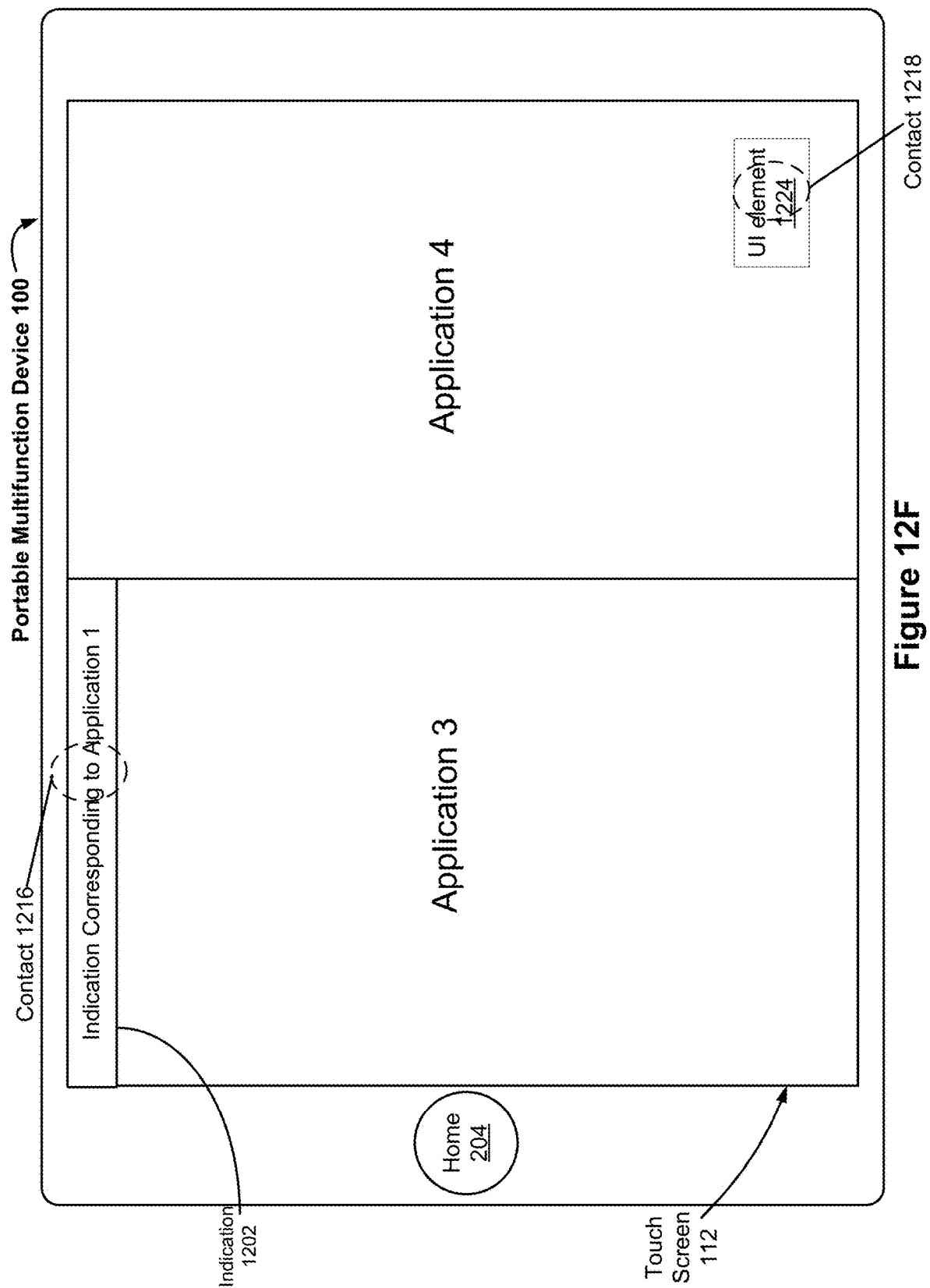
Figure 12G:
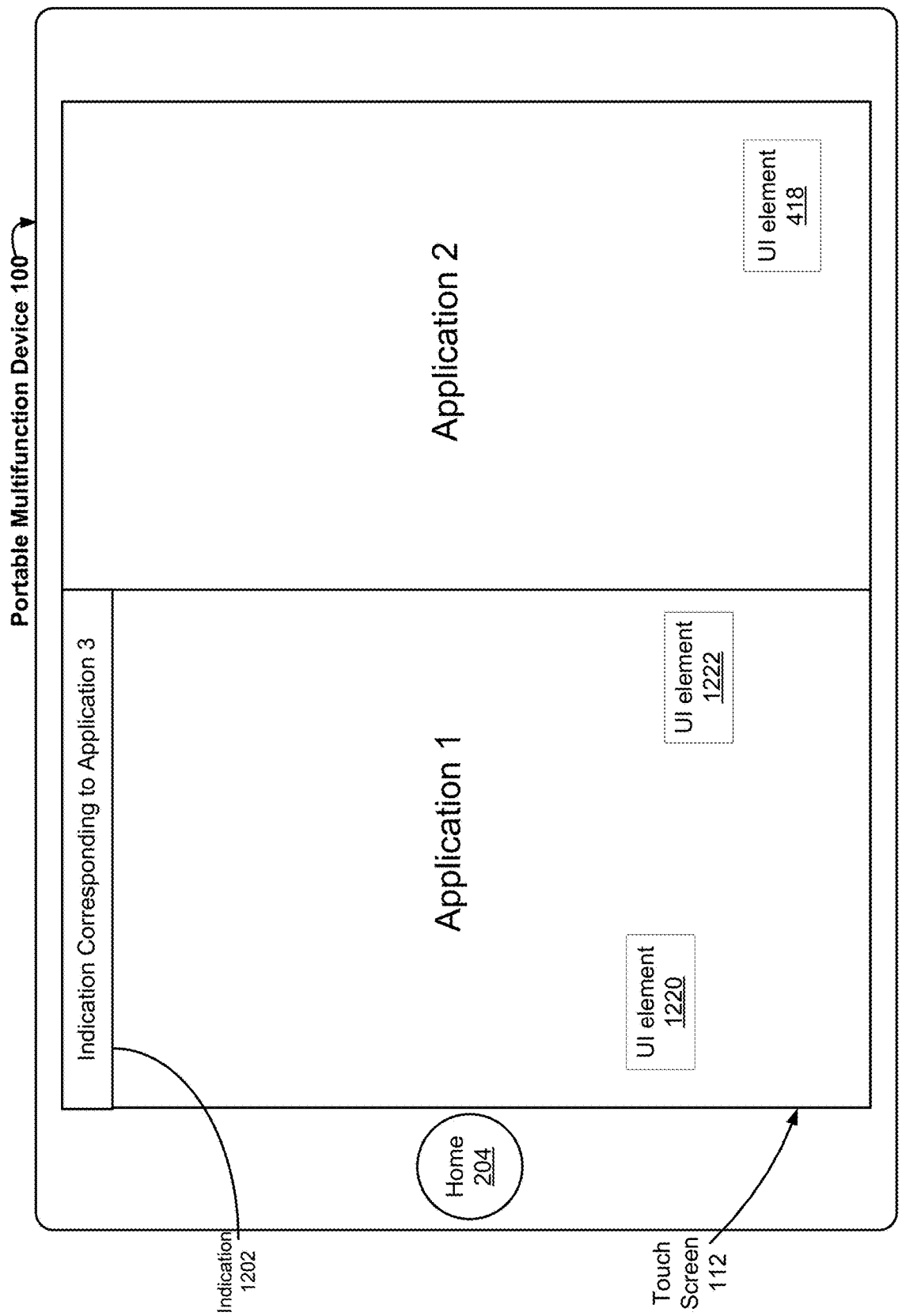
Figure 12H:
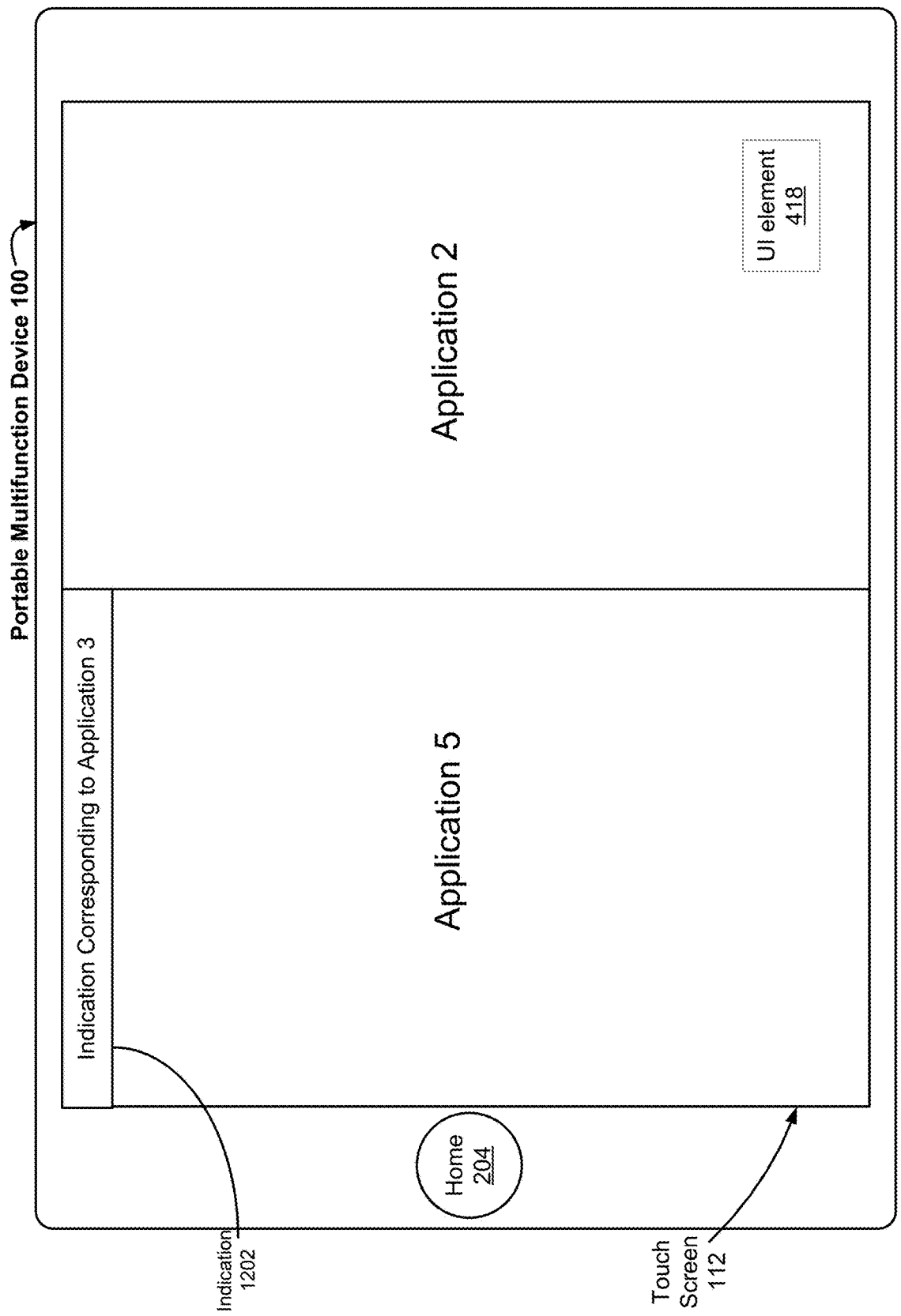
Figure 12I:
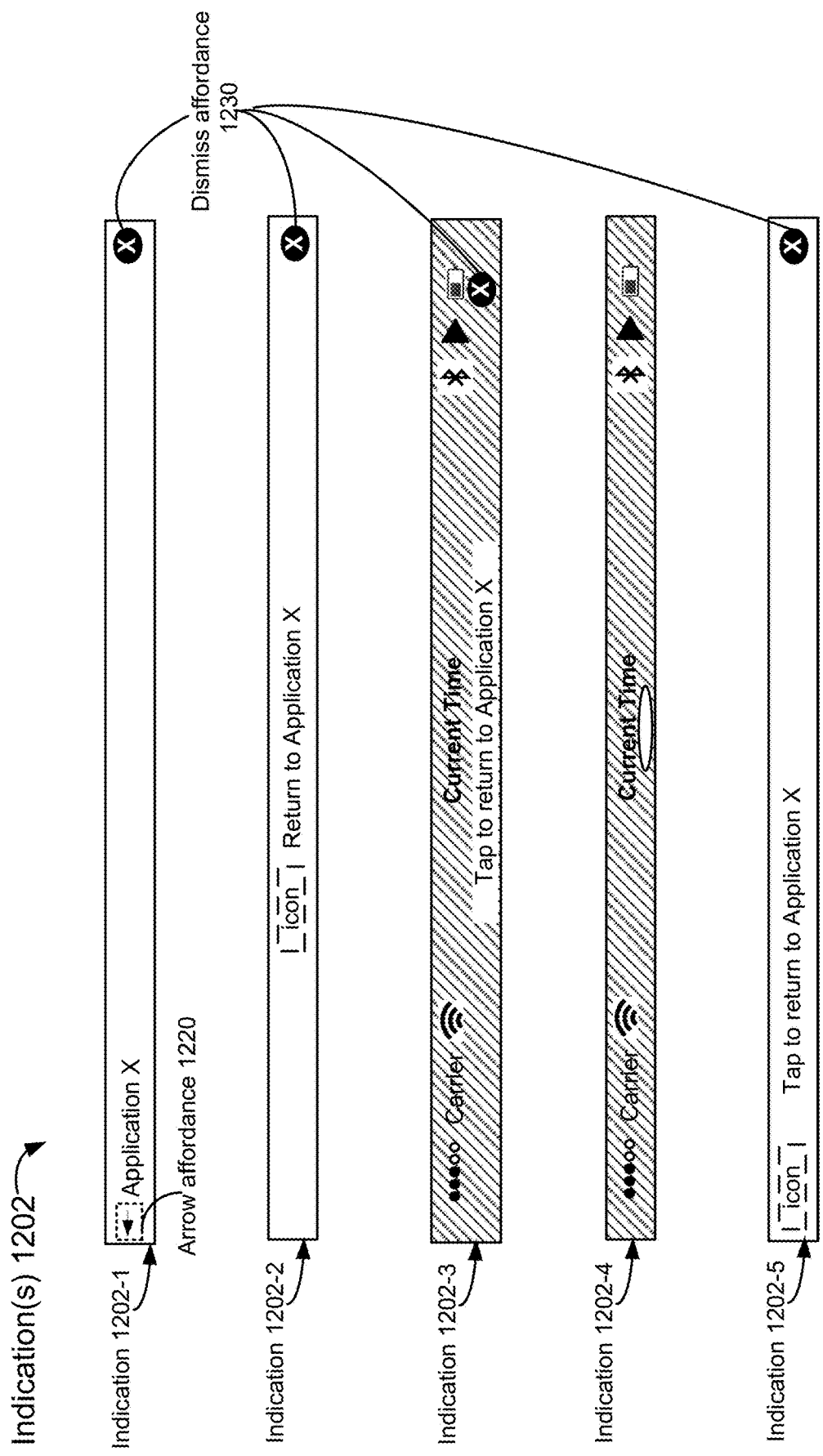

In some embodiments, the additional portion 403 is instead an indication corresponding to the application (e.g., indication 1202 displayed within additional portion 403, FIG. 12D) that includes affordances and/or textual content describing the correspondence between the indication 1202 and the application (e.g., exemplary affordances and textual content descriptions are shown in FIG. 12I for various exemplary indications 1202). In some embodiments, the additional portion 403 corresponds to an application-specific thin strip of the touch-sensitive display that runs along the length of an edge of the touch-sensitive display (e.g., each thin strip runs from a bottom to a top of a leftmost edge of the touch-sensitive display). In some embodiments the additional portions are evenly-spaced and evenly-sized narrow, rectangular portions of the touch-sensitive display (e.g., thin strips). In some embodiments, each rectangular portion spans from a bottom edge of the touch-sensitive display to a top edge of the touch-sensitive display. In some embodiments, the additional portion 403 is displayed along any edge of the touch-sensitive display (e.g., a left, right, top, or bottom edge). For example, the additional portion 403 shown in FIGS. 12B-12D instead of being displayed along a top edge of the touch-sensitive display is, in some embodiments, displayed along a bottom edge of the touch-sensitive display. In some embodiments, if the device is rotated and switches its display orientation (e.g., from landscape to portrait or from portrait to landscape), then the location of the additional portion 403 changes (e.g., if the device is displaying the user interface shown in FIG. 12B while in a portrait display orientation and the device is rotated from portrait to landscape, then the additional portion is moved from along the top edge of the touch-sensitive display to along a leftmost edge of the touch-sensitive display (e.g., the user interfaces resembles the one shown in FIG. 4B with the additional portion displayed along a leftmost edge 498)). As an additional example, if the device is displaying the user interface shown in FIG. 4B and the device is rotated from landscape to portrait, then the additional portion is moved from along the leftmost edge of the touch-sensitive display to along a top edge of the touch-sensitive display (e.g., the user interfaces resembles the one shown in FIG. 12B with the additional portion displayed along a top edge of the touch-sensitive display).

Multitasking module 163 optionally includes the following modules (or sets of instructions), or a subset or superset thereof:
- application selector 163-1;
- compatibility module 163-2;
- indication generation module 163-3; and
- multitasking history 163-4 for storing information about a user's multitasking history (e.g., commonly-used applications in multitasking mode, recent display areas for applications while in the multitasking mode, etc.).

In conjunction with touch screen 112, display controller 156, contact module 130, graphics module 132, and contact intensity sensor(s) 165, application selector 163-1 includes executable instructions to display affordances corresponding to applications (e.g., one or more of applications 136) and allow users of device 100 to select affordances for use in a multitasking mode (e.g., a mode in which more than one application is displayed and active on touch screen 112 at the same time).

In conjunction with touch screen 112, display controller 156, contact module 130, graphics module 132, and application selector 163-1, compatibility module 163-2 includes executable instructions to determine whether a particular application is compatible with a multitasking mode (e.g., by checking a flag, such as a flag stored with multitasking data 193 for each application 136, as pictured in FIG. 1B) and to determine whether a particular application is capable of being displayed within the predefined portion described above (e.g., whether content associated with the particular application is re-sizeable so that the particular application is able to fit within the predefined portion).

In conjunction with touch screen 112, display controller 156, contact module 130, graphics module 132, and contact intensity sensor(s) 165, indication generation module 163-3 includes executable instructions to create and render an indication associated with a previously-used application that, when selected, re-displays the previously-used application on touch screen 112.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

FIG. 1B is a block diagram illustrating exemplary components for event handling in accordance with some embodiments. In some embodiments, memory 102 (in FIG. 1A) includes event sorter 170 (e.g., in operating system 126) and a respective application 136-1 selected from among the applications 136 of portable multifunction device 100 (FIG. 1A) (e.g., any of the aforementioned applications stored in memory 102 with applications 136).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user. In some embodiments, application internal state 192 is used by multitasking module 163 to help facilitate multitasking operations (e.g., multitasking module 163 retrieves resume information from application internal state 192 in order to re-display a previously dismissed side application).

In some embodiments, each application 136-1 stores multitasking data 193. In some embodiments, multitasking data 193 includes a compatibility flag (e.g., a flag accessed by compatibility module 163-2 to determine whether a particular application is compatible with multitasking mode), a list of compatible sizes for displaying the application 136-1 in the multitasking mode (e.g., ¼, ⅓, ½, or full-screen), and various sizes of graphics (e.g., different graphics for each size within the list of compatible sizes).

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from portrait to landscape, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 186 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any remain active for the hit view, continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display. In some embodiments, GUI updater 178 communicates with multi-tasking module 163 in order to facilitate resizing of various applications displayed in a multitasking mode.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof is optionally utilized as inputs corresponding to sub-events which define an event to be recognized.

Figure 1C:
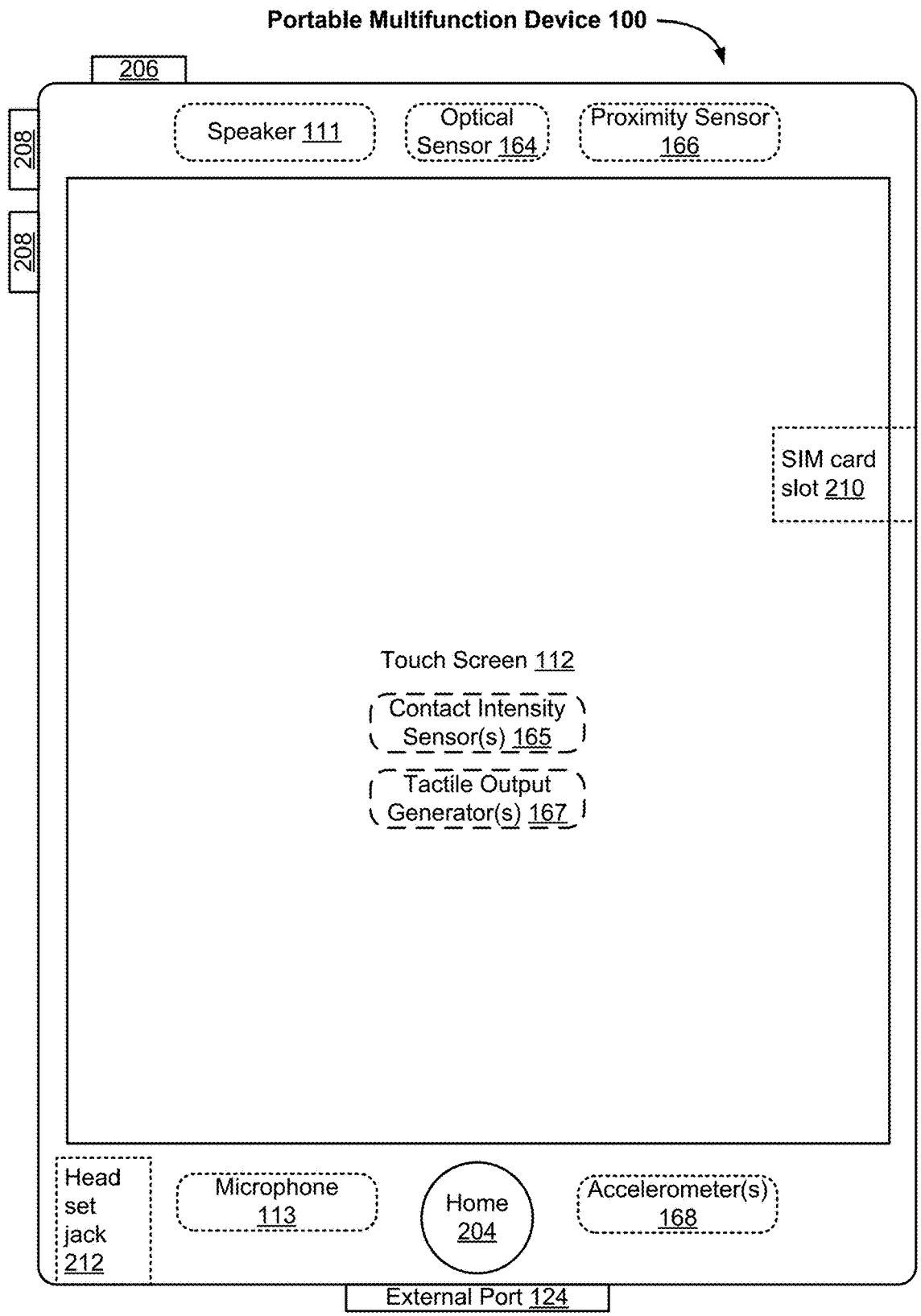
FIG. 1C is a schematic of a portable multifunction device having a touch-sensitive display, in accordance with some embodiments.

FIG. 1C is a schematic of a portable multifunction device (e.g., portable multifunction device 100) having a touch-sensitive display (e.g., touch screen 112) in accordance with some embodiments. The touch-sensitive display optionally displays one or more graphics within a user interface (UI) on the touch screen 112. In this embodiment, as well as others described below, a user can select one or more of the graphics by making a gesture on the screen, for example, with one or more fingers or one or more styluses. In some embodiments, selection of one or more graphics occurs when the user breaks contact with the one or more graphics (e.g., by lifting a finger off of the screen). In some embodiments, the gesture optionally includes one or more tap gestures (e.g., a sequence of touches on the screen followed by lift offs), one or more swipe gestures (continuous contact during the gesture along the surface of the screen, e.g., from left to right, right to left, upward and/or downward), and/or a rolling of a finger (e.g., from right to left, left to right, upward and/or downward) that has made contact with device 100. In some implementations or circumstances, inadvertent contact with a graphic does not select the graphic. For example, a swipe gesture that sweeps over an application affordance (e.g., an icon) optionally does not launch (e.g., open) the corresponding application when the gesture for launching the application is a tap gesture.

Device 100 optionally also includes one or more physical buttons, such as a "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

Figure 1D:
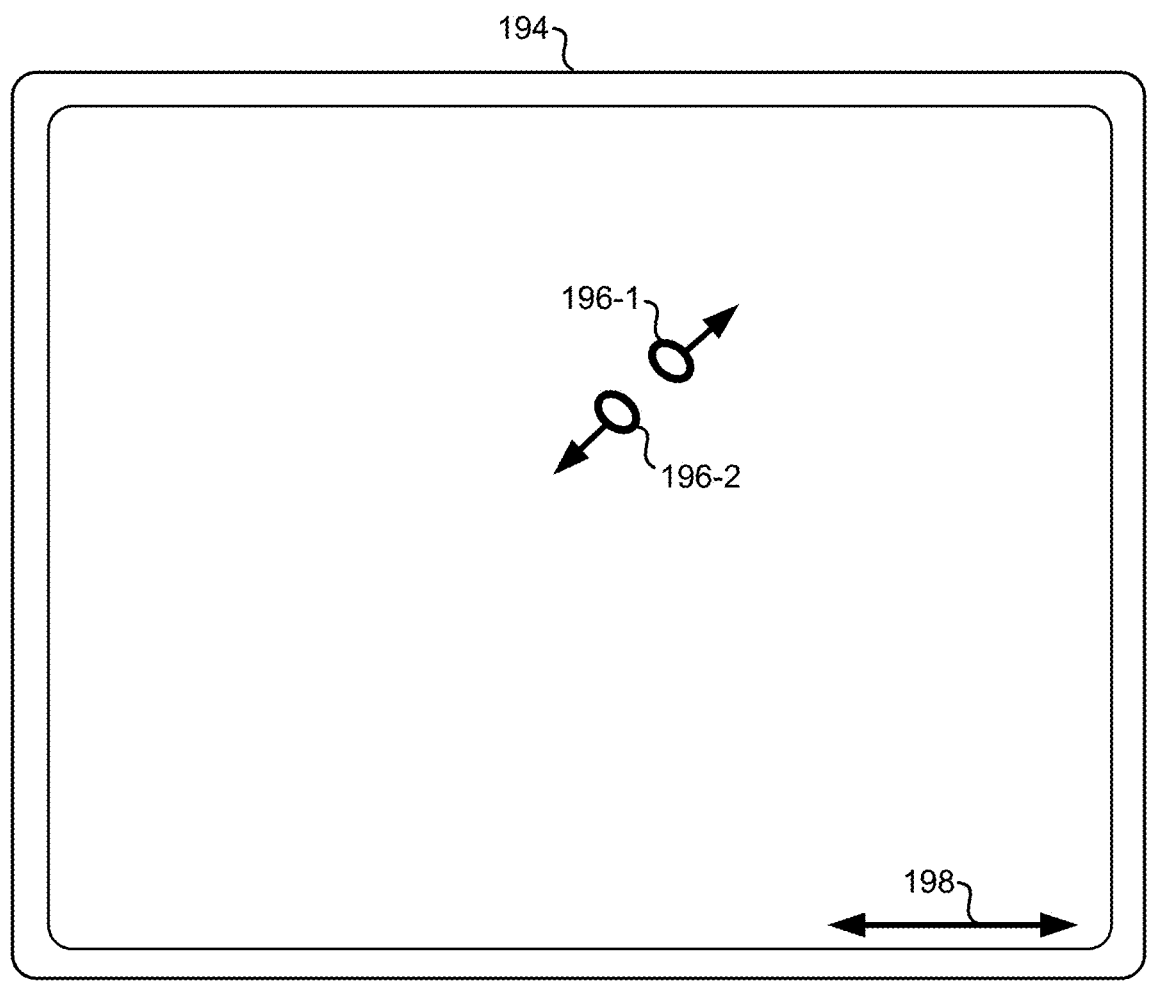
FIG. 1D is a schematic used to illustrate a computing device with a touch-sensitive surface that is separate from the display, in accordance with some embodiments.
Figure 1D:
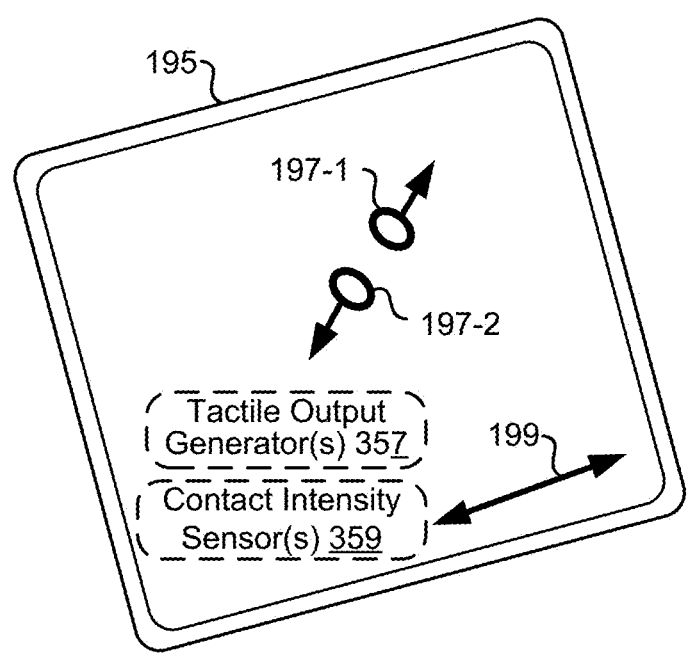

FIG. 1D is a schematic used to illustrate a user interface on a device (e.g., device 100, FIG. 1A) with a touch-sensitive surface 195 (e.g., a tablet or touchpad) that is separate from the display 194 (e.g., touch screen 112). In some embodiments, touch-sensitive surface 195 includes one or more contact intensity sensors (e.g., one or more of contact intensity sensor(s) 359) for detecting intensity of contacts on touch-sensitive surface 195 and/or one or more tactile output generator(s) 357 for generating tactile outputs for a user of touch-sensitive surface 195.

Although some of the examples which follow will be given with reference to inputs on touch screen 112 (where the touch sensitive surface and the display are combined), in some embodiments, the device detects inputs on a touch-sensitive surface that is separate from the display, as shown in FIG. 1D. In some embodiments the touch sensitive surface (e.g., 195 in FIG. 1D) has a primary axis (e.g., 199 in FIG. 1D) that corresponds to a primary axis (e.g., 198 in FIG. 1D) on the display (e.g., 194). In accordance with these embodiments, the device detects contacts (e.g., 197-1 and 197-2 in FIG. 1D) with the touch-sensitive surface 195 at locations that correspond to respective locations on the display (e.g., in FIG. 1D, 197-1 corresponds to 196-1 and 197-2 corresponds to 196-2). In this way, user inputs (e.g., contacts 197-1 and 197-2, and movements thereof) detected by the device on the touch-sensitive surface (e.g., 195 in FIG. 1D) are used by the device to manipulate the user interface on the display (e.g., 194 in FIG. 1D) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touch-sensitive surface 195 in FIG. 1D (touch-sensitive surface 195, in some embodiments, is a touchpad)) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch-sensitive display) will indicate that the user is intending to activate the respective button (as opposed to other user interface elements shown on a display of the device).

Attention is now directed towards user interfaces ("UI") embodiments and associated processes that may be implemented on an electronic device with a display and a touch-sensitive surface, such as device 100.

FIG. 2 is a schematic of a touch screen used to illustrate a user interface for a menu of applications, in accordance with some embodiments. Similar user interfaces are, optionally, implemented on device 100 (FIG. 1A). In some embodiments, an exemplary user interface includes the following elements, or a subset or superset thereof:

Signal strength indicator(s) 202 for wireless communication(s), such as cellular and Wi-Fi signals;
Time 203;
Bluetooth indicator 205;
Battery status indicator 206;
Tray 209 with icons for frequently used applications, such as:
  Icon 216 for telephone module 138, labeled "Phone," which optionally includes an indicator 214 of the number of missed calls or voicemail messages;
  Icon 218 for e-mail client module 140, labeled "Mail," which optionally includes an indicator 210 of the number of unread e-mails;

Icon 220 for browser module 147, labeled "Browser;" and

Icon 222 for video and music player module 152, also referred to as IPOD (trademark of APPLE Inc.) module 152, labeled "iPod;" and Icons for other applications, such as:
- Icon 224 for IM module 141, labeled "Messages;"
- Icon 226 for calendar module 148, labeled "Calendar;"
- Icon 228 for image management module 144, labeled "Photos;"
- Icon 230 for camera module 143, labeled "Camera;"
- Icon 232 for online video module 155, labeled "Online Video"
- Icon 234 for stocks widget 149-2, labeled "Stocks;"
- Icon 236 for map module 154, labeled "Maps;"
- Icon 238 for weather widget 149-1, labeled "Weather;"
- Icon 240 for alarm clock widget 149-4, labeled "Clock;"
- Icon 242 for fitness module 142, labeled "Fitness;"
- Icon 244 for notes module 153, labeled "Notes;"
- Icon 246 for a settings application or module, which provides access to settings for device 100 and its various applications; and
- Other icons for additional applications, such as App Store, iTunes, Voice Memos, and Utilities.

It should be noted that the icon labels illustrated in FIG. 2 are merely exemplary. Other labels are, optionally, used for various application icons. For example, icon 242 for fitness module 142 is alternatively labeled "Fitness Support," "Workout," "Workout Support," "Exercise," "Exercise Support," or "Health." In some embodiments, a label for a respective application icon includes a name of an application corresponding to the respective application icon. In some embodiments, a label for a particular application icon is distinct from a name of an application corresponding to the particular application icon.

FIGS. 3A-3G illustrate flowchart representations of a method of efficiently navigating between applications with linked content on an electronic device with a touch-sensitive display. FIGS. 4A-4I, 5A-5L, 6A-6B, 7A-7B, 8A-8B, 9A-9B, and 10A-10B are schematics of a touch-sensitive display used to illustrate exemplary user interfaces and gestures for navigating between applications with linked content. FIGS. 4A-4I, 5A-5L, 6A-6B, 7A-7B, 8A-8B, 9A-9B, and 10A-10B are used to illustrate the methods and/or processes of FIGS. 3A-3G. Although some of the examples which follow will be given with reference to inputs on a touch-sensitive display (in which a touch-sensitive surface and a display are combined), in some embodiments, the device detects inputs on a touch-sensitive surface 195 that is separate from the display 194, as shown in FIG. 1D.

In some embodiments, a method 300 is performed by an electronic device (e.g., portable multifunction device 100, FIG. 1A) and/or one or more components of the electronic device (e.g., I/O subsystem 106, operating system 126, etc.). In some embodiments, the method 300 is governed by instructions that are stored in a non-transitory computer-readable storage medium and that are executed by one or more processors of a device, such as the one or more processors 122 of device 100 (FIG. 1A). Alternatively, or in addition, executable instructions for performing method 300 are, optionally, included in a transitory computer-readable storage medium or other computer program product configured for execution by one or more processors. For ease of explanation, the following describes method 300 as performed by the device 100. In some embodiments, with reference to FIG. 1A, the operations of method 300 are performed by or use, at least in part, a multitasking module (e.g., multitasking module 163), an application selector (e.g., application selector 163-1), a compatibility module (e.g., compatibility module 163-2), an indication generation module (e.g., indication generation module 163-3), a multitasking history (e.g., multitasking history 163-4), a contact/motion module (e.g., contact/motion module 130), a graphics module (e.g., graphics module 132), one or more contact intensity sensors (e.g., contact intensity sensors 165), and a touch-sensitive display (e.g., touch-sensitive display system 112). Some operations in method 300 are, optionally, combined and/or the order of some operations is, optionally, changed.

As described below, the method 300 provides an intuitive way to navigate between applications with linked content on an electronic device with a touch-sensitive display. The method reduces the cognitive burden on a user when navigating between applications with linked content, thereby creating a more efficient human-machine interface. Further, such methods conserve power, reduce unnecessary/extraneous/repetitive inputs, and potentially reduce memory usage. For battery-operated electronic devices, the ability to enable a user to navigate between applications with linked content faster and more efficiently, both conserves battery power and increases the time between battery charges.

The device displays (302) in a full-screen mode on a touch-sensitive display (e.g., touch screen 112) of the device a first application including a selectable user interface element associated with a second application. For example, as shown in FIG. 4A application 1 (e.g., a first application) is displayed in a full-screen mode on the touch screen 112 and includes a selectable user interface element 404 associated with the second application (i.e., an application that is distinct from the first application). In some embodiments, the selectable user interface element is a link (e.g., a hyperlink, a link to a document, a phone number, an address, a search result in search application (such as search module 151) that is associated with another application (e.g., browser module 147 or telephone module 138), etc.). In some embodiments, the selectable user interface element is a notification banner (e.g., notification from application 2, as pictured in FIG. 9A).

The device detects (304) a selection of the selectable user interface element (e.g., the device detects contact 406 over UI element 404, FIG. 4A). In response to detecting the selection of the selectable user interface element (306), the device: (i) displays the second application, including content corresponding to the selectable user interface element, in a predefined portion of the touch-sensitive display and (ii) displays the first application in an additional portion, distinct from the predefined portion, between an edge (e.g., edge 498, FIG. 4B) of the touch-sensitive display and the predefined portion. In some embodiments, a combination of the predefined portion and the additional portion occupy (308) substantially all of the touch-sensitive display (i.e., all available display area, excluding a top-level status bar). For example, as shown in FIG. 4B, (i) application 2 (e.g., a second application) is displayed in the predefined portion 405 of the touch-sensitive display and application 2 includes content corresponding to the selectable user interface element (e.g., if the selectable user interface element is a link to a document, then application 2 includes a representation of the document or includes the document's content) and (ii) application 1 is displayed in the additional portion 403. As shown in FIG. 4B, the first application's content (e.g., content 402) is overlaid by the second application, such that some of the first application's content is no longer or only partially visible on the touch-sensitive display. As shown in FIG. 4B, the additional portion 403, in some embodiments, is located between an edge (e.g., edge 498, FIG. 4B) of the touch-sensitive display (e.g., a leftmost edge) and the predefined portion. Additional details and descriptions of embodiments of the additional portion and the predefined portion are presented above with reference to FIG. 1A.

In some embodiments, displaying the second application in the predefined portion includes (310) sliding the second application on to the touch-sensitive display in a first direction over the displayed first application until the second application occupies the predefined portion and the first application remains visible in the additional portion. In some embodiments, the additional portion includes (312) a pin affordance (e.g., pin 420, FIG. 4B) that, when selected, causes pinning of the second application next to the first application on the touch-sensitive display (or, alternatively, causes pinning of the first application next to the second application). In some embodiments, pinning an application as a side application (application 2 in the current example) links the pinned side application to the currently-displayed main application (application 1 in the current example). In some embodiments, pinning includes creating a record that indicates that application 2 is pinned as a side application whenever application 1 is launched (e.g., multitasking data 193 corresponding to application 1 is updated to include this record) or vice versa. As such, in these embodiments, until application 2 is dismissed or promoted (discussed below), every time application 1 is opened/launched, application 2 is also opened as a side application in a shared screen view that includes application 1 as the main application and application 2 as the side application.

Figure 4F:
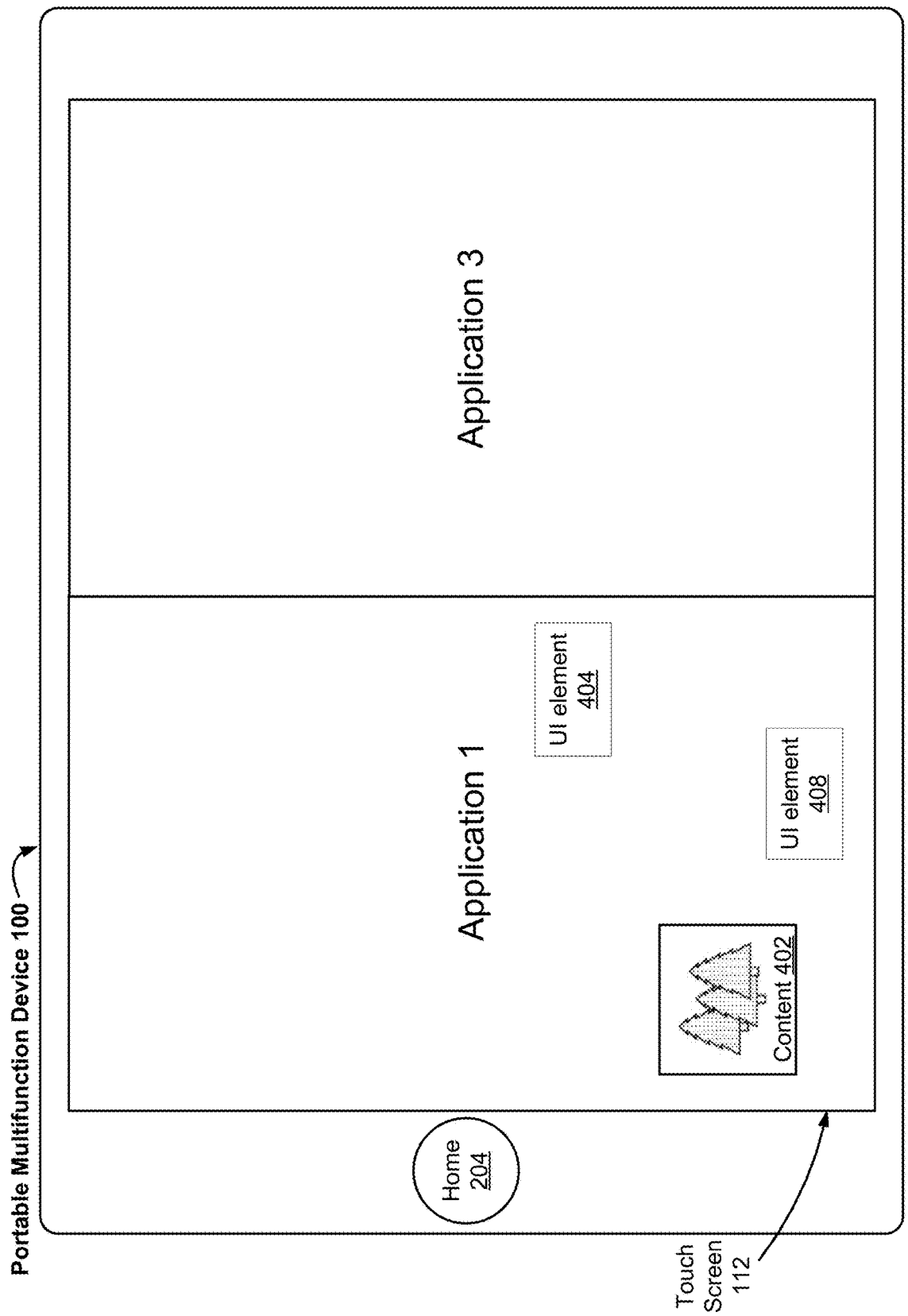

In some other embodiments, side applications are pinned to the shared screen view (instead of being pinned to individual applications). In these other embodiments, pinning application 2 (discussed in the aforementioned example) results in pinning application 2 to the shared screen view, such that opening any new application that is compatible with the shared screen view results in displaying the new application in the shared screen view with application 2 as the side application (e.g., if a user pins application 2, exits to a home screen (by clicking physical home button 204), uses a gesture to launch an application selector, and then selects a new application from within the application selector, then the selected new application will be displayed in the shared screen view with application 2). An application selector (e.g., application selector 163-1, FIG. 4H) is a user interface element that displays a plurality of selectable affordances corresponding to applications that are compatible with a shared screen view (e.g., FIG. 4F shows an exemplary shared screen view in which application 1 is the main application and application 3 is the side application).

In some embodiments, the additional portion also includes (314) a promote affordance (e.g., promote affordance 422, FIG. 4B) that, when selected, displays (i.e., causes the device to display) the second application in a full-screen mode on the touch-sensitive display. While displaying the second application in the predefined portion 405 (FIG. 4B) and the first application in the additional portion 403 (FIG. 4B), a number of navigation and display options are available to the user (e.g., options A-F, as pictured in FIG. 3A). As discussed in more detail below, in some embodiments, the user is able to: (A) pin the second application (e.g., operations 316-322), (B) re-display the first application in the full-screen mode (e.g., operations 324-328), (C) view the predefined portion and the additional portion in an alternative display format (e.g., operations 330-342), (D) select an additional selectable user interface element (e.g., a second link or a second notification banner, discussed below in reference to operations 344-364), (E) use a resize gesture to promote the second application to be a side application (e.g., operations 366-368), and/or (F) use a dragging gesture to promote the second application to be a side application (e.g., operations 370-388). Each of these navigation and display options will be described in turn below.

Figure 3B:
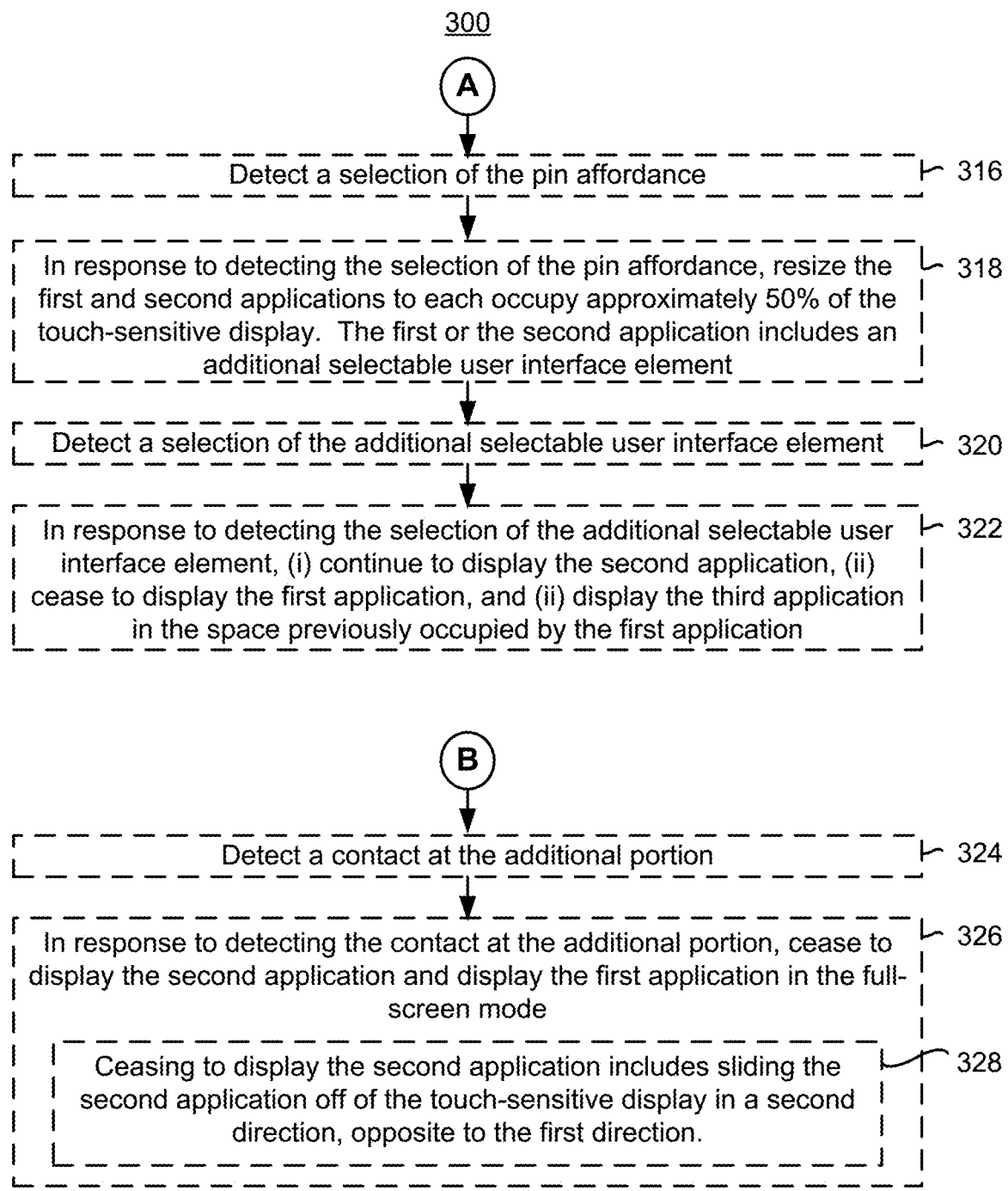

Turning now to FIG. 3B, in some embodiments, option A begins when the device detects (316) a selection of the pin affordance (e.g., the device detects contact 442 over pin 420, FIG. 4B). In response to detecting a selection of the pin affordance, in some embodiments, the device resizes (318) the first and second applications to each occupy approximately 50% of the touch-sensitive display (i.e., 50% of the available screen real estate of the touch-sensitive display). In some embodiments, the device resizes the first application to occupy approximately 75% of the available screen real estate of the touch-sensitive display and resizes the second application to occupy the remaining approximately 25% of the available screen real estate of the touch-sensitive display.

In some embodiments, the first or the second application also includes (318) an additional selectable user interface element that is associated with a third application (i.e., the additional selectable user interface element is distinct from the selectable user interface element because the additional selectable user interface element is associated with a different application than the one associated with the selectable user interface element). For example, the second application includes UI element 418 (i.e., an additional selectable user interface element that is distinct from the user interface element 404) or the first application includes UI element 408, (i.e., an additional selectable user interface element that is distinct from the user interface element 404) as shown in FIG. 4E.

Figure 4G:
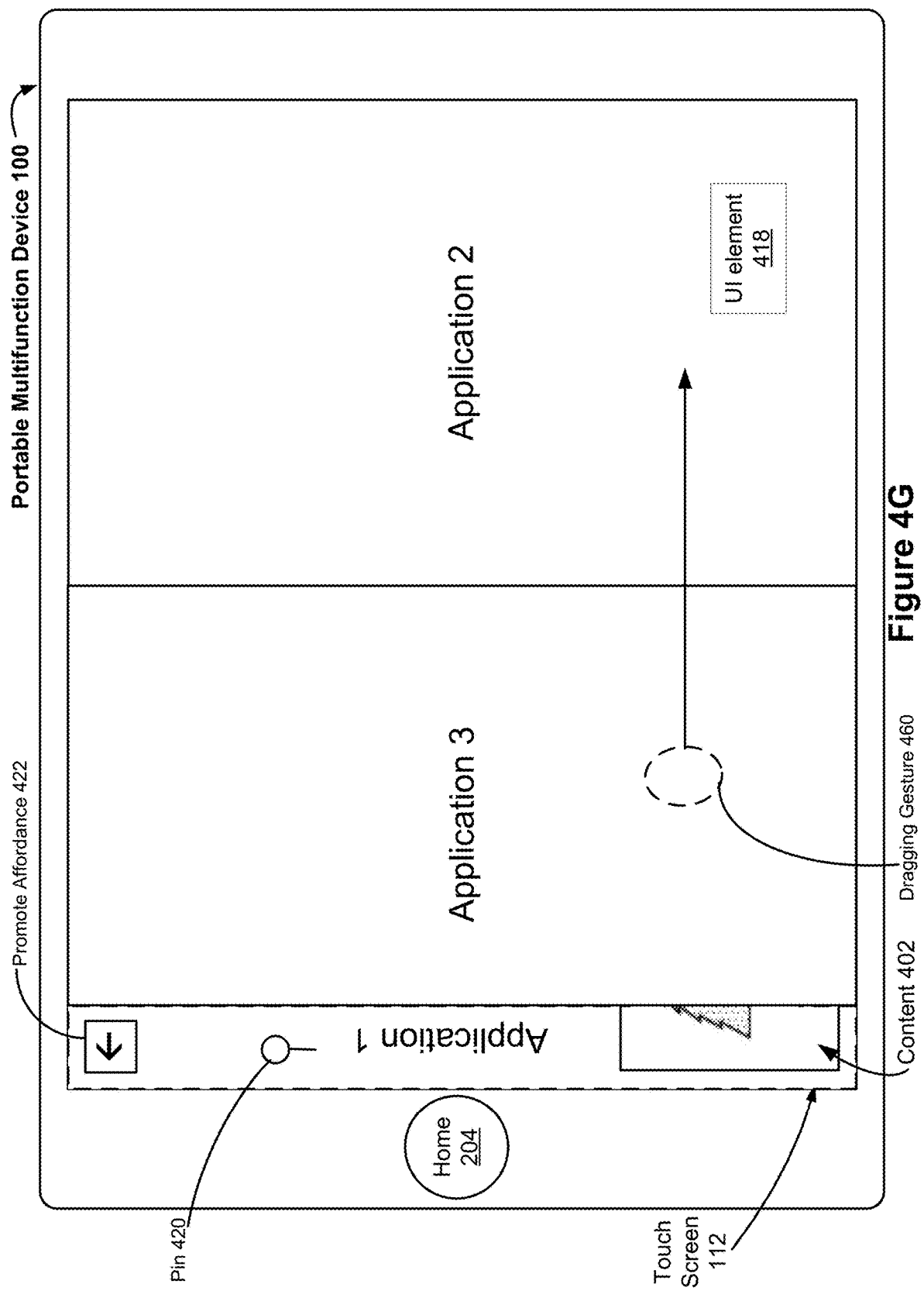

In some embodiments, the device detects (320) a selection of the additional selectable user interface element (e.g., the device detects contact 444 over either UI element 408 or UI element 418). In response to detecting the selection of the additional selectable user interface element (i.e., in response to detecting contact 444 over either UI element 408 or UI element 418), the device (322): continues to display the second application, ceases to display the first application, and displays the third application in the space previously occupied by the first application (as shown in FIG. 4G). In other words, the third application replaces the first application as the main application in the shared screen view. In other embodiments, the third application instead replaces the second application as the side application in the shared screen view (as shown in FIG. 4F). In these other embodiments, in response to detecting contact 444 over UI element 418 (i.e., the detected selection of the additional selectable user interface element is within the side application), the third application replaces the second application as the side application. Consistent with these other embodiments, in response to detecting contact 444 over UI element 408 (i.e., the detected selection of the additional selectable user interface element is within the main application), the third application replaces the first application as the side application.

As also pictured in FIG. 4G, in some embodiments, the third application is displayed as the main application and the previously-displayed main application (e.g., application 1 of the preceding examples) is optionally displayed in an additional portion, such that the third application overlays the previously-displayed main application (application 1) that is now displayed in the additional portion.

Continuing from operation 314, in some embodiments, option B begins when the device detects (324) a contact at the additional portion (e.g., contact 440, FIG. 4B). In some embodiments, the contact at the additional portion is detected anywhere within the additional portion, other than over the promote affordance 422 or the pin 420. In response to detecting the contact at the additional portion, the device ceases (326) to display the second application and displays the first application in the full-screen mode (as shown in FIG. 4C). In some embodiments, ceasing to display the second application includes sliding (328) the second application off of the touch-sensitive display in a second direction, opposite the first direction.

Figure 3C:
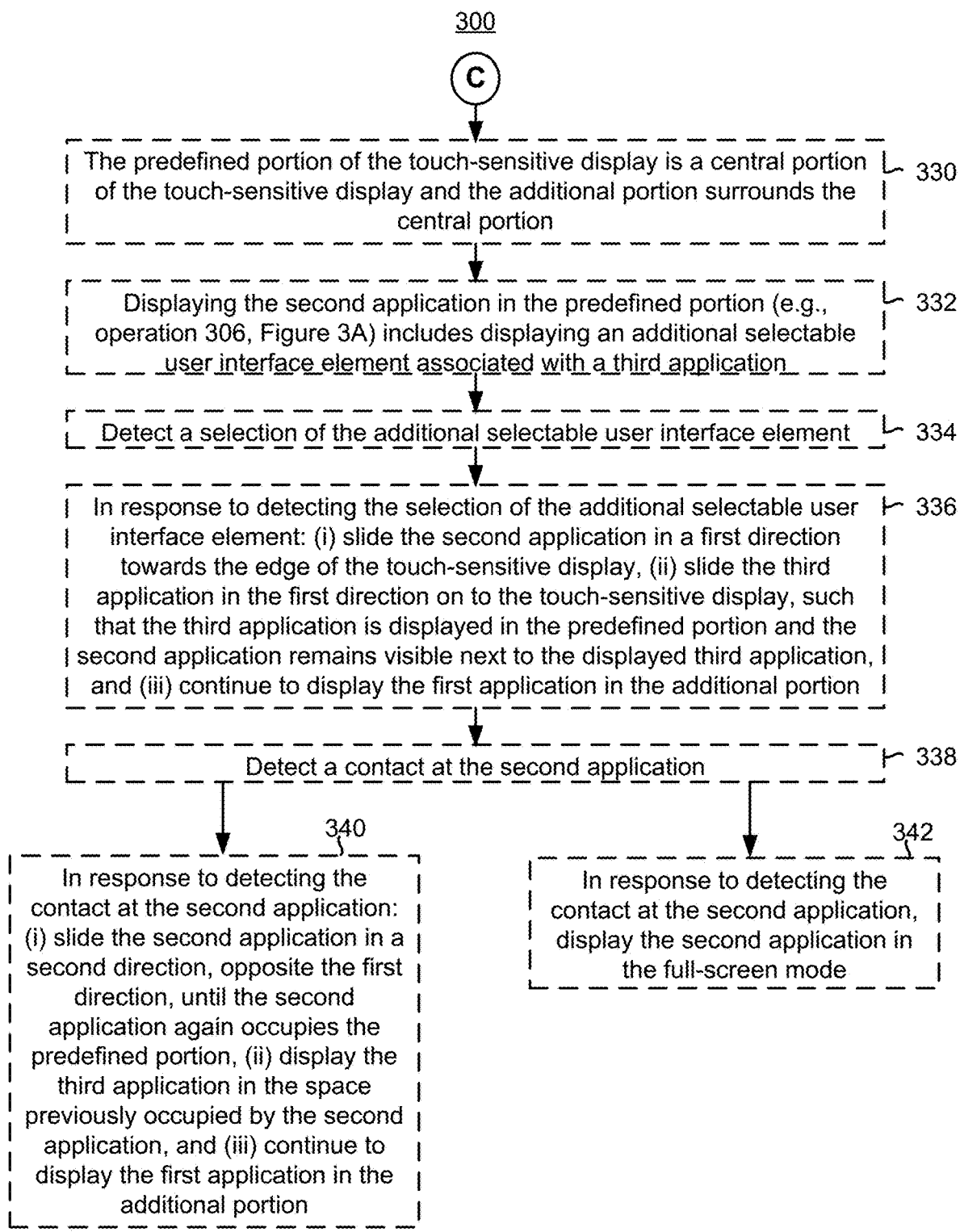
Figure 3D:
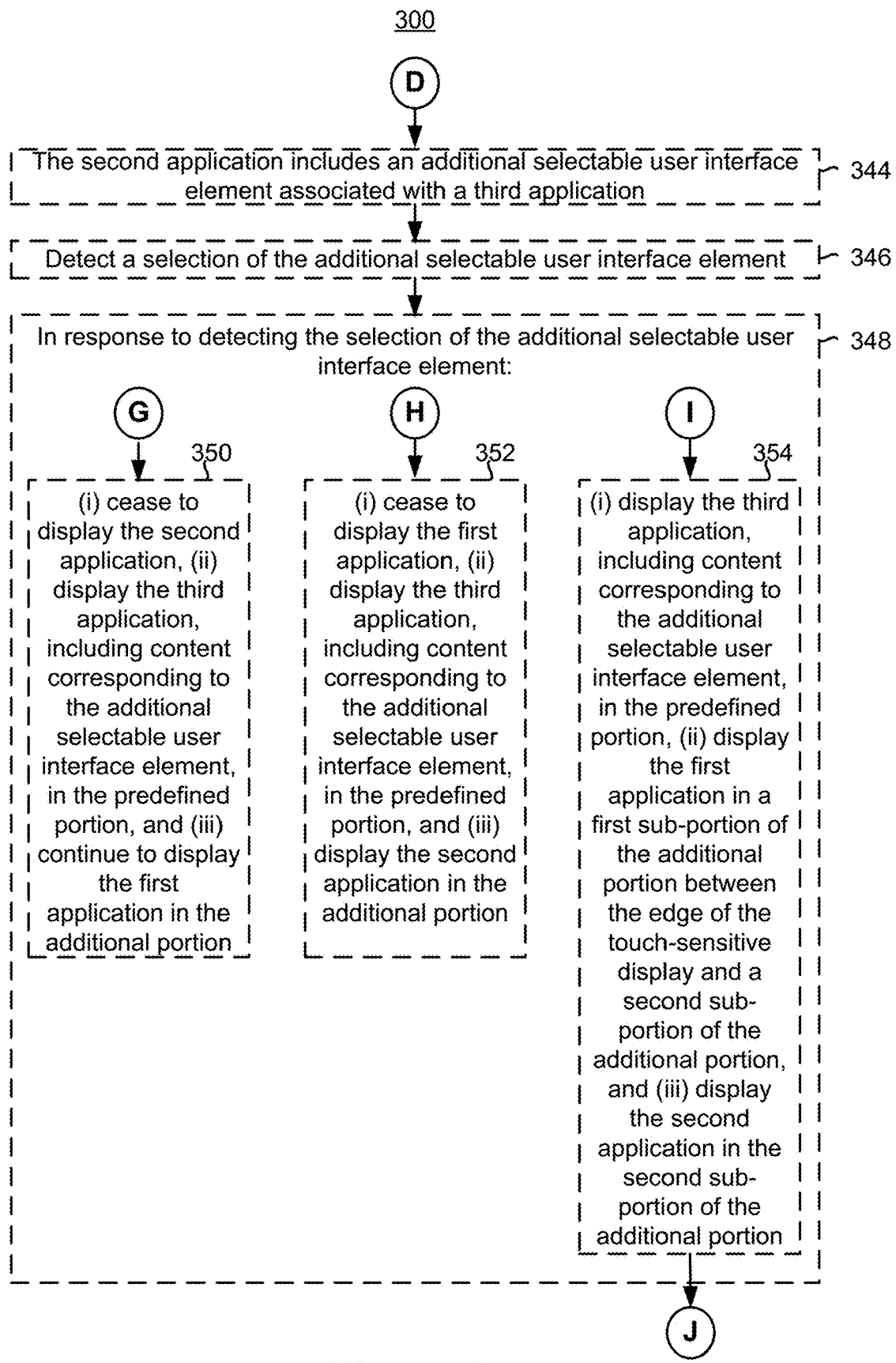
Figure 3E:
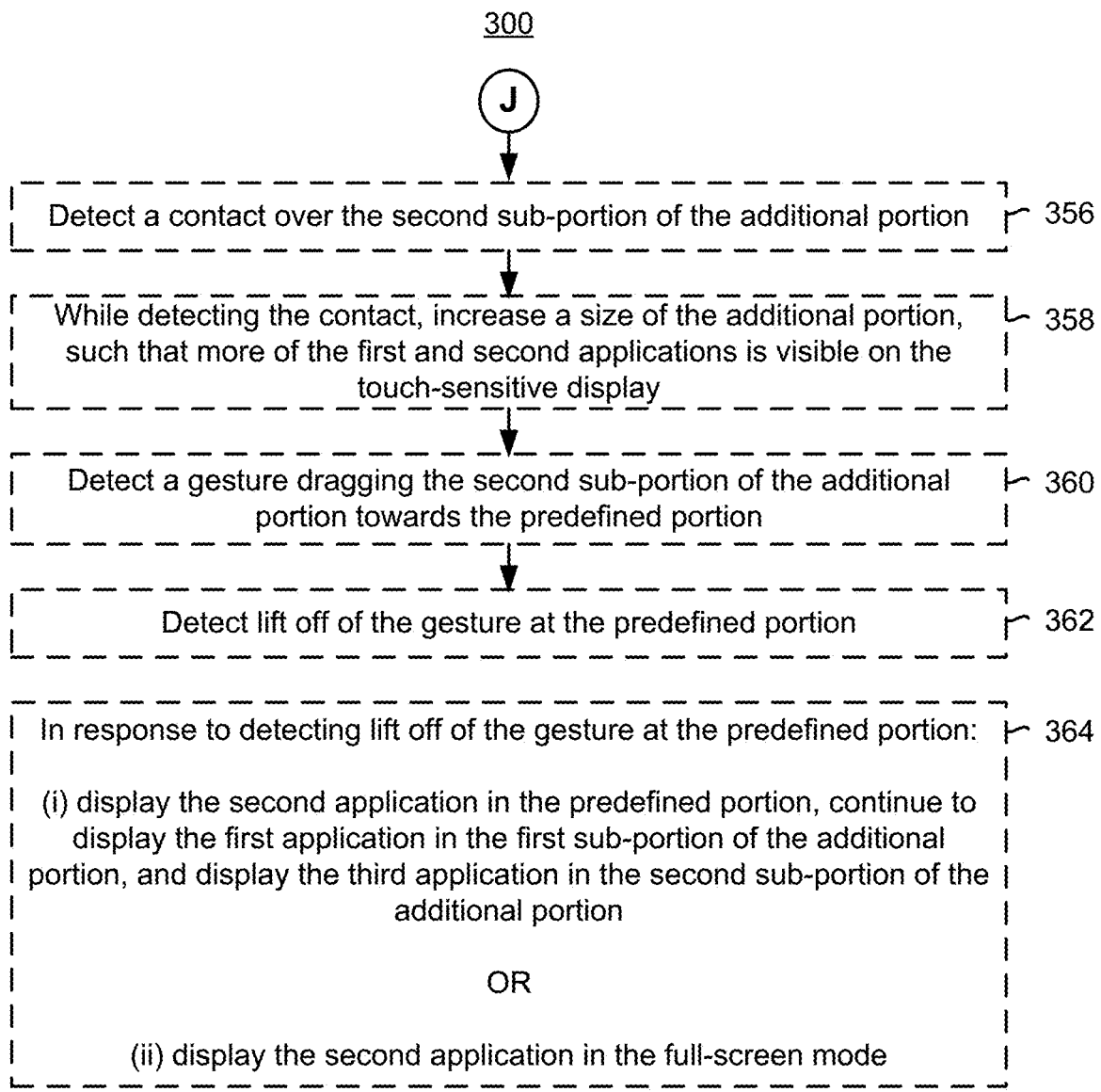
Figure 3F:
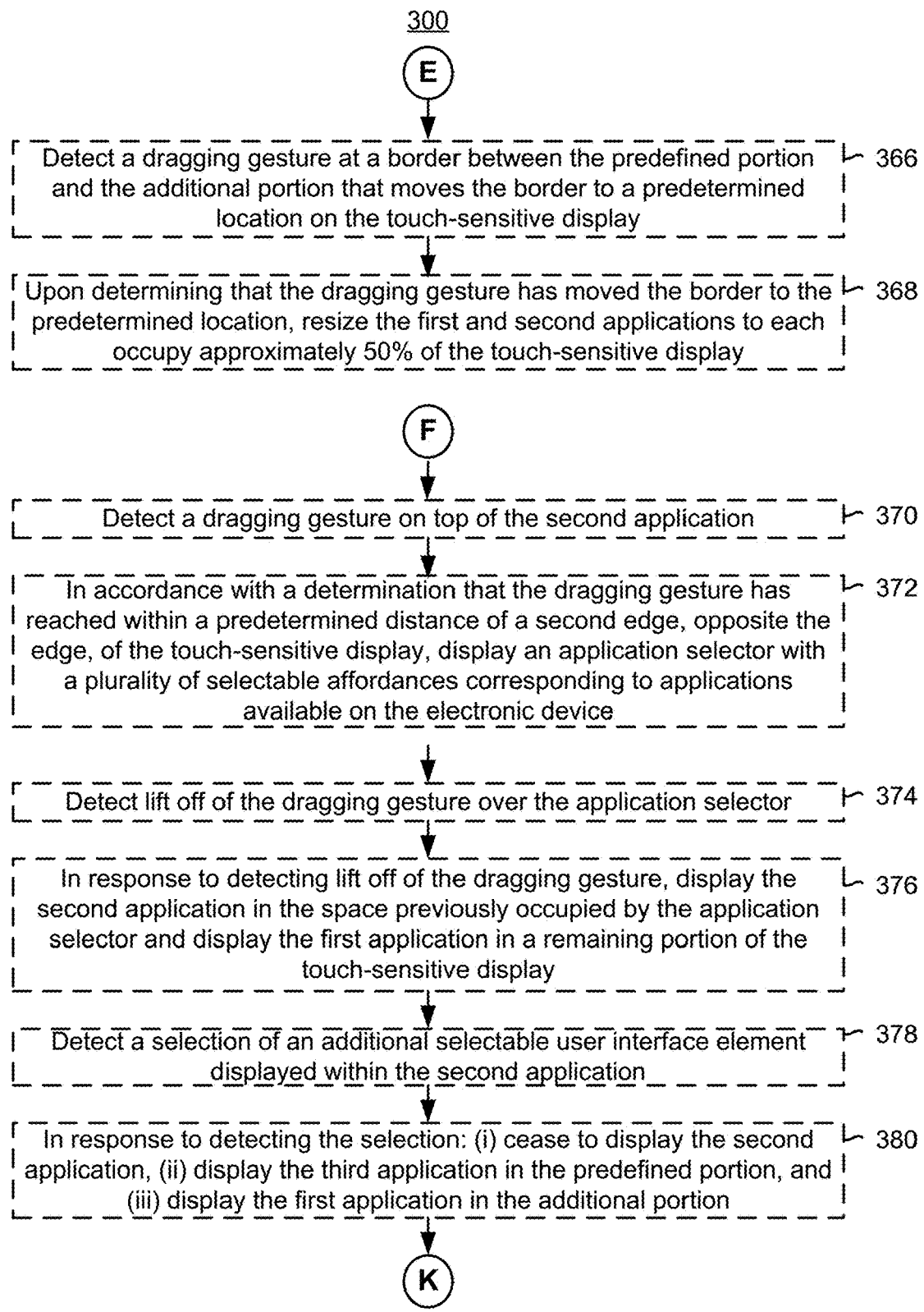
Figure 3G:
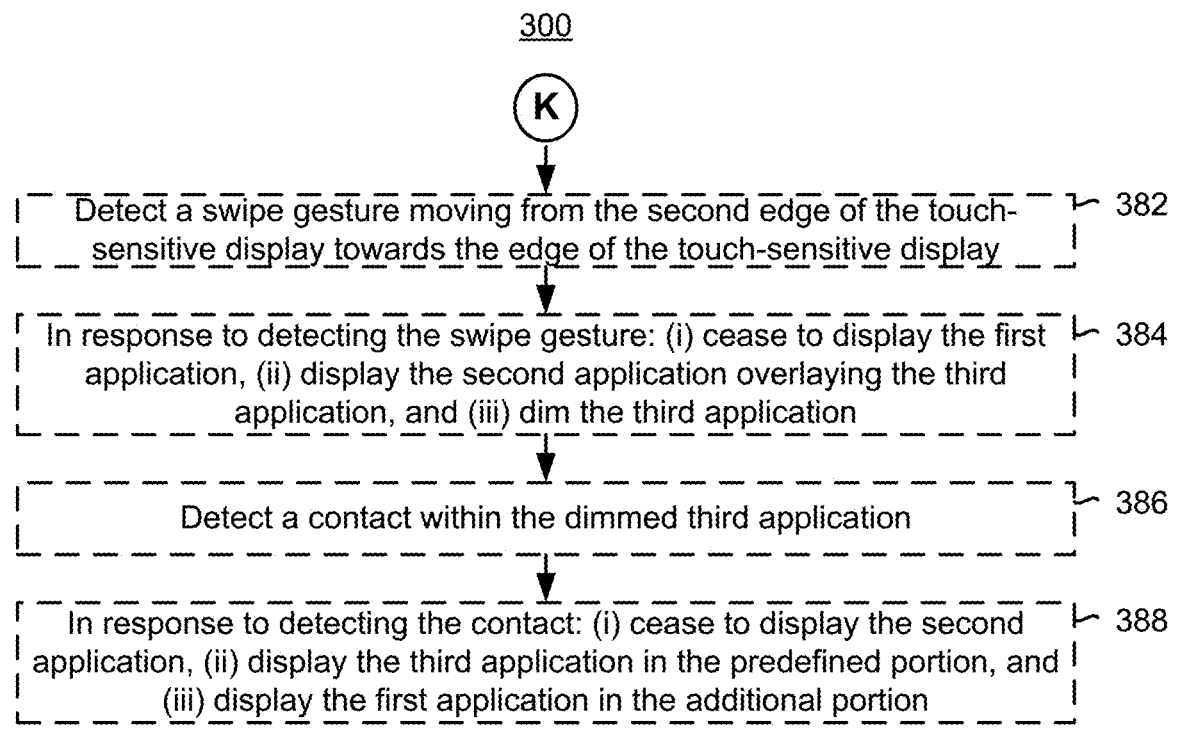
Figure 8A:
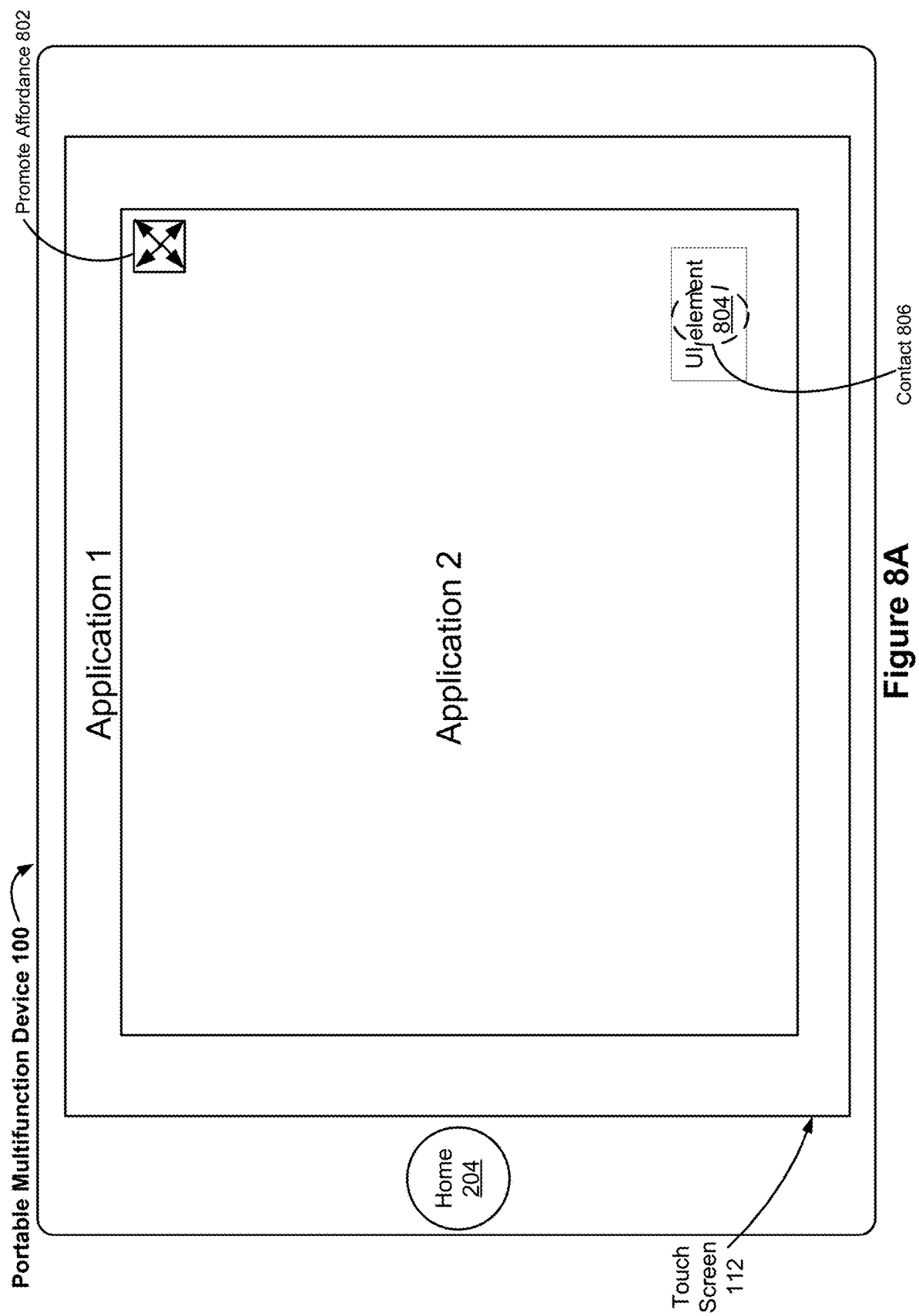
FIGS. 8A-8B are schematics of a touch-sensitive display used to illustrate an alternative display mode for navigating between applications with linked content, in accordance with some embodiments.

Referring now to FIG. 3C, in some embodiments, option C presents an alternative display format for the predefined portion and the additional portion. In some embodiments, the predefined portion of the touch-sensitive display is (330) a central portion of the touch-sensitive display and the additional portion surrounds the central portion (as shown in FIG. 8A. In some embodiments, displaying the second application in the predefined portion (e.g., as described in reference to operation 306, FIG. 3A) includes (332) displaying an additional selectable user interface element associated with a third application. For example, as shown in FIG. 8A, application 2 is displayed with the additional selectable user interface element (e.g., UI element 804). In some embodiments, the device detects (334) a selection of the additional selectable user interface element (e.g., the device detects contact 806 over UI element 804, FIG. 8A).

Figure 8B:
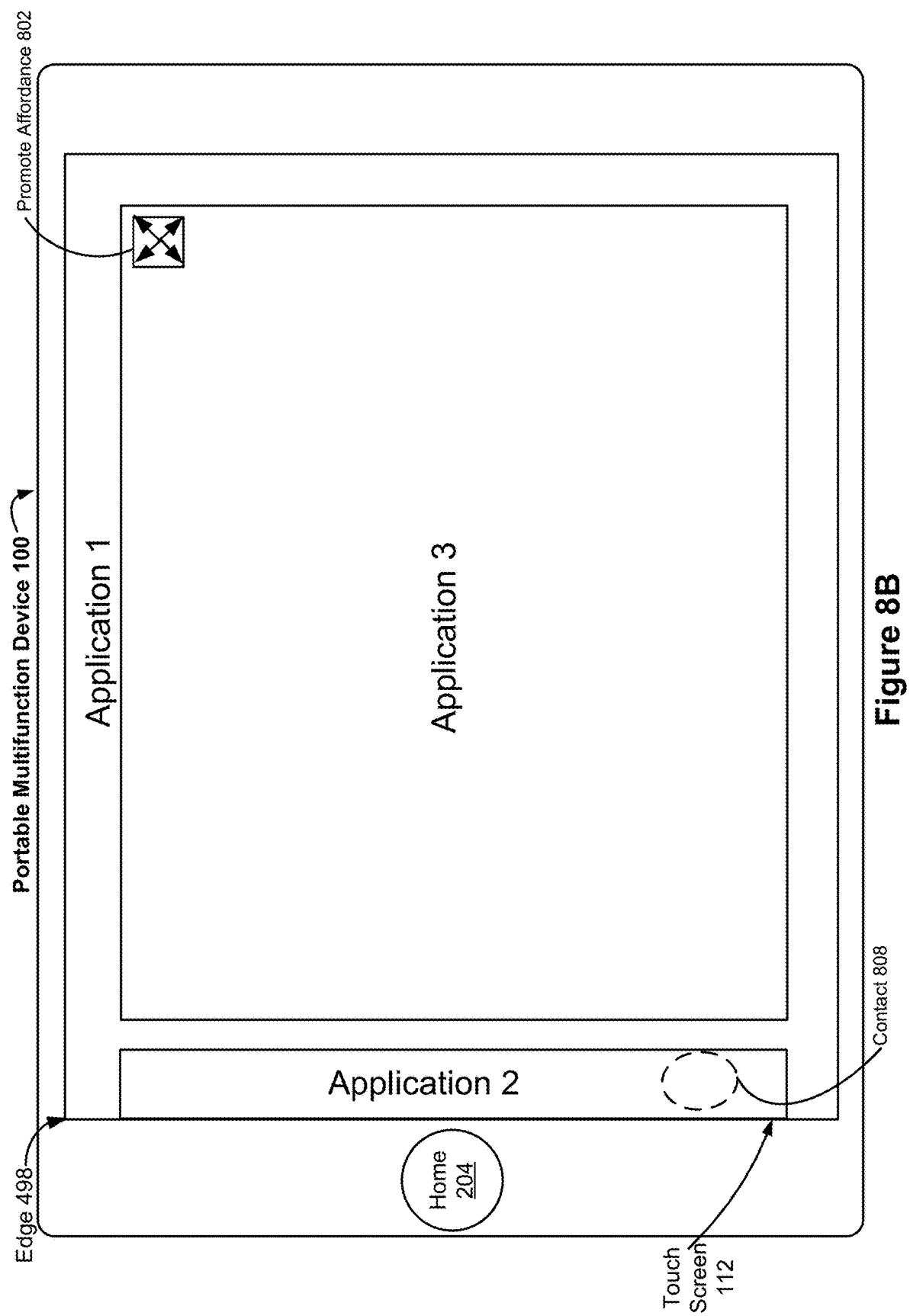

In some embodiments, in response to detecting the selection of the additional selectable user interface element, the device (336): (i) slides the second application in a first direction (e.g., a leftward direction) towards the edge (e.g., edge 498, FIG. 8B) of the touch-sensitive display, (ii) slides the third application in the first direction on to the touch-sensitive display, such that the third application is displayed in the predefined portion and the second application remains visible next to the displayed third application, and (iii) continues to display the first application in the additional portion (as shown in FIG. 8B). In some embodiments, the device detects (338) a contact at the second application (e.g., contact 808, FIG. 8B) and then performs either operation 340 or operation 342. In some embodiments, in response to detecting the contact at the second application, the device (340): (i) slides the second application in a second direction (e.g., a rightward direction), opposite the first direction, until the second application again occupies the predefined portion, (ii) displays the third application in the space previously occupied by the second application, and (iii) continues to display the first application in the additional portion. Alternatively, in some embodiments, in response to detecting the contact at the second application, the device displays (342) the second application in the full-screen mode.

Turning now to FIG. 3D and continuing again from operation 314, in some embodiments, option D begins with the second application including (344) an additional selectable user interface element associated with a third application (e.g., as shown in FIG. 4B, application 2 is displayed with UI element 418). In some embodiments, the device detects (346) a selection of the additional selectable user interface element (e.g., contact 525 over UI element 418, FIG. 5A). In response to detecting the selection of the additional selectable user interface element, the device performs (348) either operation 350, 352, or 354.

Figure 5A:
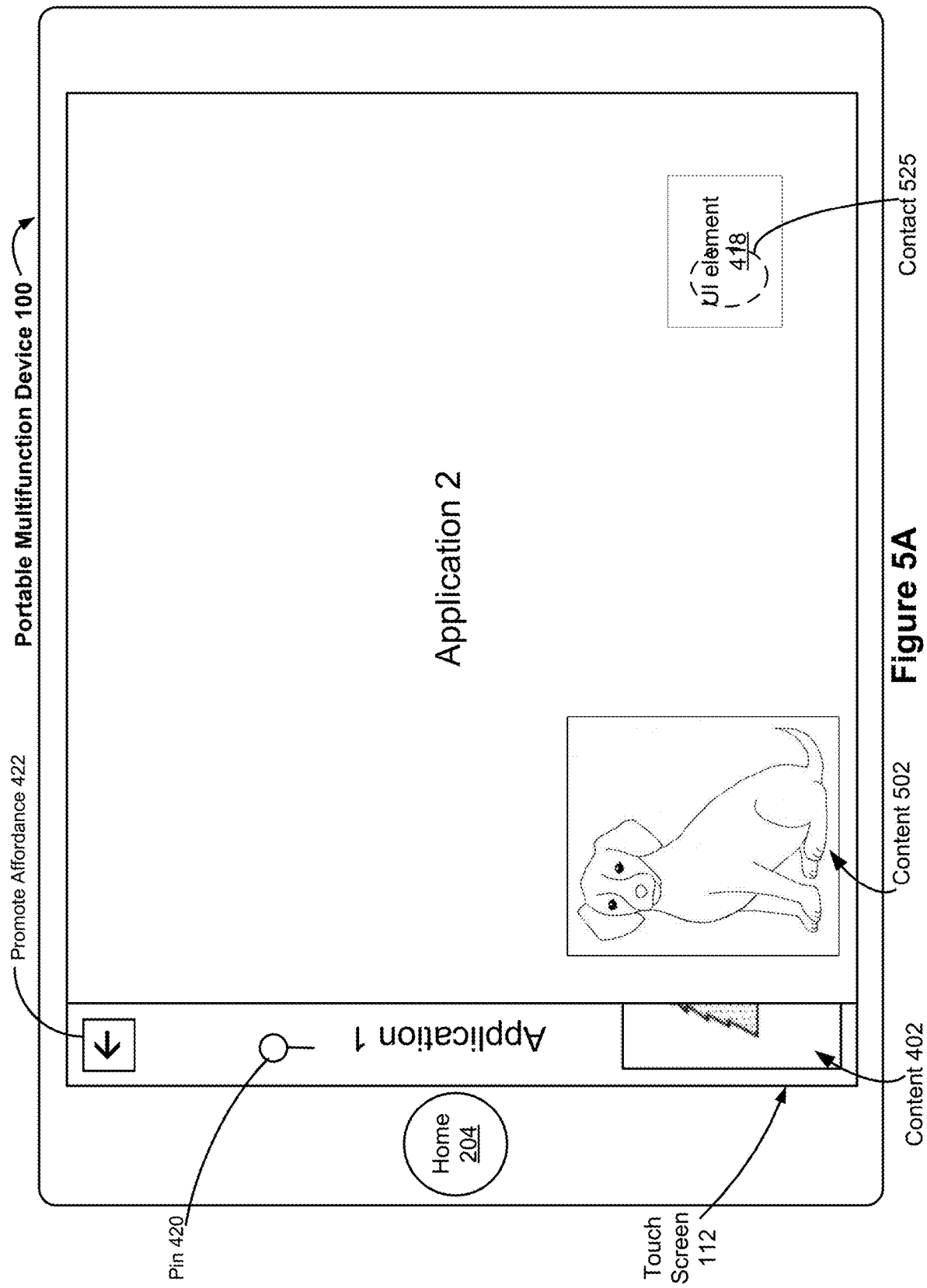
FIGS. 5A-5L are schematics of a touch-sensitive display used to illustrate additional gestures for navigating between applications with linked content in both full-screen and shared screen modes, in accordance with some embodiments.
Figure 5B:
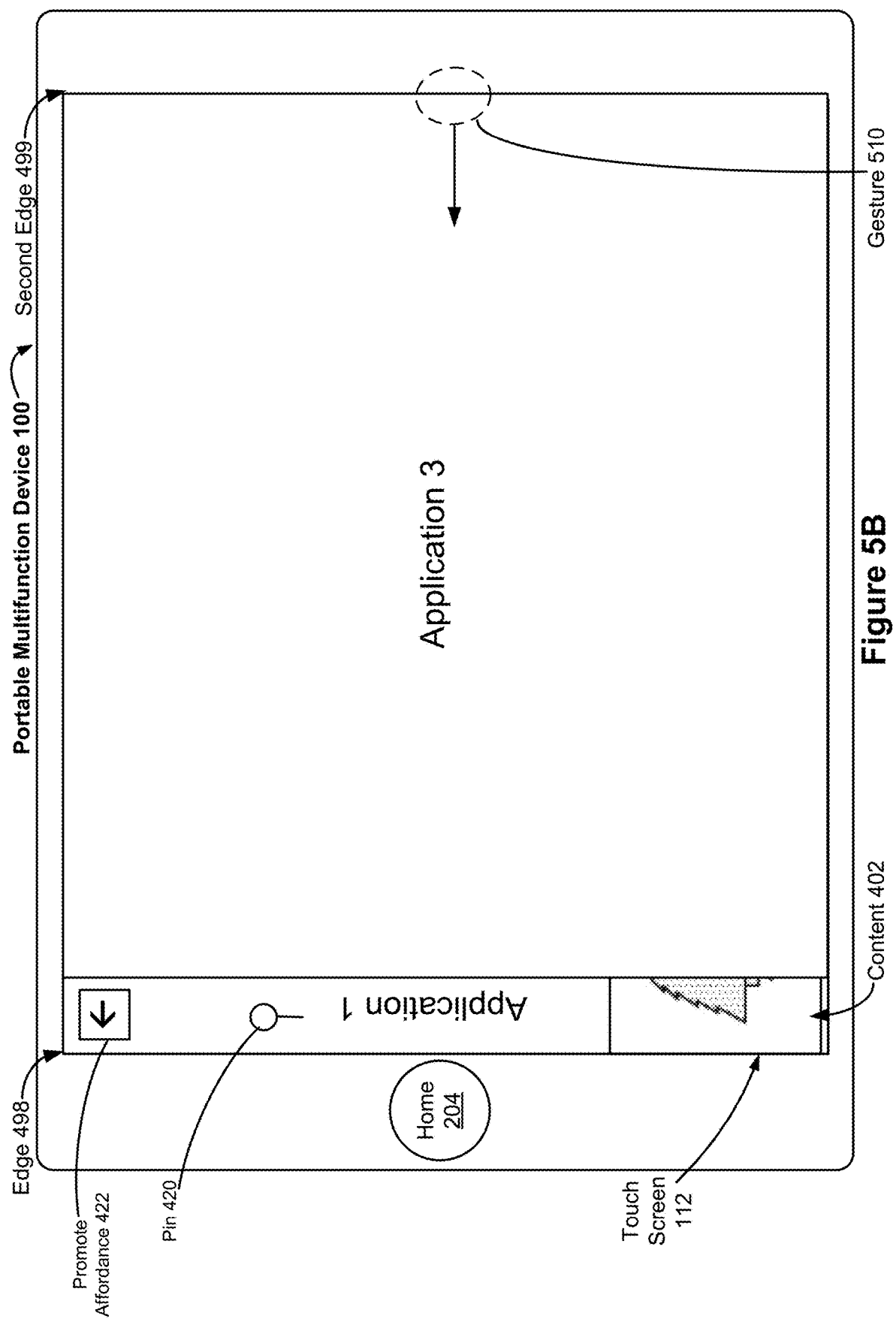

As to operation 350, in some embodiments, in response to detecting the selection of the additional selectable user interface element, the device: (i) ceases to display the second application, (ii) displays the third application, including content corresponding to the additional selectable user interface element, in the predefined portion, and (iii) continues to display the first application in the additional portion (as shown in FIG. 5B).

Figure 5C:
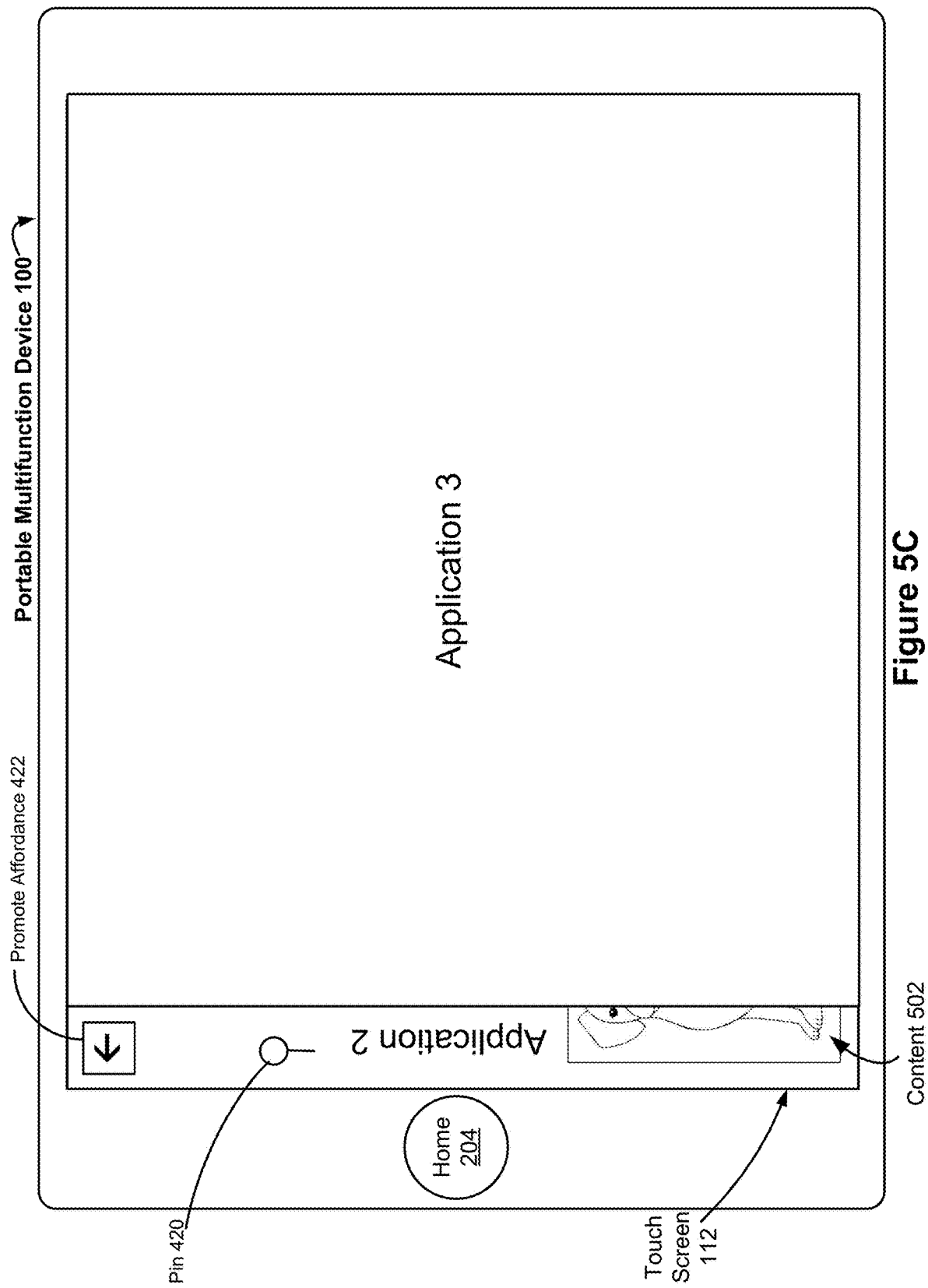

As to operation 352, in some embodiments, in response to detecting the selection of the additional selectable user interface element, the device: (i) ceases to display the first application, (ii) displays the third application, including content corresponding to the additional selectable user interface element, in the predefined portion, and (iii) displays the second application in the additional portion (as shown in FIG. 5C).

Figure 5D:
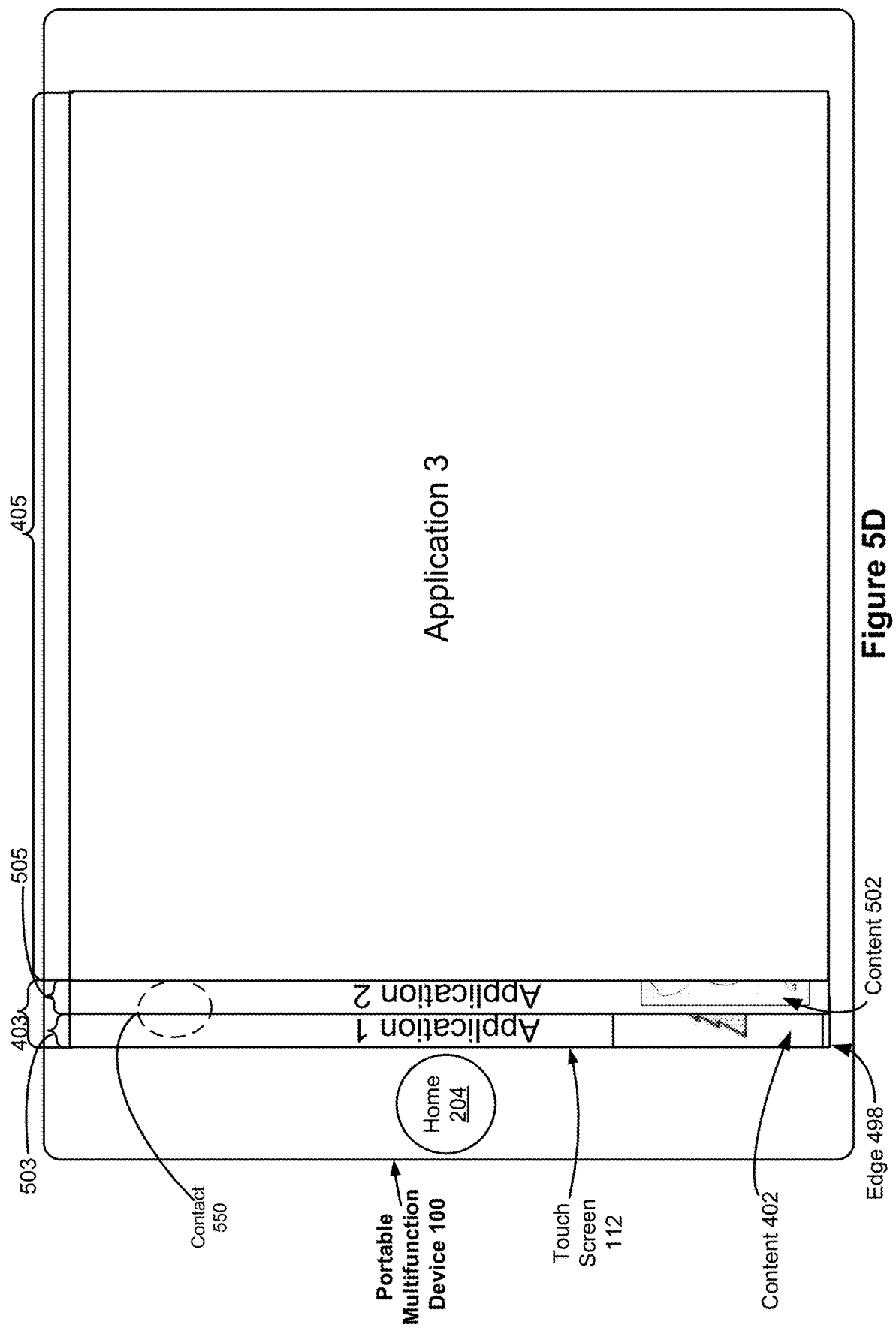
Figure 5E:
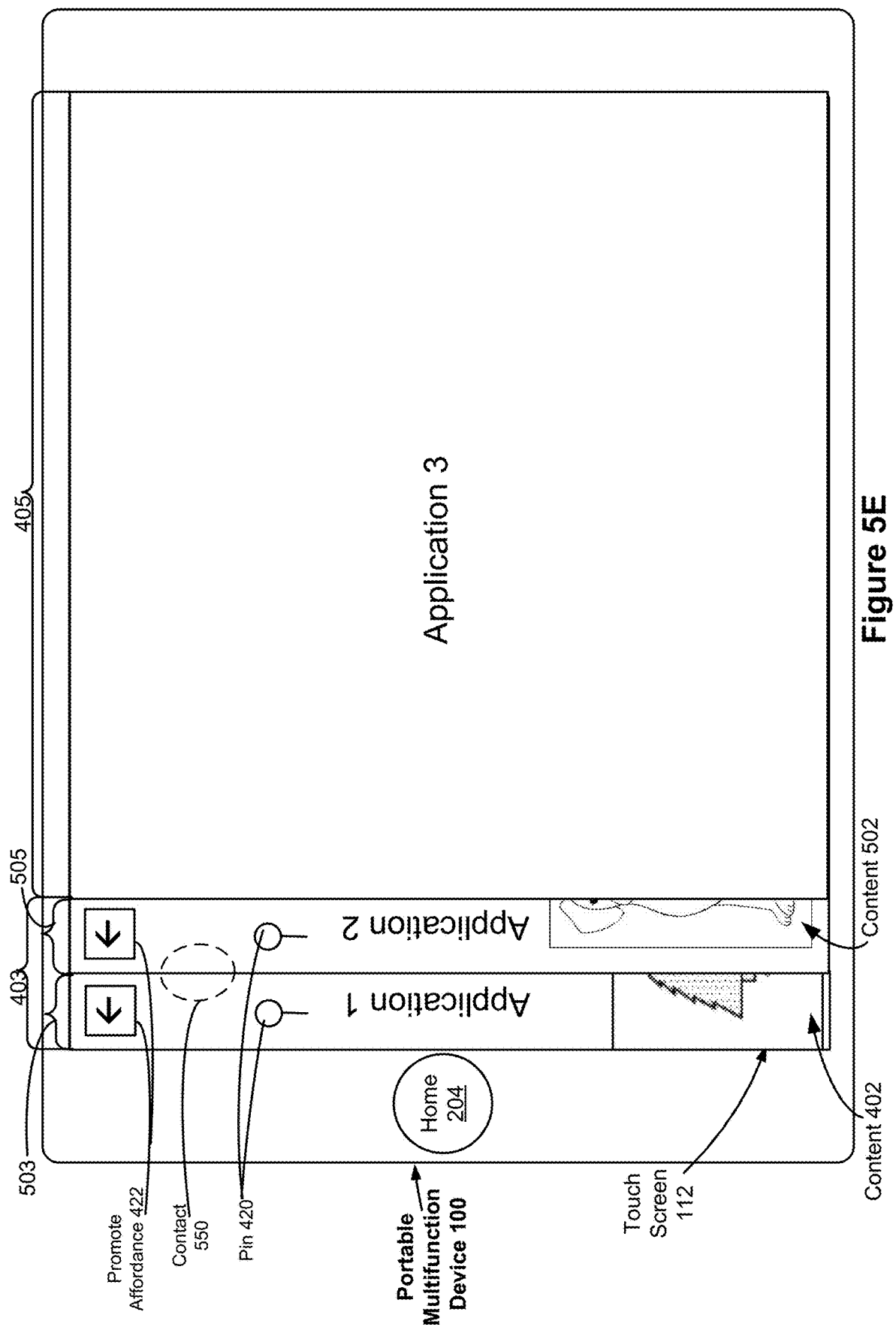

As to operation 354, in some embodiments, in response to detecting the selection of the additional selectable user interface element, the device: (i) displays the third application, including content corresponding to the additional selectable user interface element, in the predefined portion (e.g., predefined portion 405, FIG. 5D), (ii) displays the first application in a first sub-portion of the additional portion (e.g., first sub-portion 503 of additional portion 403) between the edge (e.g., edge 498, FIG. 5D) of the touch-sensitive display and a second sub-portion of the additional portion (e.g., second sub-portion 505 of additional portion 403), and (iii) displays the second application in the second sub-portion 505 of the additional portion (as shown in FIG. 5D). In some embodiments, and now with reference to FIG. 3E, the device detects (356) a contact over the first and/or second sub-portions of the additional portion (e.g., contact 550, FIG. 5D). While detecting the contact (or in response to a determination that an intensity of the contact (described above in reference to FIG. 1A) exceeds a threshold intensity of contact), the device increases (358) a size (e.g., a display width) of the additional portion 403, such that more of the first and second applications is visible on the touch-sensitive display (as shown in FIG. 5E). In some embodiments or circumstances, the contact 550 remains in continuous contact with the touch-sensitive display, without breaking the continuous contact for at least a predetermined amount of time (e.g., 2 or 3 seconds). In accordance with a determination that the contact 550 has remained in continuous contact with the touch-sensitive display for at least the predetermined amount of time (or in accordance with a determination that the intensity of the contact exceeds the threshold intensity of the contact), the device then performs the increasing operation 358. In some embodiments, the first and second sub-portions do not include the pin 420 and/or the promote affordance 422 (as shown in FIG. 5D), but after increasing the size of the additional portion 403 (and increasing a size for each of the first and second sub-portions as well), the first sub-portion 503 and the second sub-portion 505 both then display the pin 420 and the promote affordance 422 (as shown in FIG. 5E). In some embodiments, if the contact 550 lifts off from the touch-sensitive surface after the device performs the increasing operation 358, then the device decreases the size of the additional portion 403 such that the additional portion 403 returns to its first size (e.g., if the contact 550 is lifted off from the touch screen 112 while the touch screen 112 displays the user interface shown in FIG. 5E, then the devices decrease the size of the additional portion 403 until it returns to the first size of the additional portion 403 shown in FIG. 5D). In some other embodiments, instead of decreasing the size of the additional portion 403 in response to lift off of contact 550, the device, in response to detecting lift off of contact 550, continues to display the additional portion 403 with the increased size. In some embodiments, the user of device 100 configures a preference as to whether the device should decrease the size of the additional portion 403 or continue to display the additional portion 403 with the increased size, as described above.

Figure 5F:
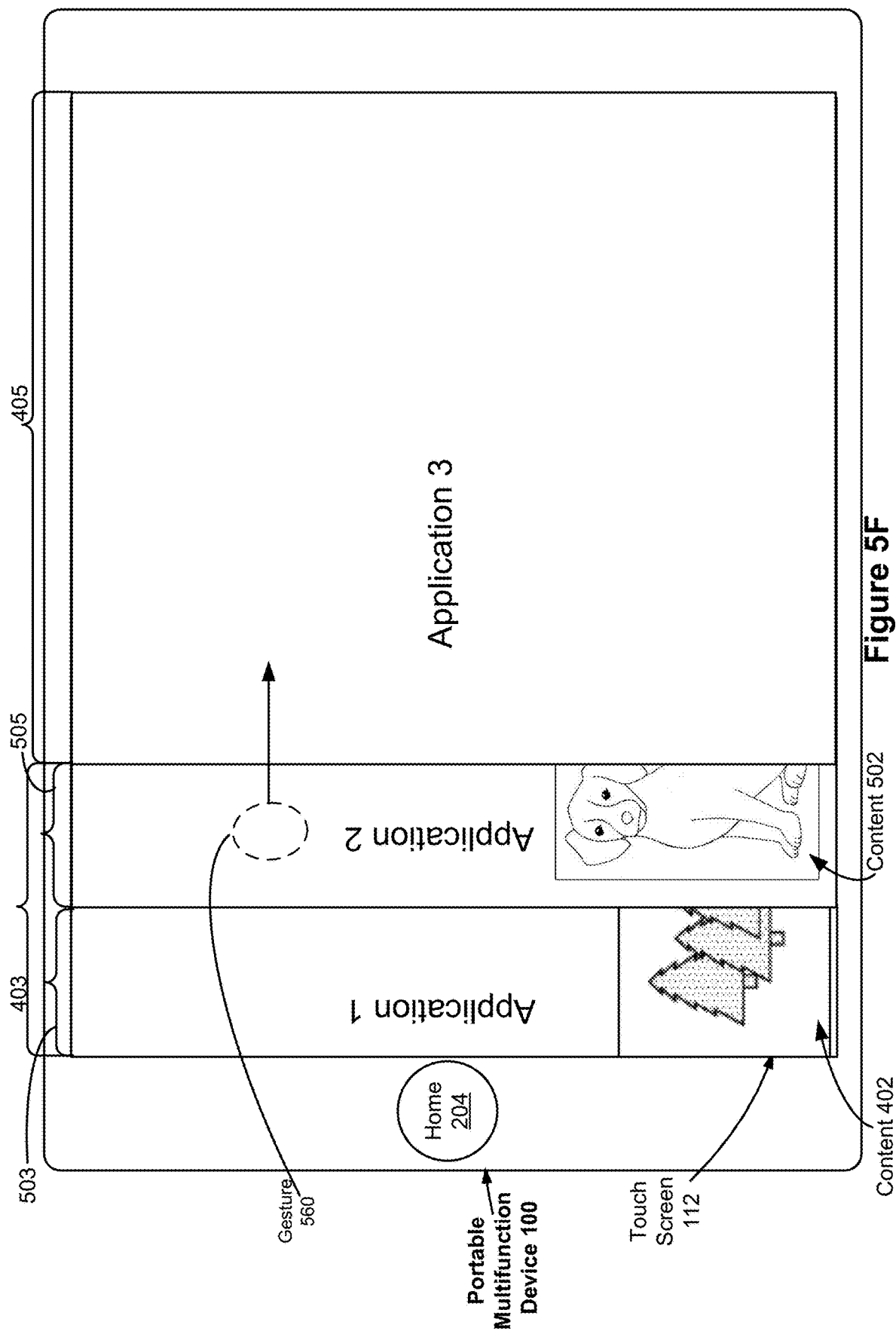
Figure 5G:
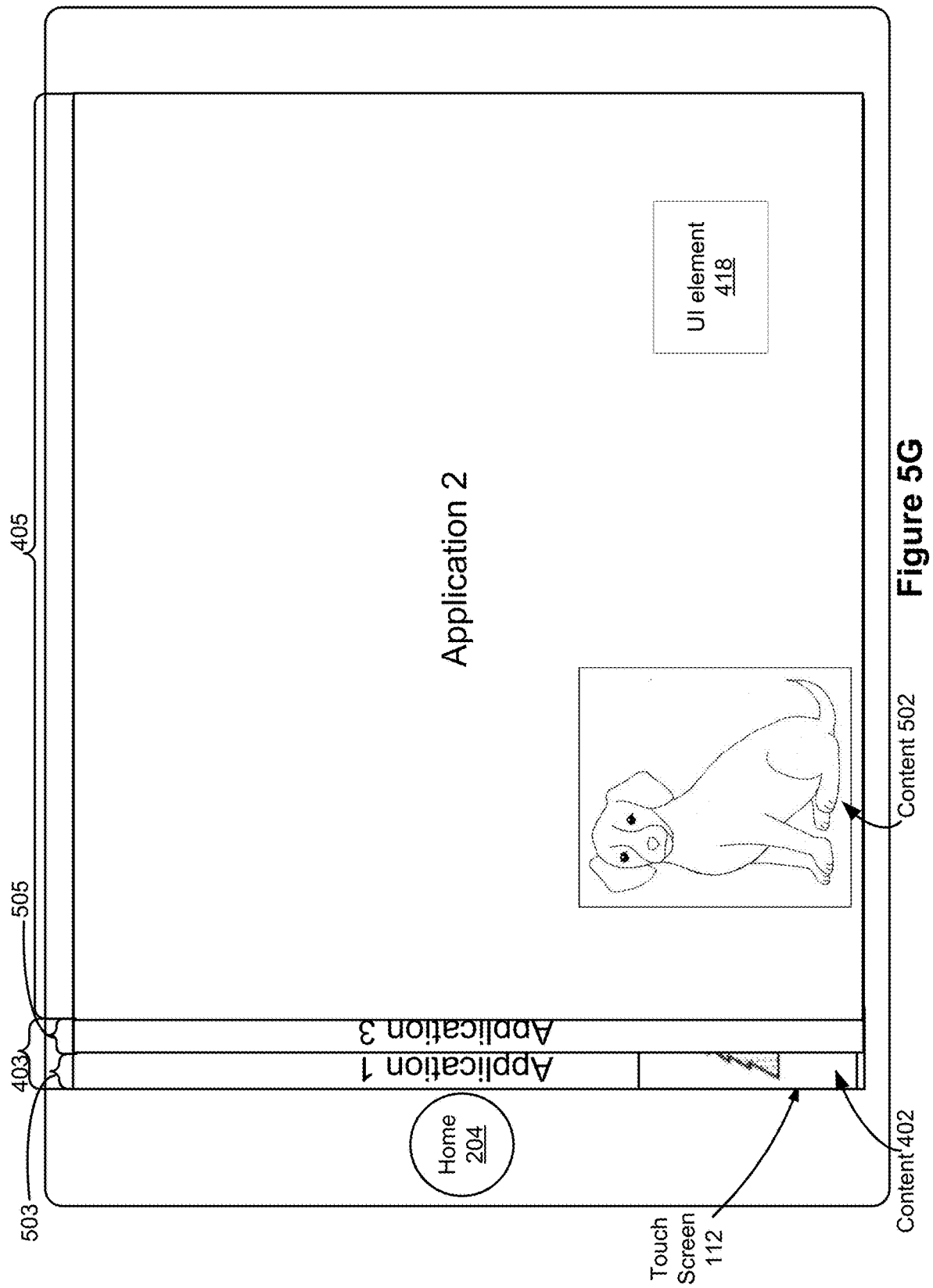

In some embodiments, the device detects (360) a gesture dragging the second sub-portion 505 (or dragging the application (e.g., application 2) displayed therein) of the additional portion towards the predefined portion (e.g., gesture 560, FIG. 5F). In some embodiments or circumstances, the gesture 560 is a continuation of the contact 550, such that after the contact 550 has remained in contact with the touch-sensitive display for more than the predetermined amount of time, the user moves the contact 550 in a substantially horizontal direction. In some embodiments or circumstances, after the contact 550 has remained in contact with the touch-sensitive display for more than the predetermined amount of time, the contact 550 is released or lifted off from the touch-sensitive display. The gesture 560 is then initiated as a distinct interaction with the touch-sensitive display. In some embodiments, the device detects (362) lift off of the gesture at the predefined portion (e.g., gesture 560 lifts off from the touch-sensitive display over application 3 (FIG. 5F)). In some embodiments, in response to detecting a release of or lift off of the gesture at the predefined portion, the device displays (364) the second application in the predefined portion previously occupied by application 3, continues to display the first application in the first sub-portion of the additional portion, and displays the third application in the second sub-portion of the additional portion (as shown in FIG. 5G, the additional portion 403 has returned to its first size and includes a first sub-portion 503 with the first application and a second sub-portion 505 with the third application). In some other embodiments, in response to detecting a release of or lift off of the gesture at the predefined portion, the device displays the second application in the full-screen mode.

Figure 6A:
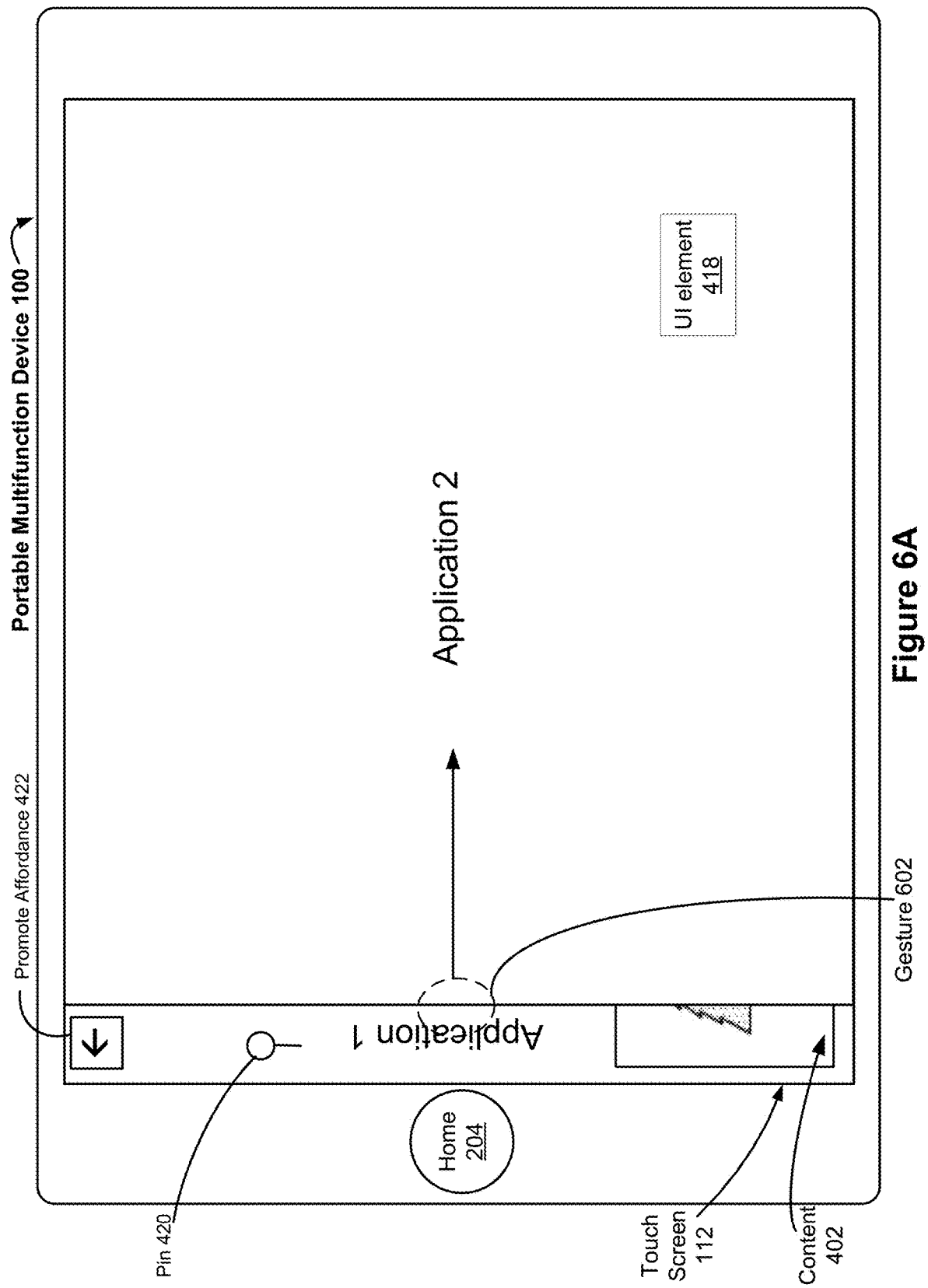
FIGS. 6A-6B are schematics of a touch-sensitive display used to illustrate a gesture for resizing and promoting applications while navigating in a full-screen mode between applications with linked content, in accordance with some embodiments.
Figure 6B:
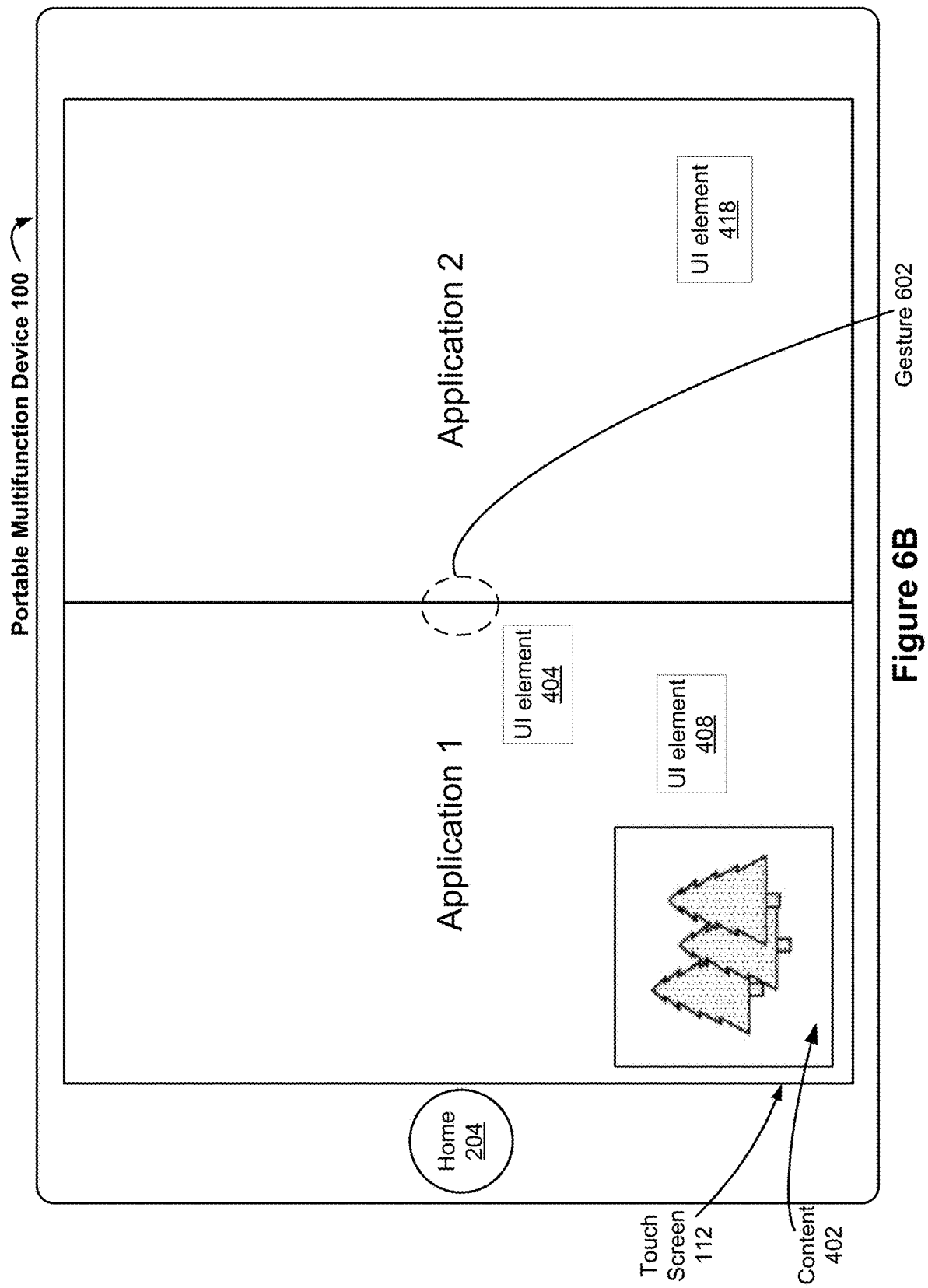

Turning now to FIG. 3F and continuing again from operation 314, in some embodiments, option E begins when the device detects (366) a dragging gesture at a border between the predefined portion and the additional portion (e.g., gesture 602, FIG. 6A, is at the border between application 1 and application 2) that moves the border to a predetermined location on the touch-sensitive display. In some embodiments, the predetermined location is a mid-point on the touch-sensitive display and the border is determined to be at the mid-point when the border has moved to within a threshold distance of the mid-point of the touch screen 112 (e.g., within 1, 1.5, 2, 2.5 or 3 pixels). Upon determining that the dragging gesture has moved the border to the predetermined location (or that a current position of the border is within the threshold distance of the mid-point, as shown in FIG. 6B, the gesture 602 has moved the border to within the threshold distance of the mid-point), the device resizes (368) the first and second applications to each occupy approximately 50% of the touch-sensitive display (e.g., as shown in FIG. 6B). In other words, application 2 is no longer displayed as overlaying application 1 and is instead displayed as a side application in a shared screen view with application 1.

Figure 7A:
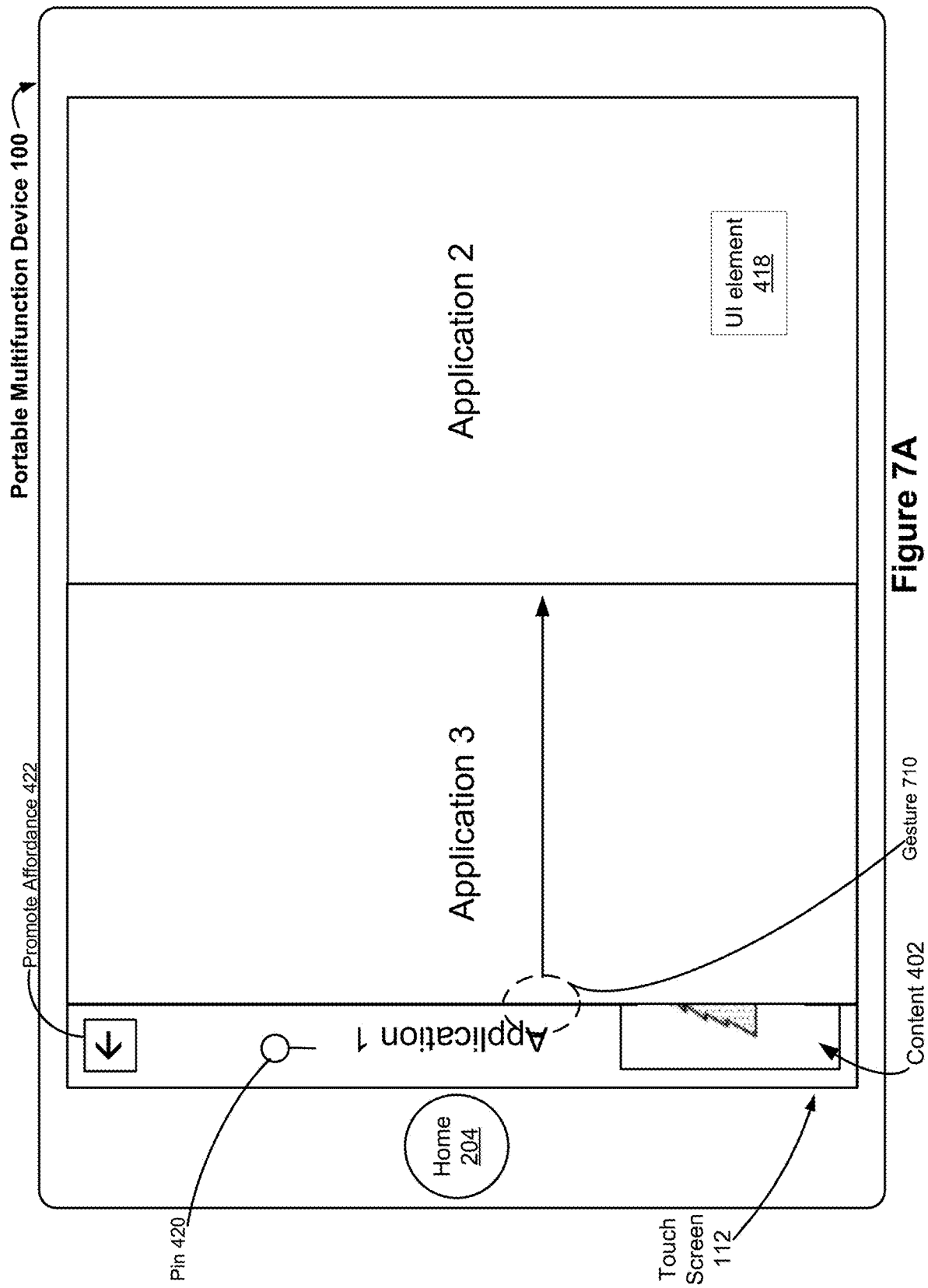
FIGS. 7A-7B are schematics of a touch-sensitive display used to illustrate a gesture for resizing and promoting applications while navigating in a shared screen mode between applications with linked content, in accordance with some embodiments.
Figure 7B:
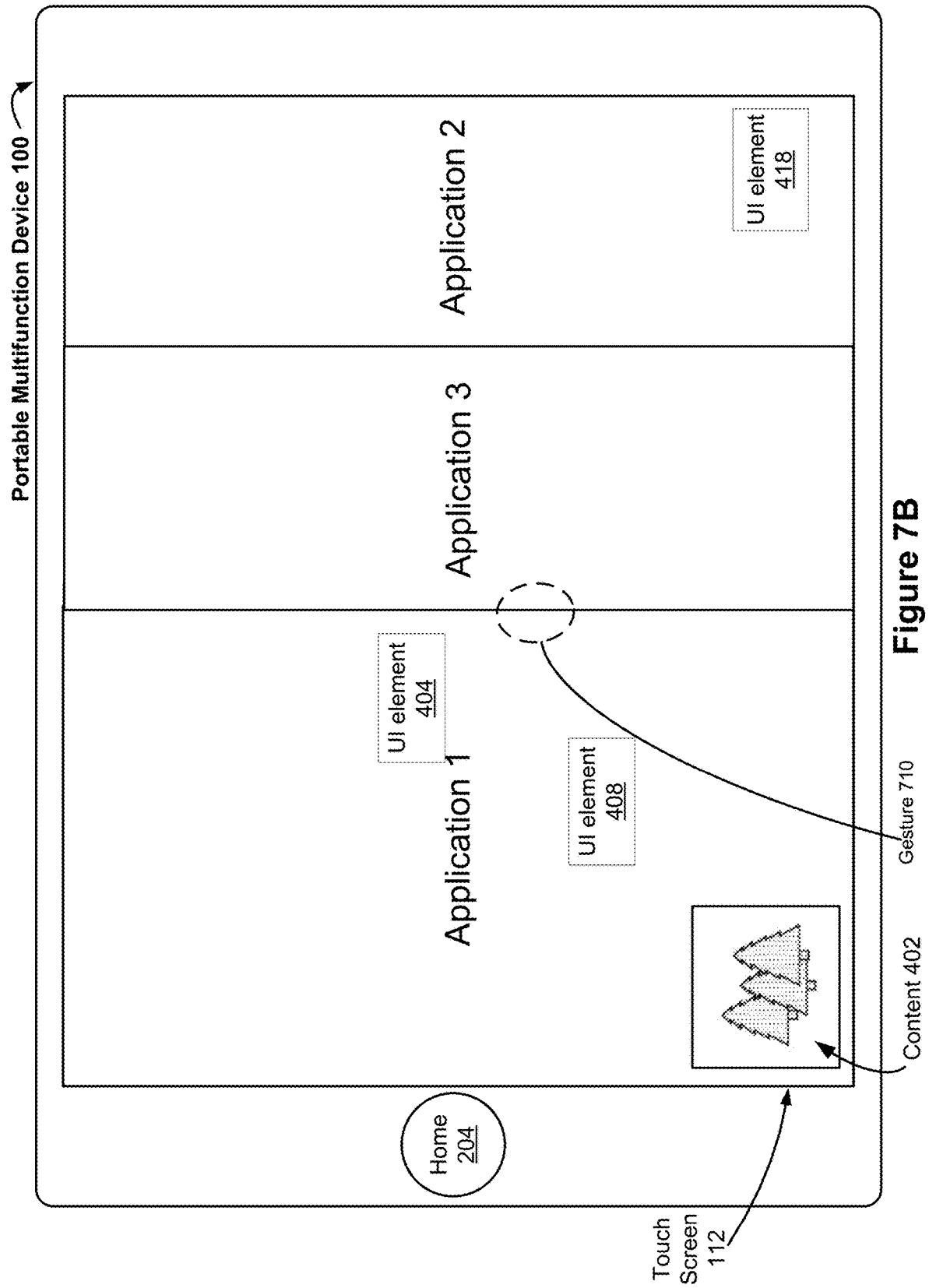

As shown in FIGS. 7A-7B, a similar resize gesture is available while applications are displayed in a shared screen view. As shown in FIG. 7A, application 1 is displayed in an additional portion of a main application portion of a shared screen view, application 3 is displayed within the main application portion and is overlaying application 1, and application 2 is displayed as in a side application portion of the shared screen view. In some embodiments, the user interface shown in FIG. 7A is displayed after a contact at a selectable user interface element displayed within either a main application or a side application (e.g., one of the contacts 444, FIG. 4E).

Turning back to FIG. 3F, option E, in the context of FIG. 7A's illustrated shared screen view, begins when the device detects (366) a dragging gesture at a border between the predefined portion (i.e., the portion in which Application 3 is displayed, FIG. 7A) and the additional portion (i.e., the portion in which application 1 is displayed, FIG. 7A) and a resize gesture is detected at a border between the additional portion of the main application portion (e.g., gesture 710, FIG. 7A, is at the border between application 1 and application 3) that moves the border to a predetermined location on the touch-sensitive display. In some embodiments, the predetermined location is a mid-point on the touch-sensitive display and the border is determined to be at the mid-point when the border has moved to within a threshold distance of the mid-point (e.g., within 1, 1.5, 2, 2.5 or 3 pixels). In some embodiments, upon determining that the dragging gesture has moved the border to the predetermined location (or that a current position of the border is within the threshold distance of the predetermined location, as shown in FIG. 7B, the gesture 710 has moved the border to within the threshold distance of the mid-point), the device resizes application 1 to occupy approximately 50% of the touch-sensitive display and resizes applications 2 and 3 to occupy the remaining approximately 50% of the touch-sensitive display (e.g., as shown in FIG. 6B). In other words, application 3 is no longer displayed as overlaying application 1 and, instead, applications 2 and 3 are displayed as side applications in a shared screen view with application 1.

Turning back to FIG. 3F and continuing once again from operation 314, in some embodiments, option F begins when the device detects (370) a dragging gesture on top of the second application (e.g., dragging gesture 460, FIG. 4G). The second application, in these embodiments, refers to the application that is displayed in the predefined portion (i.e., a predefined portion in the full-screen mode or a predefined portion in the shared screen view). Therefore, although dragging gesture 460 is illustrated on top of application 3 while application 3 is displayed in a shared screen view with application 1, a similar dragging gesture is also available on top of application 2 when application 2 is displayed in the predefined portion and application 1 is in the additional portion (e.g., application 2 as shown in FIG. 4B).

Figure 4H:
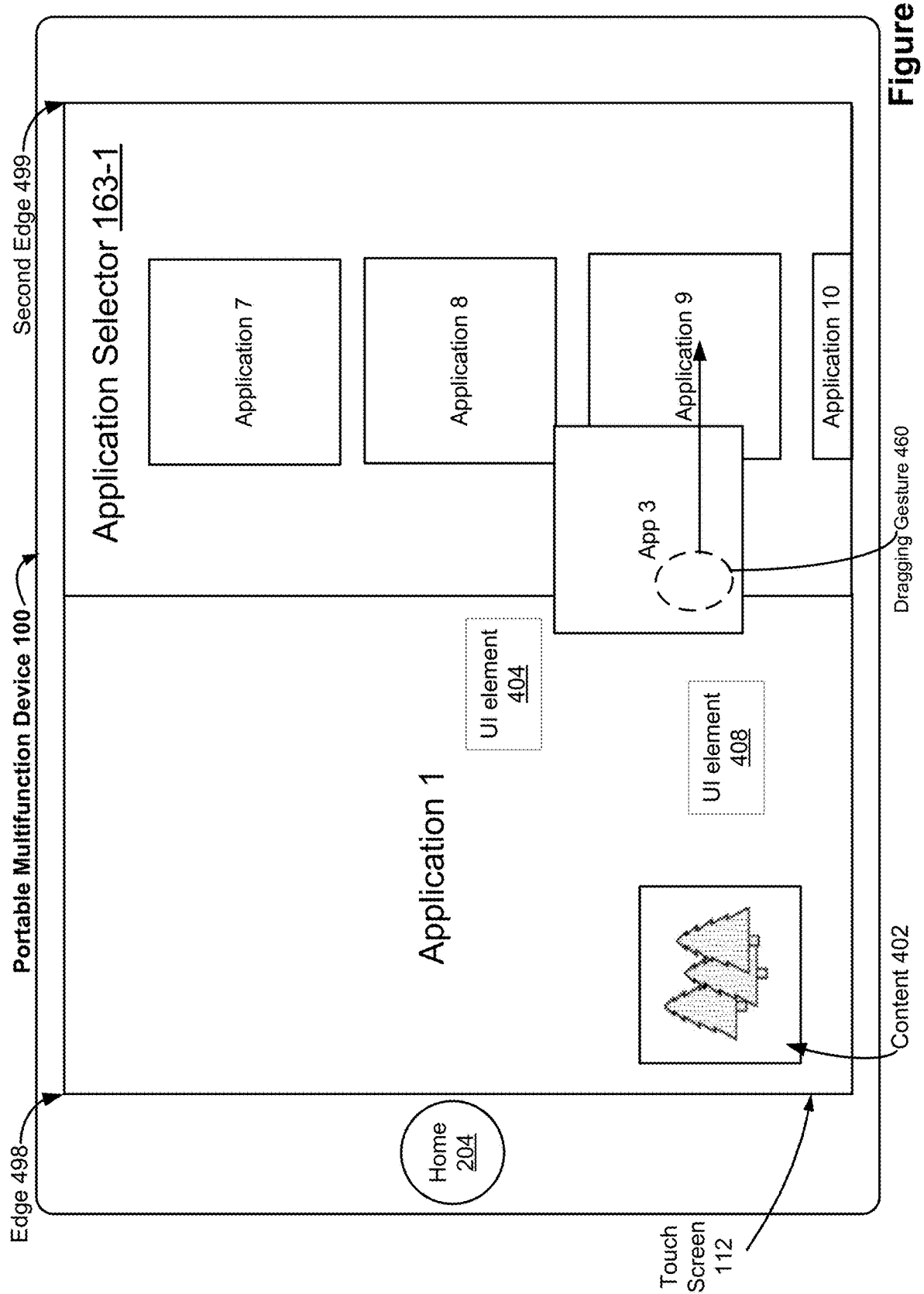

In accordance with a determination that the dragging gesture is within a predetermined distance of a second edge 499 (e.g., second edge 499), opposite the edge (e.g., edge 498, FIG. 4H), of the touch-sensitive display, the device displays (372) an application selector (e.g., application selector 163-1) with a plurality of selectable affordances corresponding to applications available on the device (as shown in FIG. 4H). In some embodiments, the application selector is displayed as occupying approximately 50% of the touch-sensitive display, while in other embodiments, the application selector is displayed as occupying approximately 33% or 25% of the touch-sensitive display (and application 1 (or the application that is displayed in the additional portion) is displayed as occupying the remaining space on the touch-sensitive display that is not occupied by the application selector, e.g., 50%, 67%, or 75%).

As also shown in FIG. 4H, during the dragging gesture, the second application (or a user interface representation corresponding to the second application, such as an icon or a reduced size view of the second application) is displayed as well (e.g., the user interface representation of app 3, FIG.

Figure 4I:
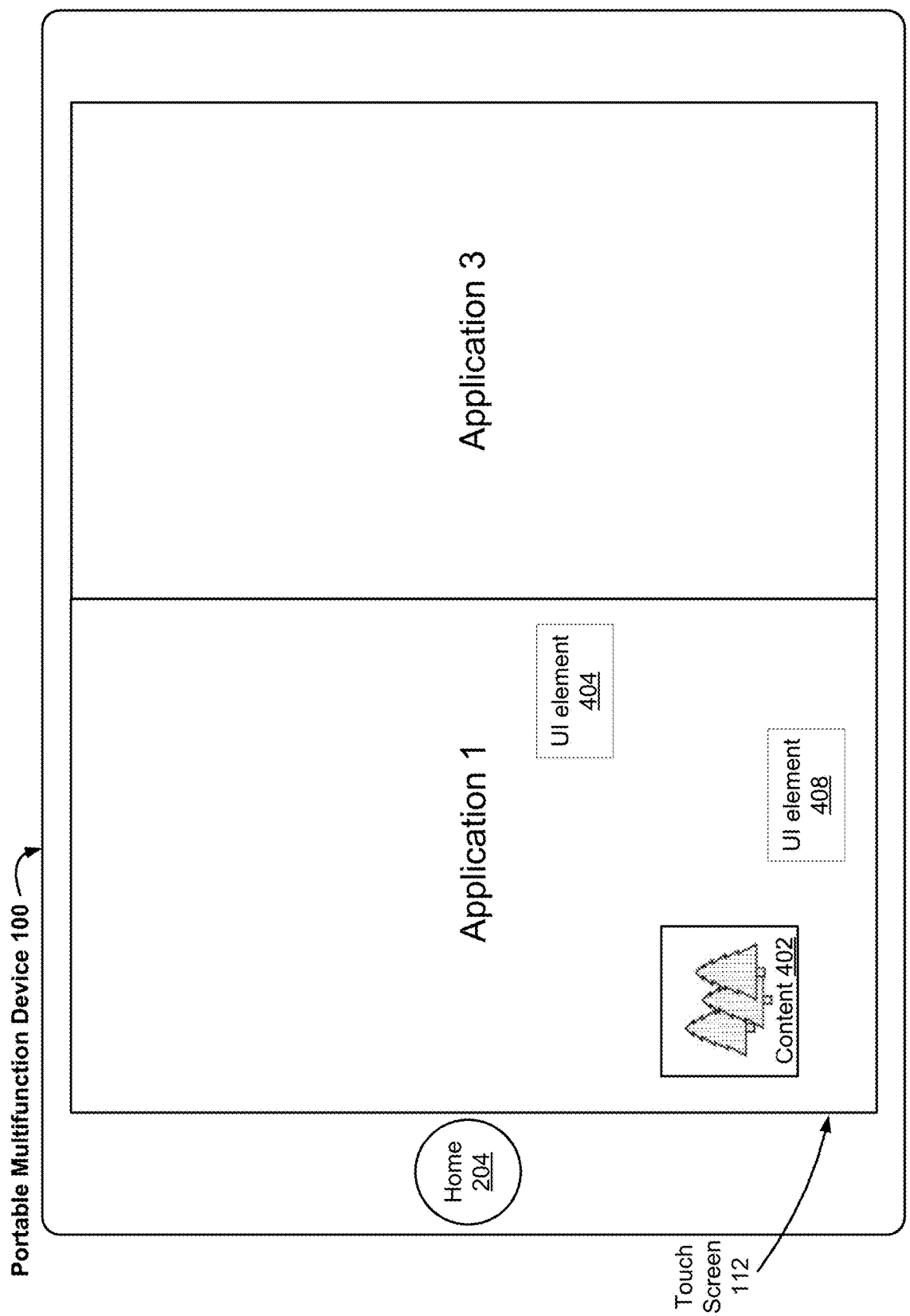

4H). In some embodiments, the device detects (374) a release or lift off of the dragging gesture over the application selector (e.g., the contact associated with dragging gesture 460 is lifted off from the touch-sensitive display substantially at the position shown in FIG. 4H). In response to detecting lift off of the dragging gesture, the device displays (376) the second application in the space previously occupied by the application selector and displays the first application in a remaining portion of the touch-sensitive display (as shown in FIG. 4I, applications 3 and 1 are displayed in a shared screen mode after the lift off (in other words application 3 is promoted to be a side application after the dragging gesture)). As mentioned above, the dragging gesture is also accessible from user interfaces similar to the one shown in FIG. 4B. For example, after lift off of a dragging gesture similar to dragging gesture 460 that is instead over application 2 of FIG. 4B, applications 2 and 1 are displayed in a shared screen mode after the lift off (in other words application 2 is promoted to be a side application after the dragging gesture). In this way, users are provided with a convenient and easy-to-use dragging gesture that can be easily accessed and seamlessly used in both full-screen and shared screen display modes.

In some embodiments, the second application while concurrently displayed next to the first application in the shared screen view after the dragging gesture, also includes an additional selectable user interface element (e.g., application 2 includes UI element 418, FIG. 4E). In some embodiments, the device detects (378) a selection of the additional selectable user interface element displayed within the second application (e.g., the device detects contact 444 over UI element 418, FIG. 4E). In response to detecting the selection, the device: (i) ceases (380) to display the second application, (ii) displays the third application in the predefined portion, and (iii) displays the first application in the additional portion (as shown in FIG. 5B).

Figure 5H:
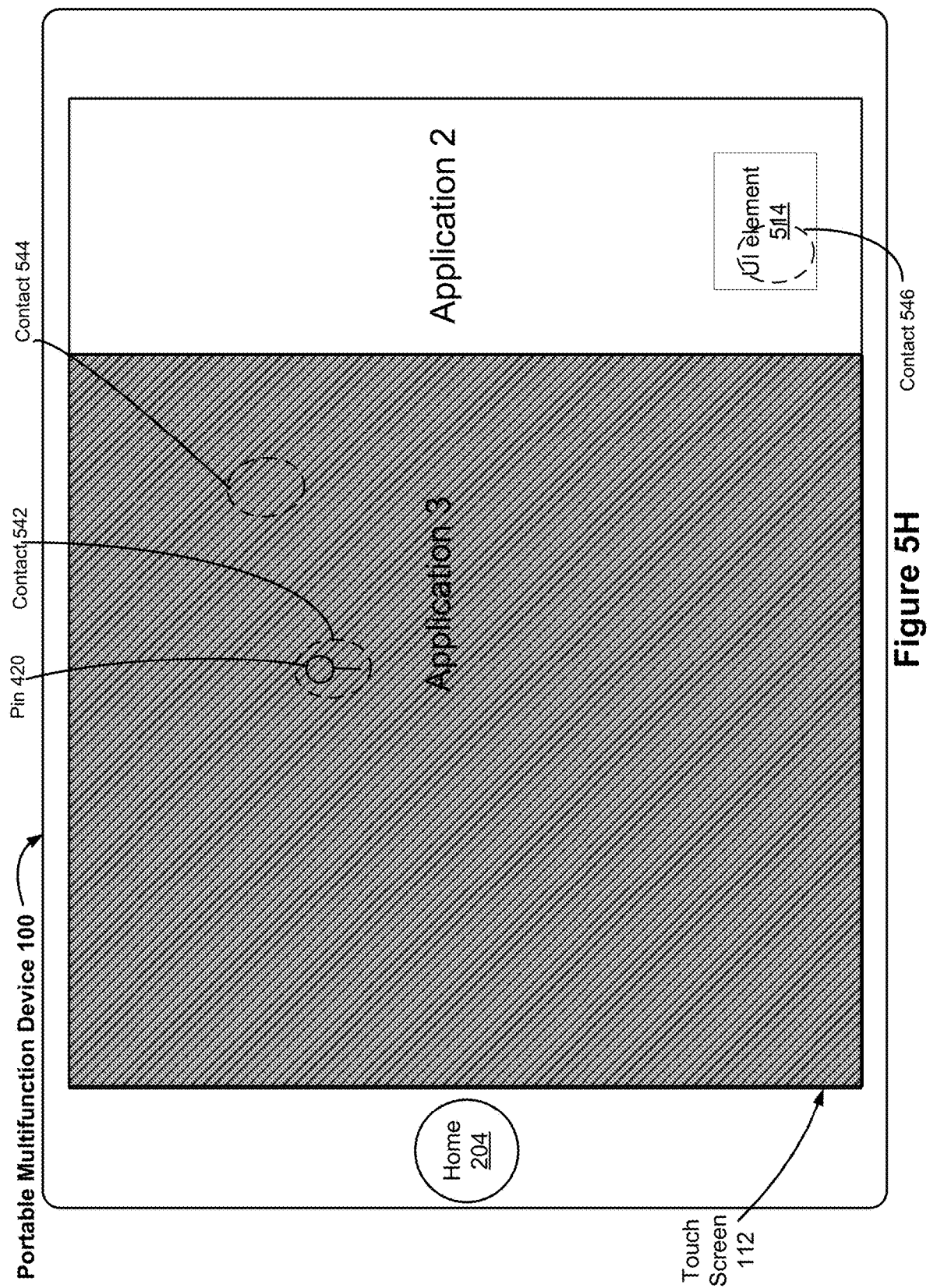

In some embodiments, a user of the device is then able to quickly access the previously-displayed side application (e.g., application 2, FIG. 4E) using a swipe gesture. For example, the device detects (382) a swipe gesture (e.g., gesture 510, FIG. 5B) moving from the second edge (e.g., second edge 499, FIG. 5B) of the touch-sensitive display towards the edge (e.g., edge 498, FIG. 5B) of the touch-sensitive display. In some embodiments, in response to detecting the swipe gesture, the device: (i) ceases (384) to display the first application, (ii) displays the second application overlaying the third application, and (iii) dims the third application (e.g., reduces a brightness associated with an area of the touch-sensitive display in which the third application is displayed). For example, FIG. 5H shows the user interface displayed on touch screen 112 after the swipe gesture 510 of FIG. 5B. In this way, the swipe gesture 510 allows a user of the device to quickly access a previously-used side application (in this example, application 2).

Figure 5I:
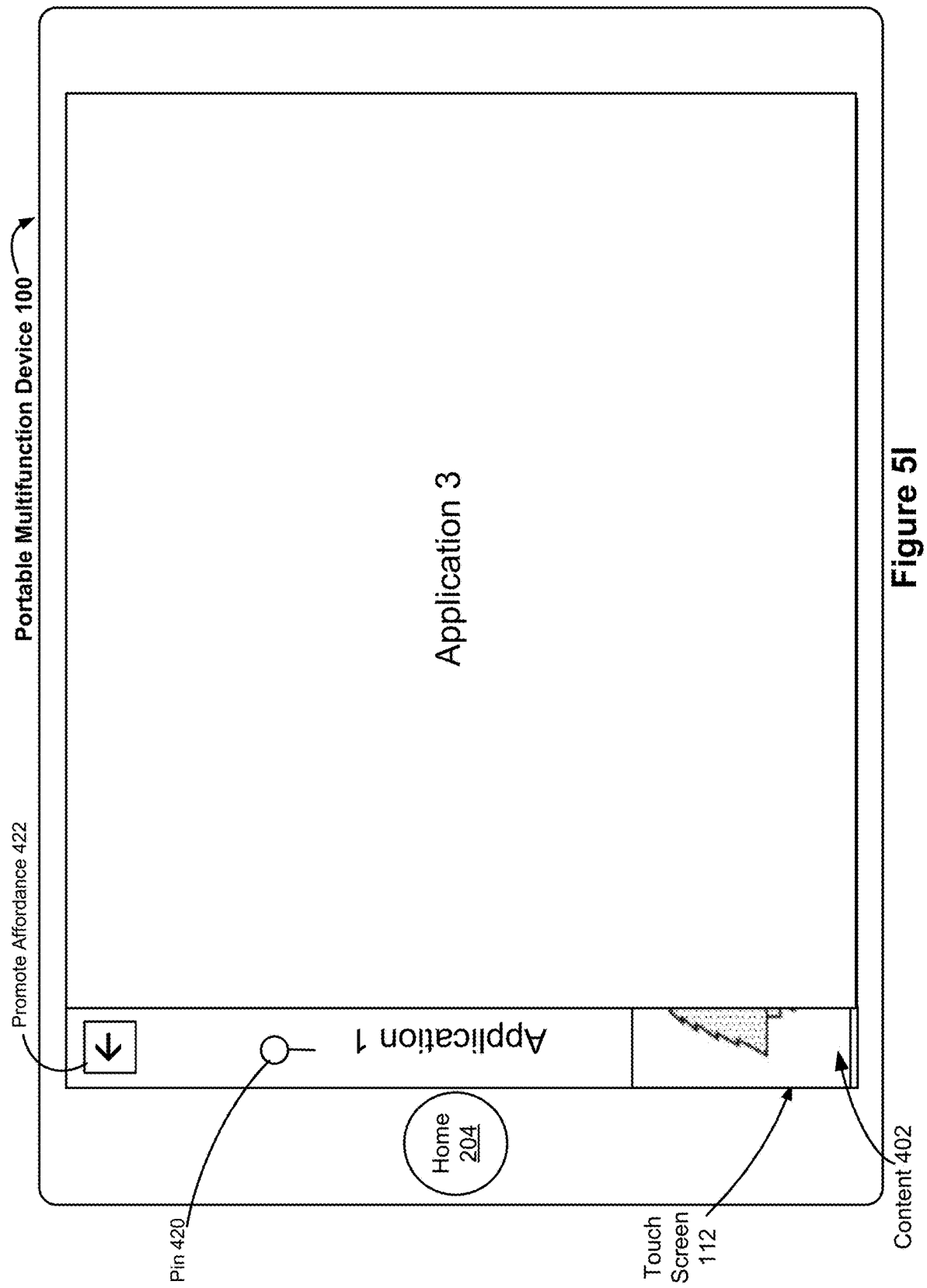
Figure 5J:
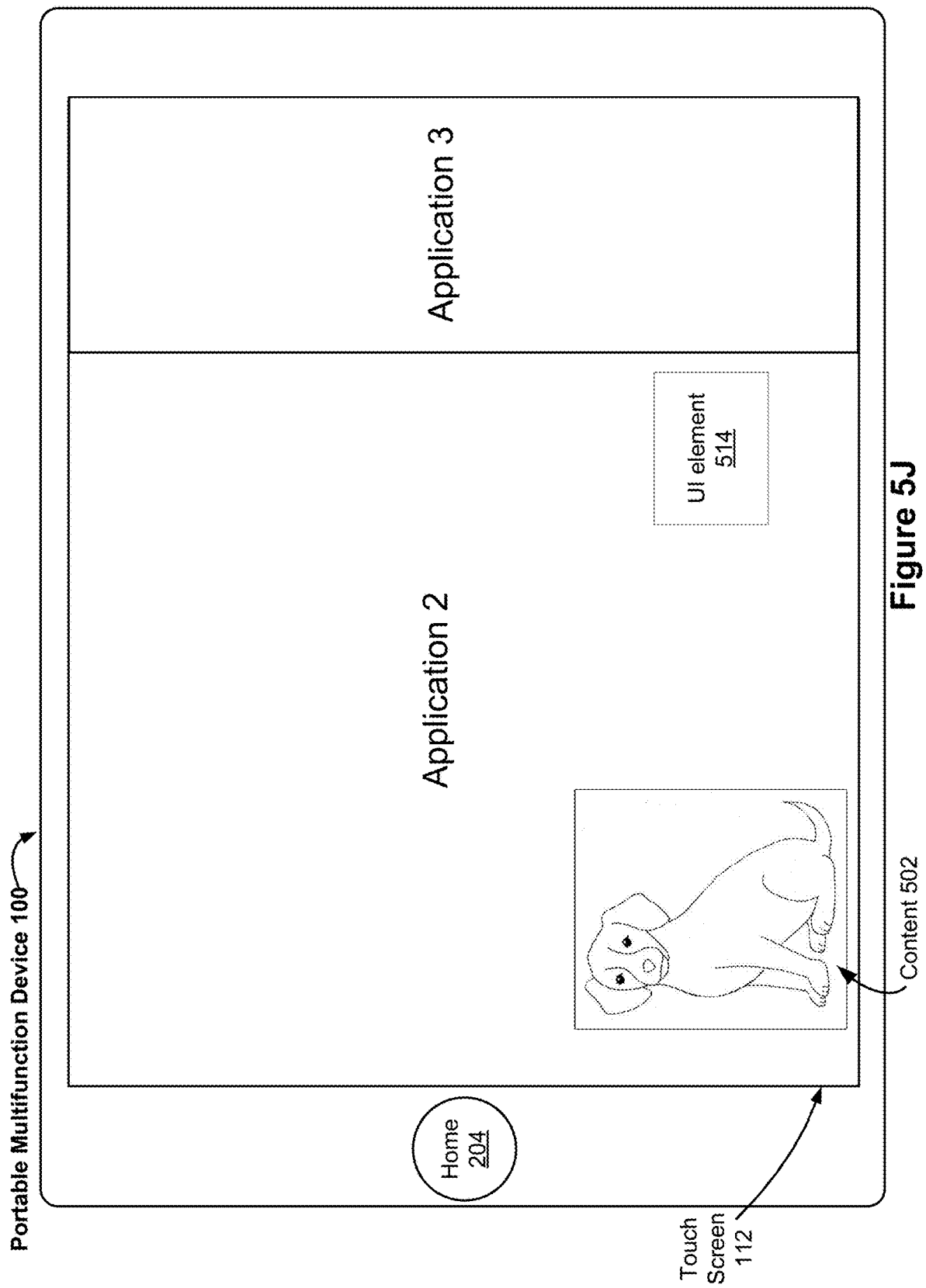

In some embodiments, the dimmed third application also optionally includes a pin 420 for pinning the third application in a shared screen view. In some embodiments, in response to detecting a contact at the pin 420 (e.g., contact 542, FIG. 5H), the device displays a shared screen view of applications 2 and 3 (e.g., as shown in FIG. 5J).

In some embodiments, the user is also provided with a way to quickly dismiss the side application (e.g., application 2, FIG. 5H). For example, the device detects a contact within the dimmed third application (e.g., contact 544, FIG. 5H). In some embodiments, in response to detecting the contact, the device (i) ceases (386) to display the second application, (ii) displays the third application in the predefined portion, and (iii) displays the first application in the additional portion (as shown in FIG. 5I). In other words, by tapping within the dimmed application 3, the user is able to quickly return to the user interface displayed before the swipe gesture 510 was used to re-display application 2 as the side application (i.e., the user can use swipe gesture 510 (FIG. 5B) to activate the overlaid side application 2 (FIG. 5H), and can quickly dismiss the overlaid side application and return to the user interface shown in FIG. 5B by simply clicking within the dimmed application 3 of FIG. 5H).

Figure 5K:
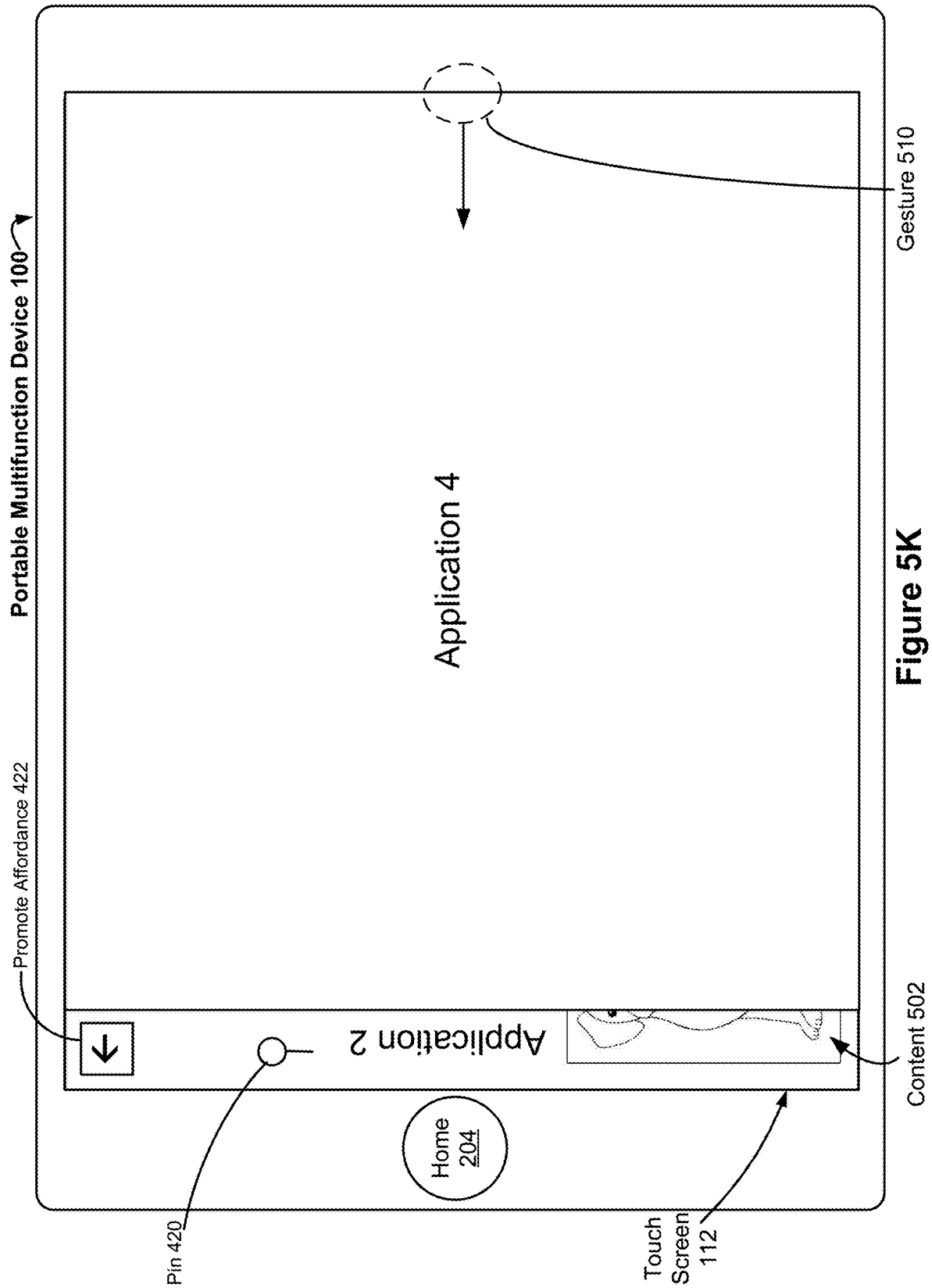
Figure 5L:
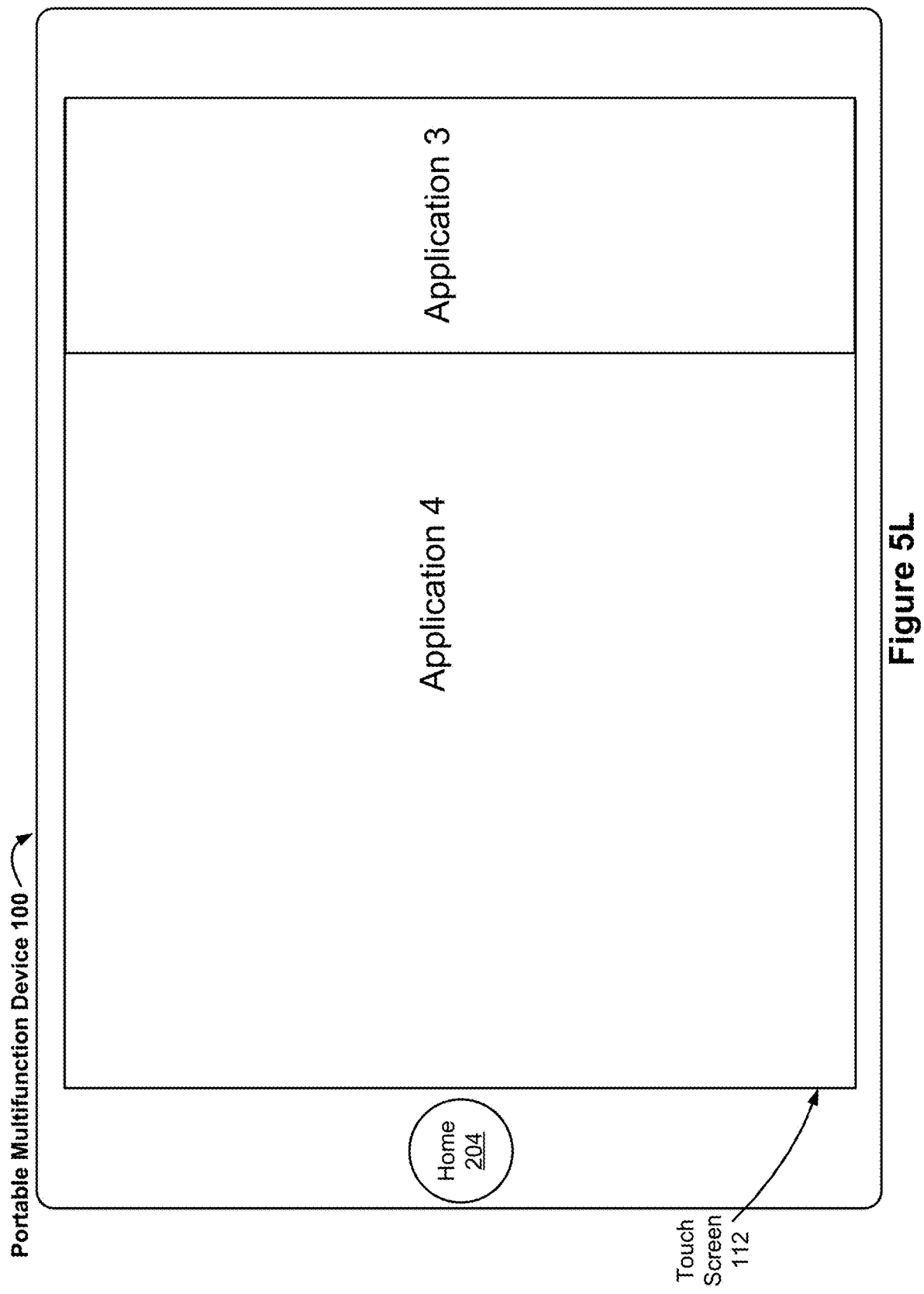

In some embodiments, the overlaid application (e.g., application 2 of FIG. 5H) includes another selectable user interface element (e.g., a link to content associated with a fourth application). In response to detecting a selection of the another selectable user interface element (e.g., contact 546 over UI element 514, FIG. 5H), the device displays the fourth application in the predefined portion and displays the second application in the additional portion (as shown in FIG. 5K). Additionally, the gesture 510 is again available (as shown in FIG. 5K) and allows the user of the device to quickly access the previously-used side application (e.g., as shown in FIG. 5L, in response to detecting the gesture 510, the device displays previously-used application 3 as overlaying application 4).

Figure 9A:
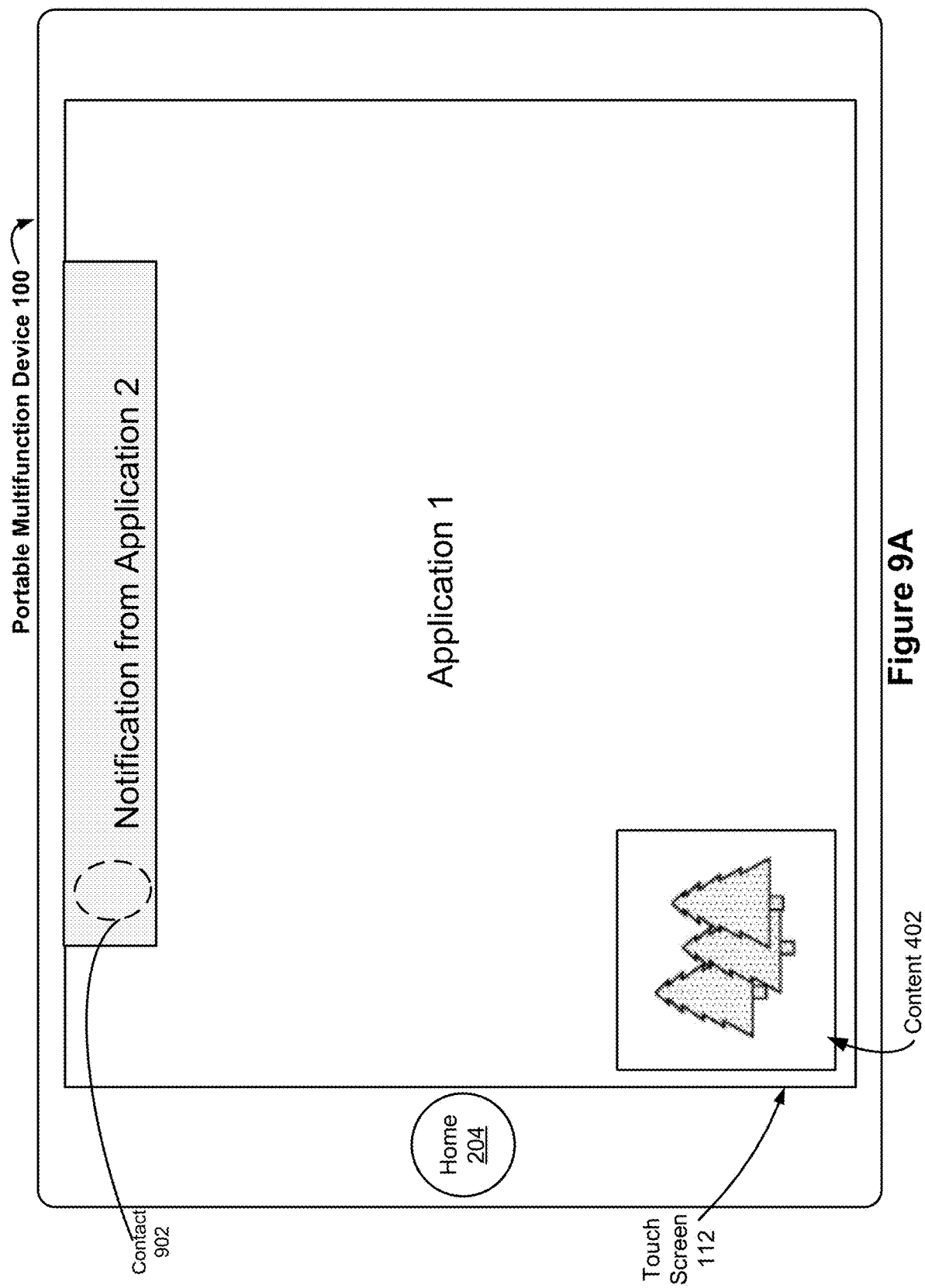
FIGS. 9A-9B are schematics of a touch-sensitive display used to illustrate navigation between applications in a full-screen mode using notification banners, in accordance with some embodiments.
Figure 9B:
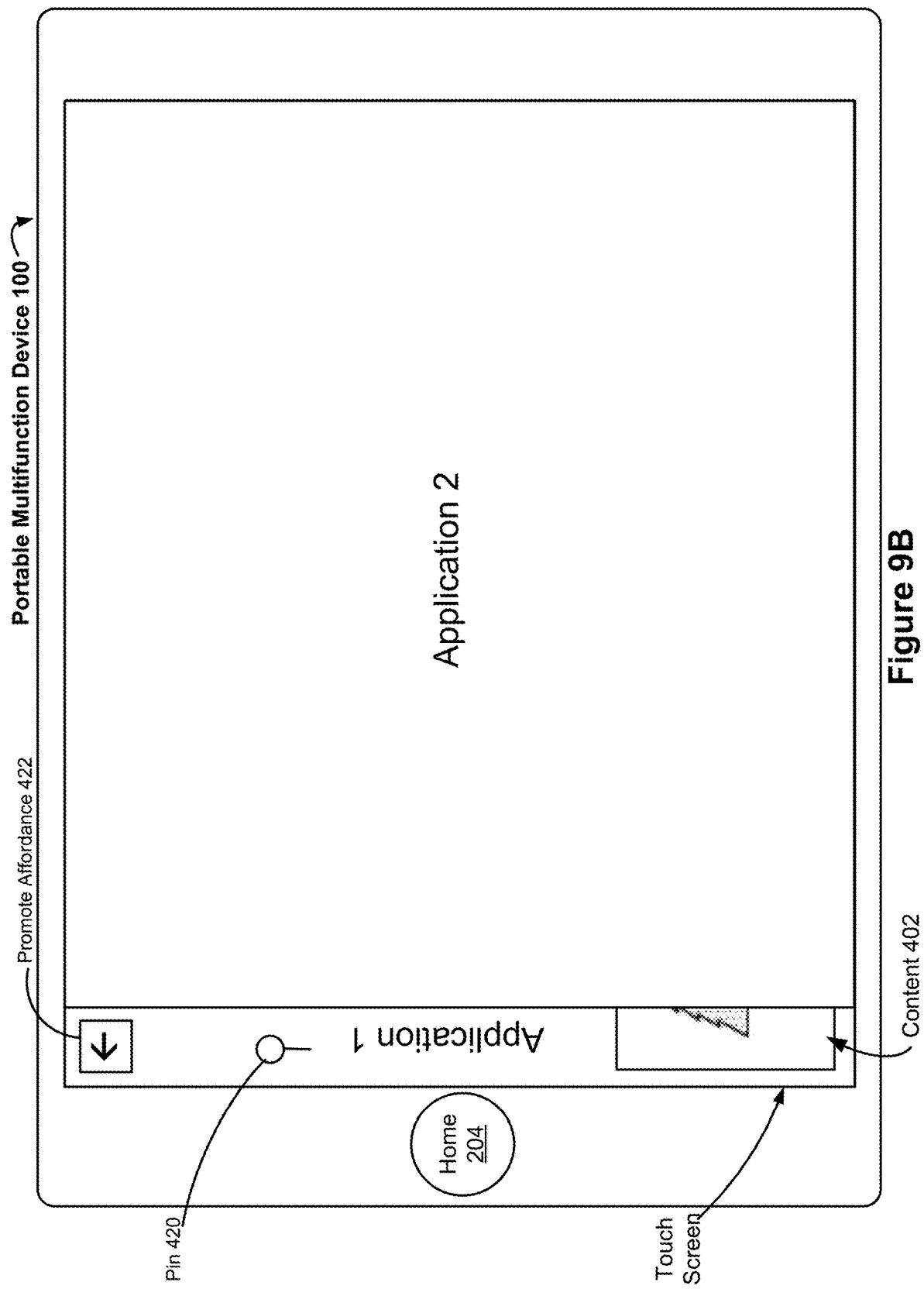

FIGS. 9A and 9B illustrate that the selectable user interface elements and additional selectable user interface elements described above are, in some embodiments or circumstances, notification banners associated with one or more applications (e.g., notification from application 2, as shown in FIG. 9A). As shown in FIG. 9A, in response to detecting a contact at the notification banner (e.g., contact 902 over notification from application 2), the device displays application 2 in the predefined portion and displays application 1 in the additional portion (as shown in FIG. 9B). The additional embodiments and examples provided above in reference to method 300 apply as well to embodiments or circumstances in which the selectable user interface elements discussed in reference to method 300 are instead notification banners.

Figure 10A:
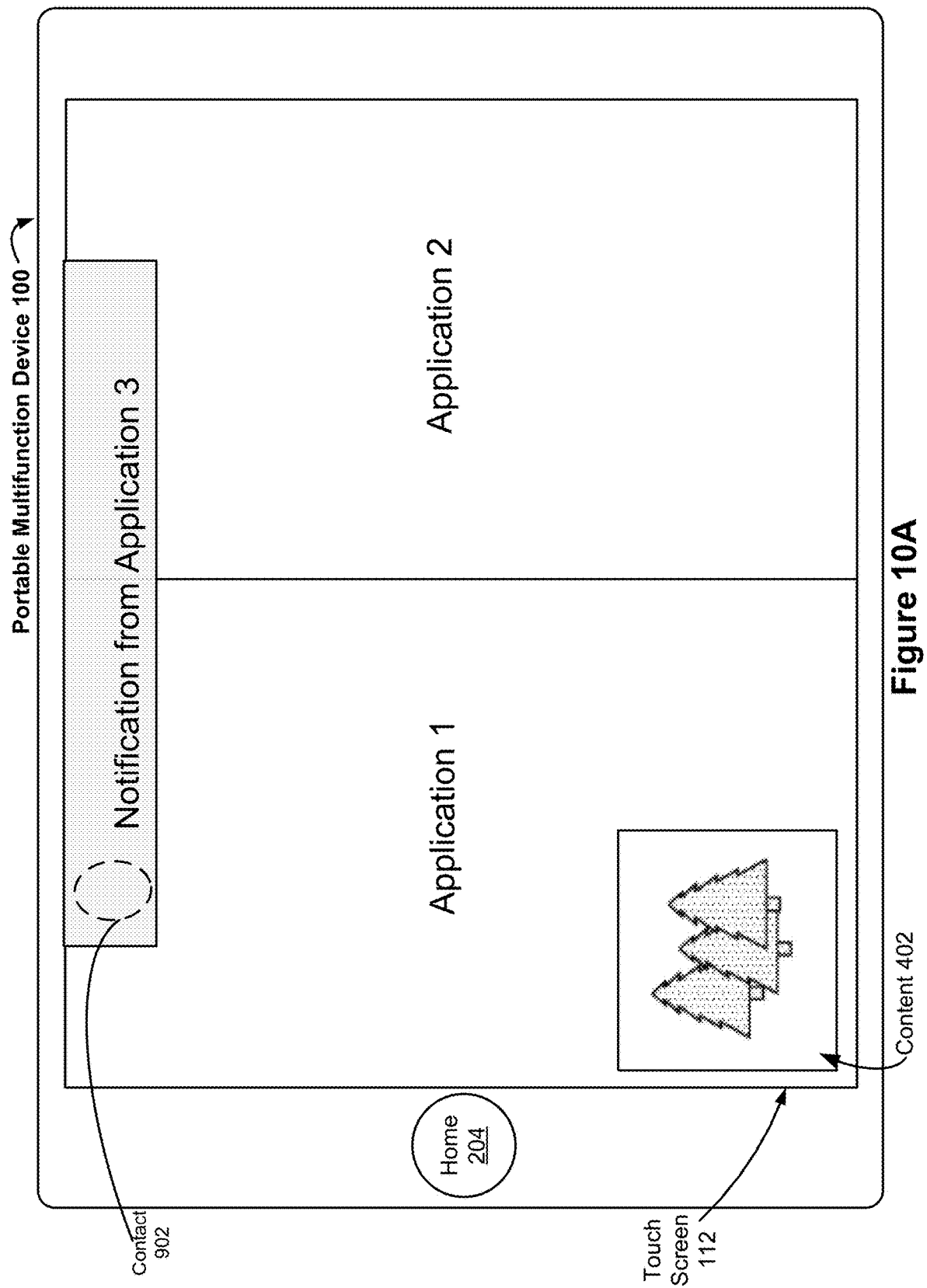
FIGS. 10A-10B are schematics of a touch-sensitive display used to illustrate navigation between applications in a shared screen mode using notification banners, in accordance with some embodiments.
Figure 10B:
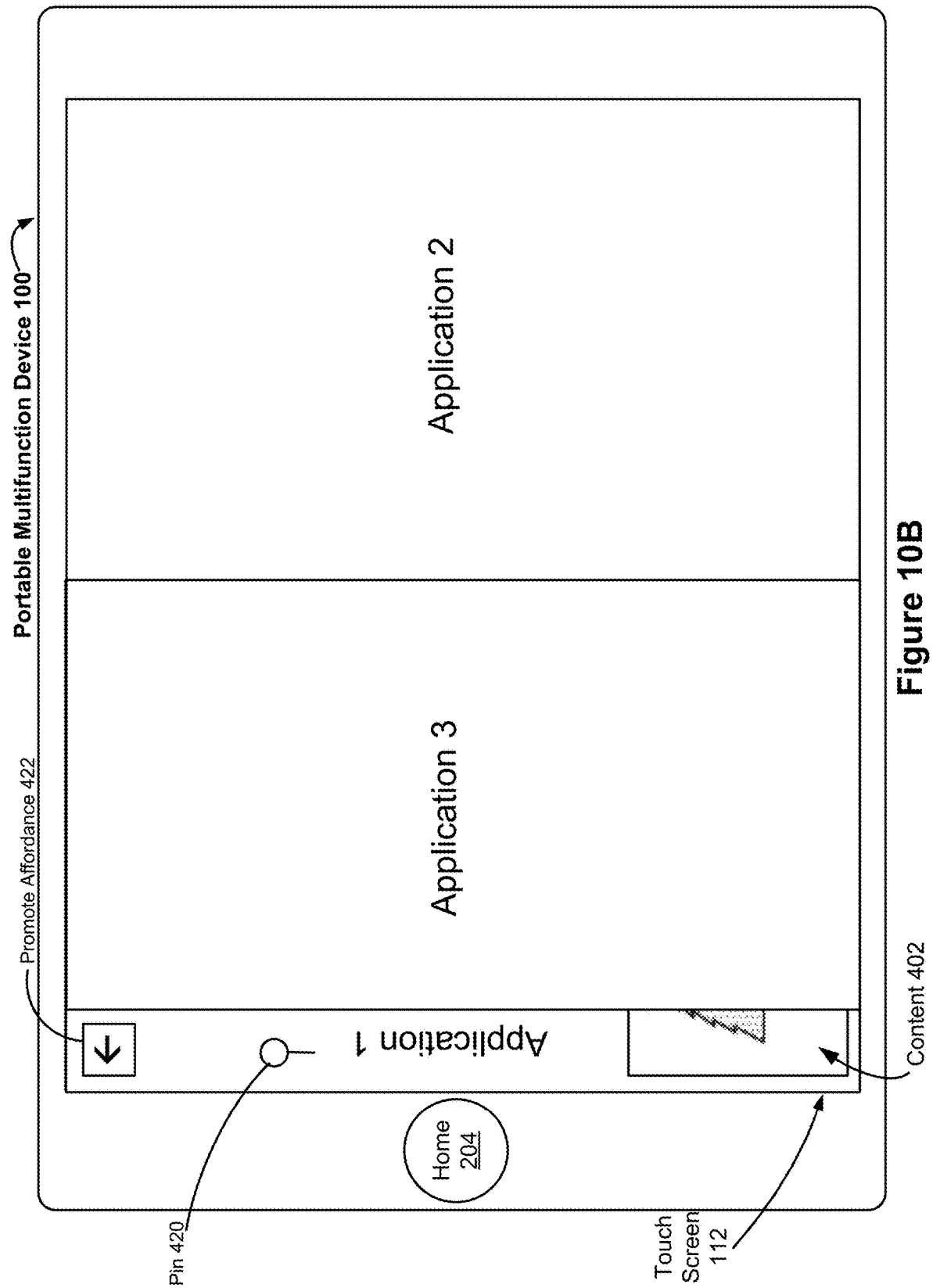

Similarly, FIGS. 10A-10B illustrate that notification banners may also be displayed in the shared screen view and that selection of a notification banner that is displayed in the shared screen view causes the device to perform similar functions discussed above with reference to the functions performed by the device in response to detecting selection of the selectable UI elements discussed in reference to method 300. For example, as shown in FIG. 10A, in response to detecting a contact over a notification banner (e.g., contact 902 over notification from application 3), the device displays application 3 in a predefined portion of the main application section of the shared screen view, displays application 1 in the additional portion of the main application section, and continues to display application 2 in the side application section (as shown in FIG. 10B). The additional embodiments and examples provided above in reference to method 300 apply as well to embodiments or circumstances in which the selectable user interface elements discussed in reference to method 300 are instead notification banners displayed in a shared screen view.

It should be understood that the particular order in which the operations in FIGS. 3A-3G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 1100) are also applicable in an analogous manner to method 300 described above with respect to FIGS. 11A-11D. For example, the additional portion described above with reference to method 300 optionally has one or more of the characteristics of the indications corresponding to a particular application (e.g., indication 1202) described herein with reference to other methods described herein (e.g., method 1100). For brevity, these details are not repeated here.

FIGS. 11A-11D illustrate flowchart representations of a method 1100 of efficiently navigating between applications with linked content on an electronic device with a touch-sensitive display. FIGS. 12A-12I are schematics of touch-sensitive display used to illustrate additional user interfaces for navigating between applications with linked content. FIGS. 12A-12I are used to illustrate the methods and/or processes of FIGS. 11A-11D. Although some of the examples which follow will be given with reference to inputs on a touch-sensitive display (in which a touch-sensitive surface and a display are combined), in some embodiments, the device detects inputs on a touch-sensitive surface 195 that is separate from the display 194, as shown in FIG. 1D.

In some embodiments, a method 1100 is performed by an electronic device (e.g., portable multifunction device 100, FIG. 1A) and/or one or more components of the electronic device (e.g., I/O subsystem 106, operating system 126, etc.). In some embodiments, the method 1100 is governed by instructions that are stored in a non-transitory computer-readable storage medium and that are executed by one or more processors of a device, such as the one or more processors 122 of device 100 (FIG. 1A). Alternatively, or in addition, executable instructions for performing method 1100 are, optionally, included in a transitory computer-readable storage medium or other computer program product configured for execution by one or more processors. For ease of explanation, the following describes method 1100 as performed by the device 100. In some embodiments, with reference to FIG. 1A, the operations of method 300 are performed, at least in part, by a multitasking module (e.g., multitasking module 163), an application selector (e.g., application selector 163-1), a compatibility module (e.g., compatibility module 163-2), an indication generation module (e.g., indication generation module 163-3), a multitasking history (e.g., multitasking history 163-4), a contact/motion module (e.g., contact/motion module 130), a graphics module (e.g., graphics module 132), one or more contact intensity sensors (e.g., contact intensity sensors 165), and a touch-sensitive display (e.g., touch-sensitive display system 112). Some operations in method 1100 are, optionally, combined and/or the order of some operations is, optionally, changed.

As described below, the method 1100 provides an intuitive way to navigate between applications with linked content on an electronic device with a touch-sensitive display. The method reduces the cognitive burden on a user when navigating between applications with linked content, thereby creating a more efficient human-machine interface. Further, such methods conserve power, reduce unnecessary/extraneous/repetitive inputs, and potentially reduce memory usage. For battery-operated electronic devices, enabling a user to navigate between applications with linked content faster and more efficiently conserves power and increases the time between battery charges.

The device displays (1102), in a full-screen mode on the touch-sensitive display, a first application including a first selectable user interface element associated with a second application (e.g., as shown in FIG. 12A, application 1 is displayed in the full-screen mode and includes UI element 1222 associated with a second application). In some embodiments, the device detects (1104) a selection of the first selectable user interface element. In response to detecting the selection of the first selectable user interface element, the device performs (1106) the following operations: displays (1108) the second application (e.g., application 2, FIG. 12B), including a second selectable user interface element (e.g., UI element 1224, FIG. 12B), in a predefined portion (e.g., predefined portion 405, FIG. 12B) of the touch-sensitive display.

In some embodiments, displaying the second application includes (1110) reducing a display size of the first application such that the first application appears to move backwards, relative to a user of the device, within the touch-sensitive display. Stated another way, the device shrinks the first application on the touch-sensitive display in a way that presents an appearance of movement backwards within the touch-sensitive display. In some embodiments, displaying the second application also includes (1112) sliding the second application in a first direction (e.g., a rightward direction) on to the touch-sensitive display until the second application occupies the predefined portion 405 of the touch-sensitive display. In some embodiments, sliding the second application on to the touch-sensitive display includes (1114) sliding the second application over the displayed first application. By employing one or more of these visual effects (1110, 1112, and/or 1114), a user of the device is provided with a smooth transition from displaying the first application to displaying the second application in the predefined portion and is additionally provided with a visual reminder that the first application is still accessible adjacent to the second application.

Turning now to FIG. 11B, and also in response to detecting the selection of the first selectable user interface element, the device displays (1116) a first indication (e.g., indication 1202, FIG. 12B) corresponding to the first application in an additional portion (e.g., additional portion 403) of the touch-sensitive display that is distinct from and adjacent to (e.g., above) the predefined portion. In some embodiments, tapping within the first indication (e.g., contact 1210, FIG. 12B), causes the device to cease displaying the second application, to cease displaying the first indication, and to re-display the first application. In some embodiments, the device also displays a second indication in the space previously occupied by the first indication, the second indication corresponding to the second application (as shown in FIG. 12D, a second indication corresponding to application 2 is now shown within the additional portion 403). In some embodiments, and as shown in FIGS. 12B and 12D, a combination of the predefined portion 405 and the additional portion 403 occupy substantially all of the touch-sensitive display (1118). In some embodiments, the additional portion 403 is between an edge (e.g., edge 498, FIG. 12B) of the touch-sensitive display and the predefined portion 405 (1124). In some embodiments, the additional portion 403 has a width that is substantially the same as the width of the predefined portion 405 and further wherein the additional portion 403 has a height that is substantially less (e.g., at least fifty percent less) than the height of the predefined portion 405 (1126). Additional details and descriptions of embodiments of the additional portion 403 and the predefined portion 405 are presented above in reference to FIG. 1A.

Various exemplary indications 1202 are shown in FIG. 12I. As shown, in some embodiments, the indication 1202 transparently overlays a status bar (e.g., indications 1202-3 and 1202-4 are displayed such that the status bar is visible underneath the first indication) while, in other embodiments, indication 1202 opaquely overlays the status bar (e.g., indications 1202-1, 1202-2, and 1202-5). In some embodiments, the indication 1202 includes a dismiss affordance 1230 (e.g., as shown for indication 1202-1, 1202-2, 1202-3, and 1202-5, but not for indication 1202-4) for dismissing the indication 1202 from the display (e.g., in response to detecting a selection of the dismiss affordance 1230, the device ceases to display the indication 1202). In some embodiments, in addition to or instead of the dismiss affordance 1230, the device ceases to display the indication 1202 (e.g., the first indication discussed above or the second indication discussed below) after a predefined period of time (e.g., 20, 25, or 30 seconds) in which no user input is detected at the additional portion. In some embodiments, the device also ceases to display the indication 1202 in response to the user clicking on the home button 204.

In some embodiments, the first indication includes (1120) an arrow affordance pointing in a direction opposite to the first direction (e.g., arrow affordance 1220 of indication 1202-1, FIG. 12I). The direction of the arrow affordance provides the user of the device with an additional visual clue that the first application remains accessible. Stated another way, the arrow affordance 1220 indicates a location of the (no longer displayed) first application, such that clicking within the additional portion causes the electronic device to slide the second application off of the display in the direction indicated by the arrow affordance 1220. In some embodiments, displaying the first indication includes (1122) determining a visual appearance for the first indication based on a physical characteristic of the touch-sensitive display and displaying the first indication with the determined visual appearance. In some embodiments, the physical characteristic is a physical size or available resolution of the touch-sensitive display. In some embodiments, when the device has a higher available resolution (e.g., 750×1334 pixels instead of 640×1136 pixels) or a bigger physical size (4.7 inches v. 4.0 inches), then the first indication can be displayed as slightly larger. For example, when the device has the higher available resolution or the bigger physical size, the device display the first indication with the visual appearance shown for indication 1202-3 (FIG. 12I) and when the device has the smaller available resolution or the smaller physical size, the device displays the first indication with the visual appearance shown for indication 1202-4 (FIG. 12I).

Figure 11A:
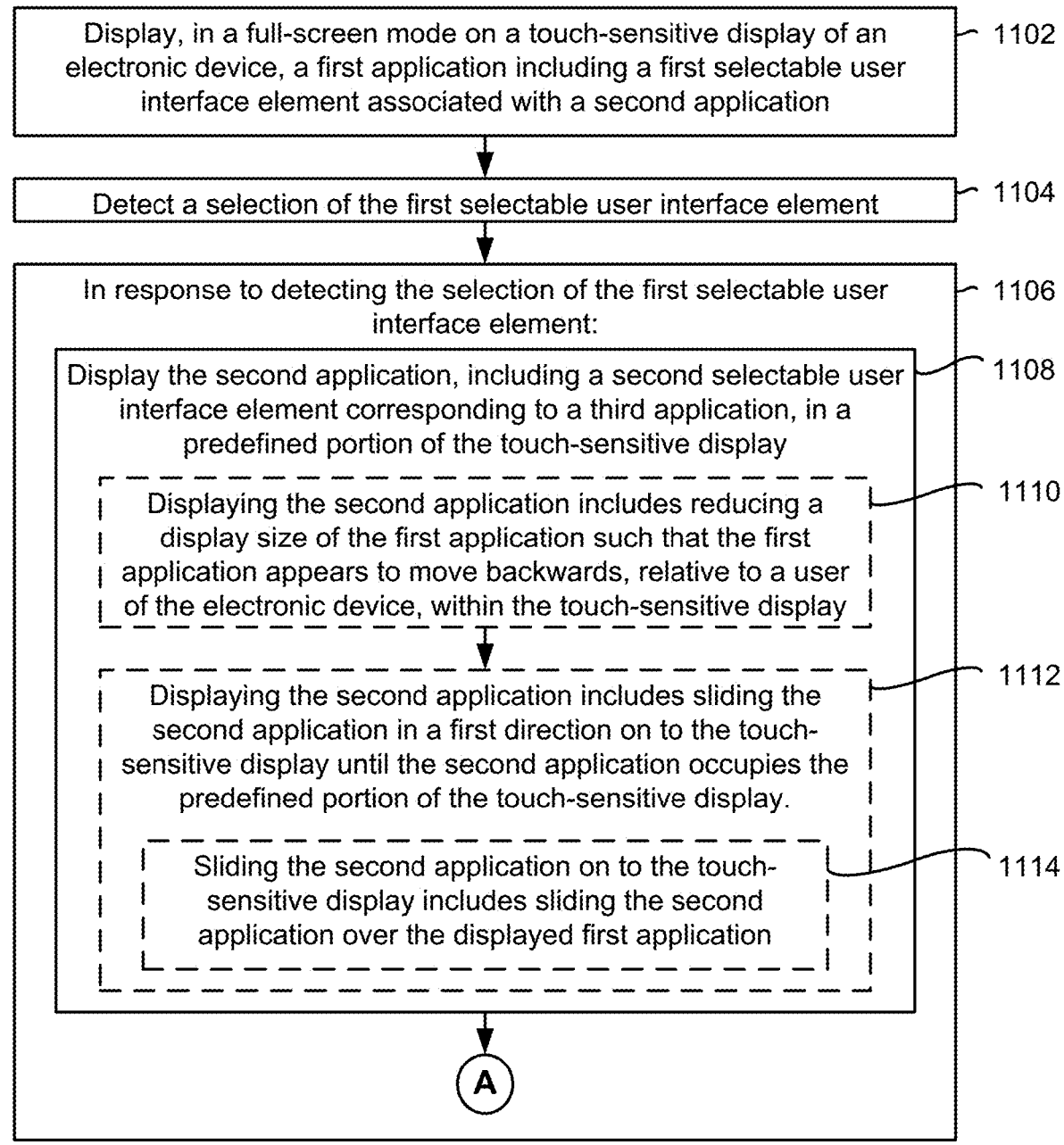
Figure 11C:
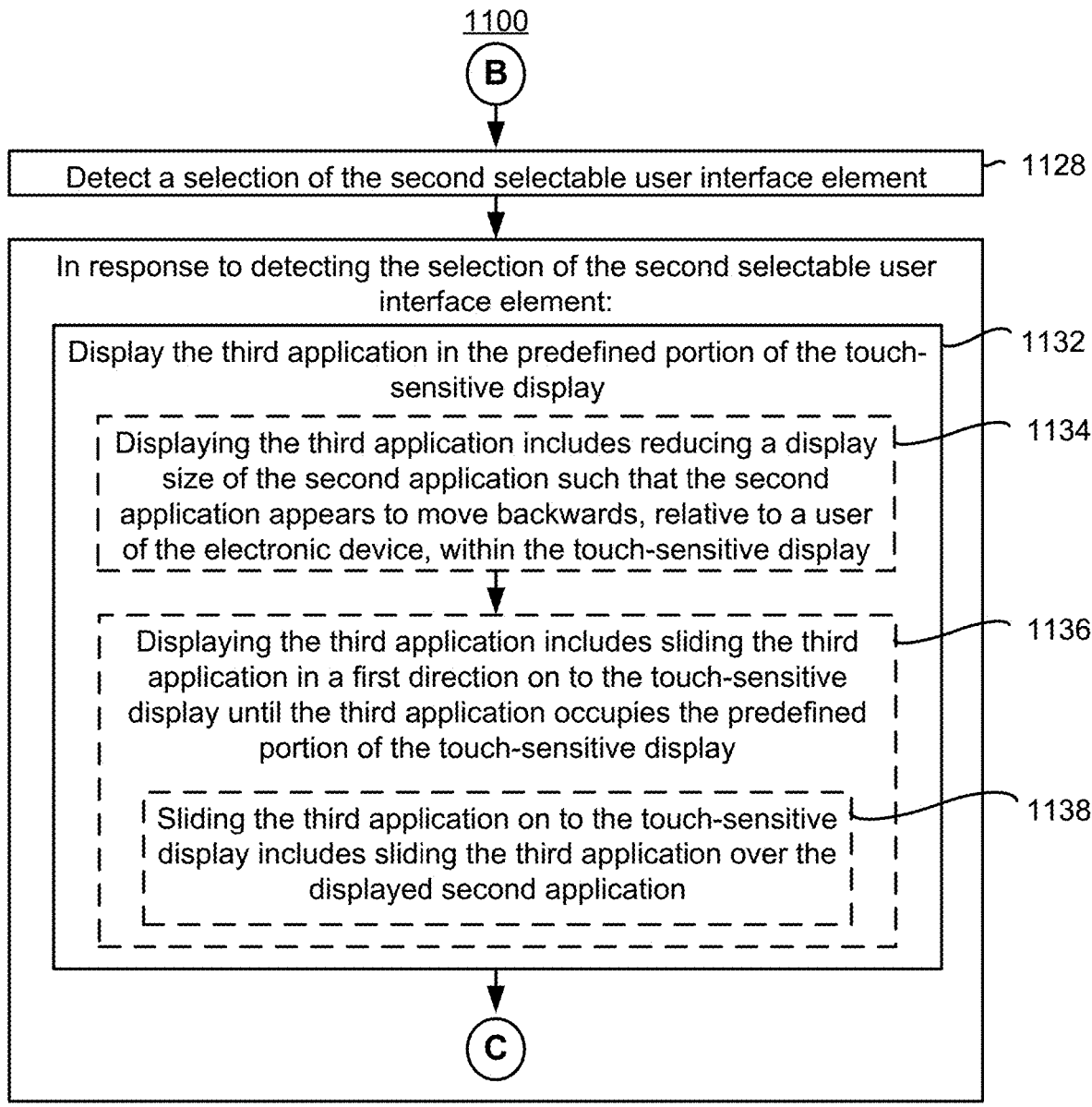

Turning now to FIG. 11C, in some embodiments, the device detects (1128) a selection of the second selectable user interface element (e.g., contact 1208 over UI element 1224, FIG. 12B). In response to detecting the selection of the second selectable user interface element, the device displays (1132) the third application in the predefined portion of the touch-sensitive display (e.g., as shown in FIG. 12C). In some embodiments, displaying the third application includes (1134) reducing a display size of the second application such that the second application appears to move backwards, relative to a user of the device, within the touch-sensitive display. In some embodiments, displaying the third application includes (1136) sliding the third application in the first direction (e.g., rightward direction) on to the touch-sensitive display until the third application occupies the predefined portion of the touch-sensitive display. In some embodiments, sliding the third application on to the touch-sensitive display includes sliding the third application over the displayed second application. As discussed above in reference to operations 1110-1114, by employing one or more of these visual effects (1132, 1134, and/or 1136), a user of the device is provided with a smooth transition from displaying the second application to displaying the third application in the predefined portion and is additionally provided with a visual reminder that the second application is still accessible adjacent to the third application.

Turning now to FIG. 11D, in some embodiments, in response to detecting the selection of the second selectable user interface element (e.g., contact 1208 over UI element 1224, FIG. 12B), the device displays (1140) a second indication corresponding to the second application in the additional portion (as shown in FIG. 12C, indication 1202 has been updated to refer to application 2, instead of application 1). In some embodiments, a combination of the predefined portion and the additional portion occupy substantially all of the touch-sensitive display (1142). As discussed above, various exemplary indications 1202 are shown in FIG. 12I. The above descriptions and details regarding indication 1202 apply as well to the second indication. For example, in some embodiments, the second indication includes (1144) an arrow affordance pointing in a direction opposite to the first direction (e.g., arrow affordance 1220, FIG. 12I) and displaying the second indication includes (1146) determining a visual appearance for the second indication based on a physical characteristic of the touch-sensitive display and displaying the second indication with the determined visual appearance (as discussed in more detail above).

In some embodiments, the device detects (1148) a touch input at the second indication (e.g., the device detects contact 1250 over indication 1202, as shown in FIG. 12C). In some embodiments, in response to detecting the touch input at the second indication, the device slides (1150) the third application off of the touch-sensitive display in a second direction (e.g., a rightward direction), opposite to the first direction, until the third application is no longer visible on the touch-sensitive display. In some embodiments, sliding the third application off of the touch-sensitive display includes (1152) revealing, as the third application slides off of the touch-sensitive display, the second application having the reduced display size. In some embodiments, after sliding the third application off of the touch-sensitive display and revealing the second application, the device either (1) displays the application in a full-screen mode or (2) displays the second application in the predefined portion and also displays indication 1202. As to option (1), in some embodiments, revealing the second application includes (1154) increasing the display size of the second application until the second application is again displayed in the full-screen mode, such that increasing the display size of the second application creates an appearance that the second application is moving, within the touch-sensitive display, towards the user of the electronic device. As to option (2), revealing the second application includes (1156) (i) increasing the display size of the second application until the second application occupies the predefined portion and (ii) re-displaying the first indication corresponding to the first application in the additional portion. For example, after sliding the third application off of the touch-sensitive display, the device re-displays the user interface shown in FIG. 12B. In some embodiments, instead of displaying indication 1202 corresponding to application 1, the device updates indication 1202 to now reference application 3.

As shown in FIGS. 12E-12H, the method 1100 (and the method 300, as noted above) also allows for efficient navigation between applications with linked content when the applications are displayed in a shared screen view. As one example, as shown in FIG. 12E, application 1 is displayed in a main application portion and application 4 is displayed in a side application portion of a shared screen view. In some embodiments, the device detects a contact (e.g., contact 1212) over a selectable user interface element (e.g., a link to content associated with application 3). In response to detecting the contact, in some embodiments, the device displays application 3 in the main application portion that was previously occupied by application 1 and also displays an indication 1202 corresponding to application 1 adjacent to application 3 (e.g., above application 3, such that the indication 1202 opaquely overlays the status bar). The user of the device is then able to either (1) continue navigating to other applications or (2) to return to application 1 by selecting the indication 1202.

As to option 1, in some embodiments, the device detects a contact over the indication corresponding to application 1 (e.g., contact 1216 over indication 1202, FIG. 12F). In response to detecting the contact, the device re-displays the user interface shown in FIG. 12E. In some embodiments, the device also updates the user interface shown in FIG. 12E to include an indication 1202 corresponding to application 3 (as shown in FIG. 12G), while in other embodiments, the device re-displays the status bar and does not display the indication 1202 at all (as shown in FIG. 12E).

As to option 2, in some embodiments, the device detects a contact (e.g., contact 1218, FIG. 12F) over an additional selectable user interface element (e.g., UI element 1224, FIG. 12F), that is associated with application 5, displayed within the side application (e.g., application 4). In some embodiments, in response to detecting the contact, the device ceases to display application 3 in the main application portion and instead displays application 5 in the main application portion and also displays an indication 1202 that corresponds to application 3 (as shown in FIG. 12H). In this way, the user is provided with a mechanism to easily and seamlessly navigate back to application 3 by selecting the indication 1202.

It should be understood that the particular order in which the operations in FIGS. 11A-11D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 300) are also applicable in an analogous manner to method 1100 described above with respect to FIGS. 3A-3G. For example, the indications corresponding to a particular application (e.g., indication 1202) described above with reference to method 1100 optionally have one or more of the characteristics of the additional portion described herein with reference to other methods described herein (e.g., method 300). For brevity, these details are not repeated here.

In accordance with some embodiments, FIG. 13 shows a functional block diagram of an electronic device 1300 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein. For ease of discussion, the electronic device 1300 is implemented as a portable multifunction device 100 (FIG. 1A).

As shown in FIG. 13, the electronic device 1300, includes a display unit 1301 configured to display information (e.g., touch-sensitive display system 112 (also referred to as a touch screen and touch screen display), FIG. 1A), a touch-sensitive surface unit 1303 (e.g., display controller 156 and touch-sensitive display system 112, FIG. 1A) configured to receive contacts, gestures, and other user inputs on the display unit 1301, and a processing unit 1305 coupled with the display unit 1301 and the touch-sensitive surface unit 1303. In some embodiments, the display unit 1301 and the touch-sensitive surface unit 1303 are integrated in a single touch-sensitive display unit (referred to herein interchangeably as a touch-sensitive display and touch-sensitive display unit). In some embodiments, the processing unit 1305 includes a displaying unit 1307, a detecting unit 1309, a sliding unit 1311, a reducing unit 1313, a revealing unit 1315, an increasing unit 1317, a re-displaying unit 1319, a determining unit 1321, and/or a ceasing unit 1323.

The processing unit is configured to: display (e.g., with, in a full-screen mode on the display unit, a first application including a first selectable user interface element associated with a second application. The processing unit is configured to: display (e.g., with the displaying unit 1307 and/or the touch-sensitive display unit), in a full-screen mode on the touch-sensitive display unit, a first application including a first selectable user interface element associated with a second application; detect (e.g., with the detecting unit 1309) a selection of the first selectable user interface element. In response to detecting the selection of the first selectable user interface element, the processing unit is configured to: (i) display (e.g., with the displaying unit 1307 and/or the touch-sensitive display unit) the second application, including a second selectable user interface element, in a predefined portion of the touch-sensitive display unit and (ii) display (e.g., with the displaying unit 1307 and/or the touch-sensitive display unit) a first indication corresponding to the first application in an additional portion of the touch-sensitive display unit that is distinct from and adjacent to the predefined portion, wherein a combination of the predefined portion and the additional portion occupy substantially all of the touch-sensitive display unit. The processing unit is further configured to: detect (e.g., with the detecting unit 1309) a selection of the second selectable user interface element. In response to detecting the selection of the second selectable user interface element, the processing unit is configured to: (i) display (e.g., with the displaying unit 1307 and/or the touch-sensitive display unit) the third application in the predefined portion of the touch-sensitive display unit and (ii) display (e.g., with the displaying unit 1307 and/or the touch-sensitive display unit) a second indication corresponding to the second application in the additional portion of the touch-sensitive display unit, the combination of the predefined portion and the additional portion occupying substantially all of the touch-sensitive display unit.

In some embodiments of the electronic device 1300, the processing unit (or one or more components thereof, such as displaying unit 1307, detecting unit 1309, sliding unit 1311, reducing unit 1313, and revealing unit 1315, increasing unit 1317, re-displaying unit 1319, determining unit 1321, and ceasing unit 1323, FIG. 13) is (are) further configured to perform the method in any one of A2-A16 described in the "Summary" section above.

In accordance with some embodiments, FIG. 14 shows a functional block diagram of an electronic device 1400 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 14 are, optionally, combined or separated into sub-blocks to implement the principles of the various described embodiments. Therefore, the description herein optionally supports any possible combination or separation or further definition of the functional blocks described herein. For ease of discussion, the electronic device 1400 is implemented as a portable multifunction device 100 (FIG. 1A).

As shown in FIG. 14, the electronic device 1400, includes a display unit 1401 configured to display information (e.g., touch-sensitive display system 112 (also referred to as a touch screen and touch screen display), FIG. 1A), a touch-sensitive surface unit 1403 (e.g., display controller 156 and touch-sensitive display system 112, FIG. 1A) configured to receive contacts, gestures, and other user inputs on the display unit 1401, and a processing unit 1405 coupled with the display unit 1401 and the touch-sensitive surface unit 1403. In some embodiments, the display unit 1401 and the touch-sensitive surface unit 1403 are integrated in a single touch-sensitive display unit (referred to herein interchangeably as a touch-sensitive display and touch-sensitive display unit). In some embodiments, the processing unit 1405 includes a displaying unit 1407, a detecting unit 1409, a sliding unit 1411, a resizing unit 1413, a continuing unit 1415, a ceasing unit 1417, an increasing unit 1419, and/or a dimming unit 1421.

The processing unit is configured to: display (e.g., with the displaying unit 1307 and/or the touch-sensitive surface unit), in a full-screen mode on the display unit, a first application including a first selectable user interface element associated with a second application; detect (e.g., with the detecting unit 1309) a selection of the first selectable user interface element. In response to detecting the selection of the first selectable user interface element, the processing is configured to: (i) display (e.g., with the displaying unit 1307 and/or the touch-sensitive surface unit) the second application, including content corresponding to the selectable user interface element, in a predefined portion of the display unit and (ii) display (e.g., with the displaying unit 1307 and/or the touch-sensitive surface unit) the first application in an additional portion, distinct from the predefined portion, such that a combination of the predefined portion and the additional portion occupy substantially all of the display unit.

In some embodiments of the electronic device 1400, the processing unit (or one or more components thereof, such as displaying unit 1407, detecting unit 1409, sliding unit 1411, resizing unit 1413, continuing unit 1415, ceasing unit 1417, increasing unit 1419, and/or dimming unit 1421, FIG. 14) is further configured to perform the method in any one of B2-B25 described in the "Summary" section above.

The operations in the information processing methods described above are, optionally implemented by running one or more functional modules in information processing apparatus such as general purpose processors (e.g., as described above with respect to FIG. 1A) or application specific chips.

The operations described above with reference to FIGS. 3A-3G and FIG. 11A-11D are, optionally, implemented by components depicted in FIGS. 1A-1B or FIGS. 13-14. For example, detection operation 304 and detection operation 1104 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
    at an electronic device with a display and one or more input devices:
        concurrently displaying:
            a first user interface that is associated with a first application;
            a status bar that includes a plurality of status indications associated with respective system-wide functions of the electronic device and is displayed outside of the user interface that is associated with the first application; and
            a first affordance, displayed within the status bar, associated with a second application that is different from the first application;
        while concurrently displaying the first user interface, the status bar, and the first affordance associated with the second application, detecting, via the one or more input devices, a first input that corresponds to selection of the first affordance; and
        in response to detecting the first input:
            replacing display of at least a portion of the first user interface with a second user interface that is associated with the second application, wherein the second user interface is maintained on the display after the first input;
            maintaining display of the status bar; and
            ceasing to display the first affordance within the status bar.

2. The method of claim 1, wherein the first affordance is a notification associated with the second application.

3. The method of claim 2, wherein the notification is overlaid on the second application.

4. The method of claim 1, wherein:
the first user interface, when displayed on the display, occupies substantially all of the display except for a region occupied by the status bar; and
the second user interface, when displayed on the display, occupies substantially all of the display, except for a region occupied by the status bar.

5. The method of claim 4, wherein the second affordance includes a name of the first application.

6. The method of claim 4, wherein maintaining display of the status bar in response to detecting the first input further includes:
updating the status bar to cease displaying at least one of the plurality of status indications.

7. The method of claim 6, wherein:
the second affordance is displayed in an area of the status bar that was previously occupied by the at least one of the plurality of status indications that was removed from the status bar.

8. The method of claim 7, wherein maintaining display of the status bar in response to detecting the second input includes:
ceasing to display the second affordance within the status bar and updating the status bar to re-display the at least one of the plurality of status indications.

9. The method of claim 8, wherein the second affordance includes a name of the first application.

10. The method of claim 4, wherein replacing display of at least the portion of the first user interface with the second user interface includes:
sliding the portion of the first user interface in a first direction across the display until the portion of the first user interface is no longer visible on the display, and
while sliding the portion of the first user interface in the first direction, sliding respective portions of the second user interface in the first direction across the display until the second user interface has replaced the portion of the first user interface on the display.

11. The method of claim 10, wherein the second affordance includes (i) a name of the first application and (ii) a directional indication that points in the first direction.

12. The method of claim 11, wherein replacing display of at least the portion of the second user interface with the first user interface includes:
sliding the portion of the second user interface in a second direction, opposite to the first direction, across the display until the portion of the second user interface is no longer visible on the display, and
while sliding the portion of the second user interface in the second direction, sliding respective portions of the first user interface in the second direction across the display until the first user interface has replaced the portion of the second user interface on the display.

13. The method of claim 4, wherein:
before detecting the first input, the first user interface and the status bar occupy substantially all of the display,
after detecting the first input and before detecting the second input, the second user interface and the status bar occupy substantially all of the display, and
after detecting the second input, the first user interface and the status bar occupy substantially all of the display.

14. The method of claim 13, wherein:
at least one of the one or more input devices is a touch-sensitive surface that is integrated with the display, and
the first and second inputs are detected via the touch-sensitive surface.

15. The method of claim 1, wherein replacing display of at least a portion of the first user interface with a second user interface that is associated with a second application includes:
displaying a first user interface object that is associated with a third application;
detecting, via the one or more input devices, a second input directed to the first user interface object; and
in response to detecting the second input, displaying:
a third user interface that is associated with the third application;
a second affordance, displayed within the status bar, associated with the second application, wherein the status bar is displayed outside of the user interface that is associated with the second application; and
a second user interface object that is associated with a fourth application.

16. The method of claim 15, further comprising:
while displaying the third user interface, the second affordance associated with the second application, and the second user interface object associated with the fourth application, detecting, via the one or more input devices, a third input directed to the second affordance; and
in response to detecting the third input:
displaying a fourth user interface that is associated with the fourth application; and
ceasing display of the second affordance within the status bar and instead displaying a third affordance within the status bar, the third affordance associated with the third application, wherein the status bar is displayed outside of the user interface that is associated with the third application.

17. The method of claim 16, wherein the first, second, and third affordances are displayed in a predefined region at a corner of the status bar.

18. A non-transitory computer-readable storage medium storing executable instructions that, when executed by an electronic device with a display and one or more input devices, cause the electronic device to:
concurrently display:
a first user interface that is associated with a first application;
a status bar that includes a plurality of status indications associated with respective system-wide functions of the electronic device and is displayed outside of the user interface that is associated with the first application; and
a first affordance, displayed within the status bar, associated with a second application that is different from the first application;
while concurrently displaying the first user interface, the status bar, and the first affordance associated with the second application, detect, via the one or more input devices, a first input that corresponds to selection of the first affordance; and
in response to detecting the first input:
replace display of at least a portion of the first user interface with a second user interface that is associated with the second application, wherein the second user interface is maintained on the display after the first input;
maintain display of the status bar; and
cease to display the first affordance within the status bar.

19. The non-transitory computer-readable storage medium of claim 18, wherein the instructions that, when executed by the electronic device, cause the electronic device to replace display of at least a portion of the first user interface with a second user interface that is associated with a second application include instructions that, when executed by the electronic device, cause the electronic device to:
  display a first user interface object that is associated with a third application;
  detect, via the one or more input devices, a second input directed to the first user interface object; and
  in response to detecting the second input, display:
    a third user interface that is associated with the third application;
    a second affordance, displayed within the status bar, associated with the second application, wherein the status bar is displayed outside of the user interface that is associated with the second application; and
    a second user interface object that is associated with a fourth application.

20. The non-transitory computer-readable storage medium of claim 19, wherein the one or more programs include instructions that, when executed by the electronic device, cause the electronic device to:
  while displaying the third user interface, the second affordance associated with the second application, and the second user interface object associated with the fourth application, detect, via the one or more input devices, a third input directed to the second affordance; and
  in response to detecting the third input:
    display a fourth user interface that is associated with the fourth application;
    cease display of the second affordance within the status bar and instead display a third affordance within the status bar, the third affordance associated with the third application, wherein the status bar is displayed outside of the user interface that is associated with the third application.

21. The non-transitory computer-readable storage medium of claim 20, wherein the first, second, and third affordances are displayed in a predefined region at a corner of the status bar.

22. The non-transitory computer-readable storage medium of claim 18, wherein the first affordance is a notification associated with the second application.

23. The non-transitory computer-readable storage medium of claim 22, wherein the notification is overlaid on the second application.

24. The non-transitory computer-readable storage medium of claim 18, wherein:
  the first user interface, when displayed on the display, occupies substantially all of the display except for a region occupied by the status bar; and
  the second user interface, when displayed on the display, occupies substantially all of the display, except for a region occupied by the status bar.

25. The non-transitory computer-readable storage medium of claim 24, wherein the second affordance includes a name of the first application.

26. The non-transitory computer-readable storage medium of claim 24, wherein the instructions that cause the electronic device to maintain display of the status bar in response to detecting the first input further include instructions that cause the electronic device to:
  update the status bar to cease displaying at least one of the plurality of status indications.

27. The non-transitory computer-readable storage medium of claim 26, wherein:
  the second affordance is displayed in an area of the status bar that was previously occupied by the at least one of the plurality of status indications that was removed from the status bar.

28. The non-transitory computer-readable storage medium of claim 27, wherein the instructions that cause the electronic device to maintain display of the status bar in response to detecting the second input include instructions that cause the electronic device to:
  cease to display the second affordance within the status bar and update the status bar to re-display the at least one of the plurality of status indications.

29. The non-transitory computer-readable storage medium of claim 28, wherein the second affordance includes a name of the first application.

30. The non-transitory computer-readable storage medium of claim 24, wherein the instructions that cause the electronic device to replace display of at least the portion of the first user interface with the second user interface include instructions that cause the electronic device to:
  slide the portion of the first user interface in a first direction across the display until the portion of the first user interface is no longer visible on the display, and
  while sliding the portion of the first user interface in the first direction, slide respective portions of the second user interface in the first direction across the display until the second user interface has replaced the portion of the first user interface on the display.

31. The non-transitory computer-readable storage medium of claim 30, wherein the second affordance includes (i) a name of the first application and (ii) a directional indication that points in the first direction.

32. The non-transitory computer-readable storage medium of claim 31, wherein the instructions that cause the electronic device to replace display of at least the portion of the second user interface with the first user interface include instructions that cause the electronic device to:
  slide the portion of the second user interface in a second direction, opposite to the first direction, across the display until the portion of the second user interface is no longer visible on the display, and
  while sliding the portion of the second user interface in the second direction, slide respective portions of the first user interface in the second direction across the display until the first user interface has replaced the portion of the second user interface on the display.

33. The non-transitory computer-readable storage medium of claim 24, wherein:
  before detecting the first input, the first user interface and the status bar occupy substantially all of the display,
  after detecting the first input and before detecting the second input, the second user interface and the status bar occupy substantially all of the display, and
  after detecting the second input, the first user interface and the status bar occupy substantially all of the display.

34. The non-transitory computer-readable storage medium of claim 33, wherein:
  at least one of the one or more input devices is a touch-sensitive surface that is integrated with the display, and
  the first and second inputs are detected via the touch-sensitive surface.

35. An electronic device, comprising:
a display;
one or more input devices;
one or more processors; and
memory storing one or more programs that, when executed by the one or more processors, cause the electronic device to:
concurrently display:
a first user interface that is associated with a first application;
a status bar that includes a plurality of status indications associated with respective system-wide functions of the electronic device and is displayed outside of the user interface that is associated with the first application; and
a first affordance, displayed within the status bar, associated with a second application that is different from the first application;
while concurrently displaying the first user interface, the status bar, and the first affordance associated with the second application, detect, via the one or more input devices, a first input that corresponds to selection of the first affordance; and
in response to detecting the first input:
replace display of at least a portion of the first user interface with a second user interface that is associated with the second application, wherein the second user interface is maintained on the display after the first input;
maintain display of the status bar; and
cease to display the first affordance within the status bar.

36. The electronic device of claim 35, wherein the one or more programs that, when executed by the one or more processors, cause the electronic device to replace display of at least a portion of the first user interface with a second user interface that is associated with a second application also cause the electronic device to:
display a first user interface object that is associated with a third application;
detect, via the one or more input devices, a second input directed to the first user interface object; and
in response to detecting the second input, display:
a third user interface that is associated with the third application;
a second affordance, displayed within the status bar, associated with the second application, wherein the status bar is displayed outside of the user interface that is associated with the second application; and
a second user interface object that is associated with a fourth application.

37. The electronic device of claim 36, wherein the one or more programs, when executed by the one or more processors, cause the electronic device to:
while displaying the third user interface, the second affordance associated with the second application, and the second user interface object associated with the fourth application, detecting, via the one or more input devices, a third input directed to the second affordance; and
in response to detecting the third input:
display a fourth user interface that is associated with the fourth application; and
cease display of the second affordance within the status bar and instead display a third affordance within the status bar, the third affordance associated with the third application, wherein the status bar is displayed outside of the user interface that is associated with the third application.

38. The electronic device of claim 37, wherein the first, second, and third affordances are displayed in a predefined region at a corner of the status bar.

39. The electronic device of claim 35, wherein the first affordance is a notification associated with the second application.

40. The electronic device of claim 39, wherein the notification is overlaid on the second application.

41. The electronic device of claim 35, wherein:
the first user interface, when displayed on the display, occupies substantially all of the display except for a region occupied by the status bar; and
the second user interface, when displayed on the display, occupies substantially all of the display, except for a region occupied by the status bar.

42. The electronic device of claim 41, wherein the second affordance includes a name of the first application.

43. The electronic device of claim 41, wherein the one or more programs that, when executed by the one or more processors, cause the electronic device to maintain display of the status bar in response to detecting the first input also cause the electronic device to:
update the status bar to cease displaying at least one of the plurality of status indications.

44. The electronic device of claim 43, wherein:
the second affordance is displayed in an area of the status bar that was previously occupied by the at least one of the plurality of status indications that was removed from the status bar.

45. The electronic device of claim 44, wherein the one or more programs that, when executed by the one or more processors, cause the electronic device to maintain display of the status bar in response to detecting the second input also cause the electronic device to: cease to display the second affordance within the status bar and update the status bar to re-display the at least one of the plurality of status indications.

46. The electronic device of claim 45, wherein the second affordance includes a name of the first application.

47. The electronic device of claim 41, wherein the one or more programs that, when executed by the one or more processors, cause the electronic device to replace display of at least the portion of the first user interface with the second user interface also cause the electronic device to:
slide the portion of the first user interface in a first direction across the display until the portion of the first user interface is no longer visible on the display, and
while sliding the portion of the first user interface in the first direction, slide respective portions of the second user interface in the first direction across the display until the second user interface has replaced the portion of the first user interface on the display.

48. The electronic device of claim 47, wherein the second affordance includes (i) a name of the first application and (ii) a directional indication that points in the first direction.

49. The electronic device of claim 48, wherein the one or more programs that, when executed by the one or more processors, cause the electronic device to replace display of at least the portion of the second user interface with the first user interface also cause the electronic device to:
slide the portion of the second user interface in a second direction, opposite to the first direction, across the display until the portion of the second user interface is no longer visible on the display, and while sliding the portion of the second user interface in the second direction, slide respective portions of the first user interface in the second direction across the display until the first user interface has replaced the portion of the second user interface on the display.

50. The electronic device of claim 41, wherein:
before detecting the first input, the first user interface and the status bar occupy substantially all of the display,
after detecting the first input and before detecting the second input, the second user interface and the status bar occupy substantially all of the display, and
after detecting the second input, the first user interface and the status bar occupy substantially all of the display.

51. The electronic device of claim 50, wherein:
at least one of the one or more input devices is a touch-sensitive surface that is integrated with the display, and
the first and second inputs are detected via the touch-sensitive surface.

* * * * *